United States Patent
Cabrera et al.

(10) Patent No.: US 11,961,136 B2
(45) Date of Patent: Apr. 16, 2024

(54) EFFICIENT, ACCURATE, AND SECURE TRANSFERS OF INTERNALLY-CUSTODIED DIGITAL ASSETS

(71) Applicant: Bakkt Marketplace, LLC, Atlanta, GA (US)

(72) Inventors: Nicolas Frederic Cabrera, Atlanta, GA (US); Jeffrey Scott Pittelkau, Montgomery, AL (US); Nikolais Linsteadt, Applegate, CA (US); Joseph Arthur Revnes, Atlanta, GA (US); Brian Daniel Cooper, Marietta, GA (US); William Matthau, Laguna Niguel, CA (US); Christopher Michael Petersen, Lakeway, TX (US); Yamini Bistesh Sagar, Alpharetta, GA (US); Utkarsh Agarwal, Tucson, AZ (US); Tim Kuchlein, Cupertino, CA (US); Bharath Lakshmanan, San Ramon, CA (US); William Andrew Bryant, Alpharetta, GA (US); Stephen Paul Saucier, Atlanta, GA (US); Deepak Kumar, Marietta, GA (US); Anil Jaiswal, Marietta, GA (US); Byungkwon Jeon, Cumming, GA (US); Balaji Devarasetty, Atlanta, GA (US)

(73) Assignee: BAKKT MARKETPLACE, LLC, Atlanta, GA (US)

( * ) Notice: Subject to any disclaimer, the term of this patent is extended or adjusted under 35 U.S.C. 154(b) by 62 days.

(21) Appl. No.: 17/407,888

(22) Filed: Aug. 20, 2021

(65) Prior Publication Data
US 2022/0188780 A1 Jun. 16, 2022

Related U.S. Application Data

(60) Provisional application No. 63/199,245, filed on Dec. 16, 2020.

(51) Int. Cl.
*G06Q 20/06* (2012.01)
*G06Q 20/10* (2012.01)
(Continued)

(52) U.S. Cl.
CPC .......... *G06Q 40/02* (2013.01); *G06Q 20/065* (2013.01); *G06Q 20/102* (2013.01); *G06Q 20/26* (2013.01);
(Continued)

(58) Field of Classification Search
None
See application file for complete search history.

(56) References Cited

U.S. PATENT DOCUMENTS 10,269,009 B1 4/2019 Winklevoss et al.
10,621,561 B1 4/2020 Brock et al.
(Continued)

FOREIGN PATENT DOCUMENTS

WO 2017/070469 A1 4/2017
WO 2017/132333 A1 8/2017
(Continued)

OTHER PUBLICATIONS

International Searching Authority, International Search Report and Written Opinion for International Application No. PCT/US2021/049625, dated Dec. 21, 2021, (16 pages), European Patent Office, Rijswijk, Netherlands.
(Continued)

*Primary Examiner* — Joseph W. King
(74) *Attorney, Agent, or Firm* — Alston & Bird LLP

(57) ABSTRACT

Various embodiments are directed to processing and executing digital asset transfers between two users. An example method includes receiving a data object defining a digital asset transfer, and the data object may be a query from the first user to initiate an outbound transfer to a second user or
(Continued)

an approval of a request for digital asset units from the second user. The method further includes retrieving account balance data objects associated with the digital asset accounts for the first and second users. The method further includes, responsive to determining that the digital asset transfer satisfies one or more transfer conditions, executing the digital asset transfer by executing a closed-loop debit from the first user and executing a closed-loop credit to the second user. The method further includes updating the account balance data object to reflect the resulting balances of each digital asset account.

14 Claims, 20 Drawing Sheets

(51) Int. Cl.
  *G06Q 20/26* (2012.01)
  *G06Q 20/38* (2012.01)
  *G06Q 20/40* (2012.01)
  *G06Q 40/02* (2023.01)
(52) U.S. Cl.
  CPC ....... *G06Q 20/381* (2013.01); *G06Q 20/4037* (2013.01); *G06Q 20/405* (2013.01)

(56) References Cited

U.S. PATENT DOCUMENTS

| | | |
|---|---|---|
| 11,288,660 B1 | 3/2022 | Kurani |
| 2007/0255662 A1 | 11/2007 | Tumminaro |
| 2009/0119209 A1 | 5/2009 | Sorensen et al. |
| 2013/0185186 A1 | 7/2013 | Blackwood |
| 2015/0046241 A1 | 2/2015 | Salmon et al. |
| 2015/0154572 A1 | 6/2015 | von NotHaus et al. |
| 2015/0170112 A1 | 6/2015 | Decastro |
| 2015/0213419 A1 | 7/2015 | Lyons et al. |
| 2015/0262176 A1 | 9/2015 | Langschaedel et al. |
| 2015/0332256 A1 | 11/2015 | Minor |
| 2015/0363769 A1 | 12/2015 | Ronca et al. |
| 2016/0371771 A1 | 12/2016 | Serrano et al. |
| 2017/0221053 A1 | 8/2017 | Goloshchuk |
| 2017/0357966 A1 | 12/2017 | Chandrasekhar et al. |
| 2019/0139033 A1 | 5/2019 | Ricotta et al. |
| 2019/0220856 A1 | 7/2019 | Li et al. |
| 2019/0303887 A1 | 10/2019 | Wright et al. |
| 2019/0303921 A1 | 10/2019 | Mutter |
| 2019/0303922 A1 | 10/2019 | Hamasni et al. |
| 2020/0019937 A1 | 1/2020 | Edwards et al. |
| 2020/0042996 A1 | 2/2020 | Mayblum et al. |
| 2020/0042998 A1 | 2/2020 | Mendhi et al. |
| 2020/0175506 A1 | 6/2020 | Snow |
| 2020/0195652 A1 | 6/2020 | Carnahan et al. |
| 2020/0211098 A1 | 7/2020 | Miyamoto et al. |
| 2020/0265516 A1 | 8/2020 | Xu |
| 2020/0334668 A1 | 10/2020 | Nicli et al. |
| 2021/0012420 A1 | 1/2021 | Balakrishnan |
| 2021/0119807 A1 | 4/2021 | Chen et al. |
| 2021/0398211 A1 | 12/2021 | Maathur et al. |
| 2022/0122062 A1 | 4/2022 | Mayblum et al. |
| 2022/0164815 A1 | 5/2022 | Petersen et al. |
| 2022/0188781 A1 | 6/2022 | El-Bizri |
| 2022/0188811 A1 | 6/2022 | Petersen et al. |
| 2022/0188812 A1 | 6/2022 | Petersen et al. |
| 2022/0188917 A1 | 6/2022 | Petersen et al. |
| 2022/0237597 A1 | 7/2022 | Petersen et al. |
| 2022/0237598 A1 | 7/2022 | Cabrera et al. |
| 2022/0237599 A1 | 7/2022 | Petersen et al. |

FOREIGN PATENT DOCUMENTS

| | | |
|---|---|---|
| WO | WO-2019/222432 A1 | 11/2019 |
| WO | 2020/049442 A1 | 3/2020 |

OTHER PUBLICATIONS

International Searching Authority, International Search Report and Written Opinion for International Application No. PCT/US2021/050043, dated Jan. 10, 2022, (16 pages), European Patent Office, Rijswijk, Netherlands.

International Searching Authority, International Search Report and Written Opinion for International Application No. PCT/US2021/050066, dated Nov. 24, 2021, (15 pages), European Patent Office, Rijswijk, Netherlands.

Dashkevich, Natalia et al. "Blockchain Application For Central Banks: A Systemic Mapping Study," IEEE Access, Jul. 27, 2020, DOI: 10.1109/ACCESS.2020.3012295.

NonFinal Office Action for U.S. Appl. No. 17/378,250, dated Aug. 5, 2022, (40 pages), United States Patent and Trademark Office, US.

Proskuryakov, Alexander et al. "Predictive-Free Methods for Digital Financial Asset Management and delayed Functional-Differential Economic Game Models," XPLORE IEEE. 2021 International Conference On Information Technology and Nanotechnology (ITNT), Sep. 20-24, 2021, DOI: 10.1109/ITNT52450.2021.9649433.

NonFinal Office Action for U.S. Appl. No. 17/407,962, dated Sep. 21, 2022, (53 pages), United States Patent and Trademark Office, US.

International Searching Authority, International Search Report and Written Opinion for International Application No. PCT/US2021/043168, dated Nov. 12, 2021, (15 pages).

International Searching Authority, International Search Report and Written Opinion for International Application No. PCT/US2021/043173, dated Nov. 12, 2021, (17 pages).

International Searching Authority, International Search Report and Written Opinion for International Application No. PCT/US2021/043184, dated Nov. 16, 2021, (17 pages).

International Searching Authority, International Search Report and Written Opinion for International Application No. PCT/US2021/050135, dated Jan. 3, 2022, (14 pages), European Patent Office, Rijswijk, Netherlands.

International Searching Authority, International Search Report and Written Opinion for International Application No. PCT/US2021/050137, dated Jan. 3, 2022, (14 pages), European Patent Office, Rijswijk, Netherlands.

Dashkevich, Natalia et al. "Blockchain Application For Central Banks: A Systemic Mapping Study," in IEEE Access, vol. 8, Jul. 27, 2020 (Year: 2020), pp. 139918-133952, DOI: 10.1109/ACCESS.2020.3012295.

Final Office Action for U.S. Appl. No. 17/378,250, dated Mar. 3, 2023, (20 pages), United States Patent and Trademark Office, US.

NonFinal Office Action for U.S. Appl. No. 17/377,178, dated Feb. 16, 2023, (20 pages), United States Patent and Trademark Office, US.

NonFinal Office Action for U.S. Appl. No. 17/460,799, dated Mar. 1, 2023, (22 pages), United States Patent and Trademark Office, US.

Proskuryakov, Alexander et al. "Predictive-Free Methods for Digital Financial Asset Management and Delayed Functional-Differential Economic Game Models," 2021 International Conference On Information Technology and Nontechnology (ITNT), pp. 1-4, Samara, Russian Federation, XPLORE IEEE, Date of Conference: Sep. 20-24, 2021 (Year: 2021), DOI: 10.1109/ITNT52450.2021.9649433.

Final Office Action for U.S. Appl. No. 17/407,962, dated Apr. 25, 2023, (29 pages), United States Patent and Trademark Office, US.

Final Office Action for U.S. Appl. No. 17/460,799, dated Jun. 22, 2023, (12 pages), United States Patent and Trademark Office, US.

NonFinal Office Action for U.S. Appl. No. 17/397,810, dated Aug. 15, 2023, (26 pages), United States Patent and Trademark Office, US.

NonFinal Office Action for U.S. Appl. No. 17/407,962, dated Nov. 14, 2023 (33 pages), United States Patent and Trademark Office, US.

NonFinal Office Action for U.S. Appl. No. 17/460,799, dated Oct. 12, 2023, (23 pages), United States Patent and Trademark Office, US.

EFFICIENT, ACCURATE, AND SECURE TRANSFERS OF INTERNALLY-CUSTODIED DIGITAL ASSETS

CROSS-REFERENCE TO RELATED APPLICATIONS

This application claims the benefit of U.S. Provisional Patent Application Ser. No. 63/199,245 filed on Dec. 16, 2020, which is incorporated herein by reference in its entirety, including any figures, tables, drawings, and appendices.

TECHNOLOGICAL FIELD

Embodiments of the present disclosure generally relate to transacting, exchanging, transferring, managing, executing transactions for, and/or the like digital assets and fiat currency.

BACKGROUND

Various embodiments of the present disclosure address technical challenges related to transferring digital assets between two end users, managing the processing of such transfers and transactions, and improving the efficiency of such processing.

BRIEF SUMMARY

In general, embodiments of the present disclosure provide methods, apparatus, systems, computing devices, computing entities, and/or the like for enabling, configuring, processing, and/or executing digital asset transfers between two end users. A digital asset transfer generally involves a debit of units of a digital asset from a first end user and a credit of the same number of digital asset units to a second end user. Digital asset units are specifically debited and credited from digital asset user accounts associated with the two end users. Various embodiments enable an end user to transfer digital assets to another end user (e.g., an outbound digital asset transfer), as well as enable an end user to request and receive digital assets from another end user (e.g., an inbound digital asset transfer). In various embodiments, digital asset transfers for both internally-custodied digital assets and externally-custodied digital assets are enabled and executed. Various embodiments of the present disclosure provide an account management system configured to execute digital asset transfers for internally-custodied digital assets (e.g., managed by the account management system) and for externally-custodied digital assets managed by other systems.

Various embodiments provide technical solutions to technical challenges generally relating to digital asset transfers, transactions, conversions, and/or the like and the efficiency, accuracy, and security thereof. Digital asset transfers of internally-custodied digital assets are executed in part by closed-loop debits and closed-loop credits. Such closed-loop transactions of internally-custodied digital assets are particularly advantageous, such as in instances when the internally-custodied digital asset is a cryptoasset or a cryptocurrency digital asset. In such instances, the closed-loop transactions are off-chain transactions that enable digital asset transfers to be executed on a shorter time scale of milliseconds or seconds with decreased exposure of both sender data and recipient data, as compared to on-chain transactions. Meanwhile, execution of digital asset transfers of externally-custodied digital assets includes generation and transmission of application programming interface (API) queries configured to efficiently and precisely identify a particular digital asset, identify a digital asset user account, and cause certain debits and credits of digital asset units. Such API queries include identifier tokens unique to end users and federated for different digital assets, such that an identifier token identifies different digital asset user accounts, thereby reducing system load including storage resources.

Further technical advantages are provided by identifying and providing alternative digital asset transfers for selection by a recipient of a digital asset transfer. Alternative digital asset transfers enable a recipient to receive units of an alternative digital asset different than the digital asset specified by the sender for the digital asset transfer. As a result of preemptively, intelligently, and automatically identifying alternative digital asset transfers for the recipient, the need for a recipient to communicate repeatedly with the system to identify and select an alternative digital asset is obviated, and computing and processing resources for the system are conserved.

Various embodiments provide additional technical advantages in the use of current and accurate account data for end users involved in a digital asset transfer. When an inbound digital asset transfer is requested by a first end user, account data is retrieved and/or received for each of the first end user and the second end user. As the second end user may respond to the request after some amount of time, the account data that was retrieved and/or received may become outdated. An account refresh time period and an associated automated timing trigger is configured such that response by the second end user outside of the account refresh time period causes new account data to be retrieved and/or retrieved in order to ensure accuracy of account data.

In accordance with one aspect, a computer-implemented method is provided. The method includes receiving, at an application programming interface, a data object originating from a first client device associated with a first end user and defining a digital asset transfer between the first end user and a second end user. The data object indicates a digital asset and a defined number of digital asset units for the digital asset transfer. The method further includes retrieving a first account balance data object corresponding to a first digital asset user account associated with the first end user and a second account balance data object corresponding to a second digital asset user account associated with the second end user. The method further includes, responsive to determining that the digital asset transfer satisfies one or more transfer conditions, executing the digital asset transfer by executing a first closed-loop transaction to debit a first number of digital asset units from the first digital asset user account associated with the first end user, and executing a second closed-loop transaction to credit a second number of digital asset units to the second digital asset user account associated with the second end user. The first number of digital asset units and the second number of digital asset units are each determined based at least in part on the defined number of digital asset units. The method further includes updating the first account balance data object to describe a resulting balance of the first digital asset user account from the first closed-loop transaction and updating the second account balance data object to describe a resulting balance of the second digital asset user account from the second closed-loop transaction.

In various embodiments, the data object is received in response to a transfer initiation query provided to the first client device associated with the first end user at a first timepoint, and the transfer initiation query is provided as a request by the second end user for the defined number of digital asset units. In various embodiments, the first account balance data object and the second account balance data object are retrieved based at least in part on a determination that a configurable account refresh time period has elapsed between the first timepoint and the time at which the data object is received.

In various embodiments, the method further includes identifying one or more alternative digital assets different than the digital asset indicated by the data object based at least in part on behavioral data associated with the second end user and indicating the one or more alternative digital assets to the second end user. In various embodiments, the data object further indicates a particular alternative digital asset based at least in part on a selection by the second end user, and the second number of digital asset units credited to the second digital asset account are of the particular alternative digital asset.

In various embodiments, the first account balance data object is retrieved using a first identifier token associated with the first end user, and the second account balance data object is retrieved using a second identifier token associated with the second end user. In various embodiments, the one or more transfer conditions are identified based at least in part on retrieving the first account balance data object and the second account balance data object, and the one or more transfer conditions comprise a balance sufficiency of the first digital asset user account and/or a maximum unit limit for a digital asset transfer. In various embodiments, the defined number of digital asset units is based at least in part on a user-specified number of fiat currency units and a conversion rate between the digital asset and a fiat currency. In various embodiments, the first digital asset user account and the second digital asset user account are both associated with a closed-loop environment for the digital asset.

In accordance with another aspect, a system is provided. The system includes one or more memory storage areas and one or more processors. The system is configured for receiving a data object originating from a first client device associated with a first end user and defining a digital asset transfer between the first end user and a second end user. The data object indicates a digital asset and a defined number of digital asset units for the digital asset transfer. The system is further configured for retrieving a first account balance data object corresponding to a first digital asset user account associated with the first end user and a second account balance data object corresponding to a second digital asset user account associated with the second end user. The system is further configured for, responsive to determining that the digital asset transfer satisfies one or more transfer conditions, executing the digital asset transfer by executing a first closed-loop transaction to debit a first number of digital asset units from the first digital asset user account associated with the first end user and executing a second closed-loop transaction to credit a second number of digital asset units to the second digital asset user account associated with the second end user. The first number of digital asset units and the second number of digital asset units are each determined based at least in part on the defined number of digital asset units. The system is further configured for updating the first account balance data object to describe a resulting balance of the first digital asset user account from the first closed-loop transaction and updating the second account balance data object to describe a resulting balance of the second digital asset user account from the second closed-loop transaction.

In various embodiments, the data object is received in response to a transfer initiation query provided to the first client device associated with the first end user at a first timepoint, and the transfer initiation query is provided as a request by the second end user for the defined number of digital asset units. In various embodiments, the first account balance data object and the second account balance data object are retrieved based at least in part on a determination that a configurable account refresh time period has elapsed between the first timepoint and the time at which the data object is received.

In various embodiments, the system is further configured for identifying one or more alternative digital assets different than the digital asset indicated by the data object based at least in part on behavioral data associated with the second end user and indicating the one or more alternative digital assets to the second end user. In various embodiments, the data object further indicates a particular alternative digital asset based at least in part on a selection by the second end user, and the second number of digital asset units credited to the second digital asset account are of the particular alternative digital asset.

In various embodiments, the first account balance data object is retrieved using a first identifier token associated with the first end user, and the second account balance data object is retrieved using a second identifier token associated with the second end user. In various embodiments, the one or more transfer conditions are identified based at least in part on retrieving the first account balance data object and the second account balance data object, and the one or more transfer conditions comprise a balance sufficiency of the first digital asset user account and/or a maximum unit limit for a digital asset transfer. In various embodiments, the defined number of digital asset units is based at least in part on a user-specified number of fiat currency units and a conversion rate between the digital asset and a fiat currency. In various embodiments, the first digital asset user account and the second digital asset user account are both associated with a closed-loop environment for the digital asset.

In accordance with yet another aspect, a computer program product is provided. The computer program product includes at least one non-transitory computer-readable storage medium having computer-readable program code portions stored therein. The computer-readable program code portions include executable portions configured for receiving a data object originating from a first client device associated with a first end user and defining a digital asset transfer between the first end user and a second end user. The data object indicates a digital asset and a defined number of digital asset units for the digital asset transfer. The computer-readable program code portions include executable portions configured for further retrieving a first account balance data object corresponding to a first digital asset user account associated with the first end user and a second account balance data object corresponding to a second digital asset user account associated with the second end user. The computer-readable program code portions include executable portions configured for further, responsive to determining that the digital asset transfer satisfies one or more transfer conditions, executing the digital asset transfer by executing a first closed-loop transaction to debit a first number of digital asset units from the first digital asset user account associated with the first end user and executing a second closed-loop transaction to credit a second number of digital asset units to the second digital asset user account associated with the second end user. The first number of digital asset units and the second number of digital asset units are each determined based at least in part on the defined number of digital asset units. The computer-readable program code portions include executable portions configured for further updating the first account balance data object to describe a resulting balance of the first digital asset user account from the first closed-loop transaction and updating the second account balance data object to describe a resulting balance of the second digital asset user account from the second closed-loop transaction.

In various embodiments, the data object is received in response to a transfer initiation query provided to the first client device associated with the first end user at a first timepoint, and the transfer initiation query is provided as a request by the second end user for the defined number of digital asset units. In various embodiments, the first account balance data object and the second account balance data object are retrieved based at least in part on a determination that a configurable account refresh time period has elapsed between the first timepoint and the time at which the data object is received.

In various embodiments, the computer-readable program code portions include executable portions configured for further identifying one or more alternative digital assets different than the digital asset indicated by the data object based at least in part on behavioral data associated with the second end user and indicating the one or more alternative digital assets to the second end user. In various embodiments, the data object further indicates a particular alternative digital asset based at least in part on a selection by the second end user, and the second number of digital asset units credited to the second digital asset account are of the particular alternative digital asset.

In various embodiments, the first account balance data object is retrieved using a first identifier token associated with the first end user, and the second account balance data object is retrieved using a second identifier token associated with the second end user. In various embodiments, the one or more transfer conditions are identified based at least in part on retrieving the first account balance data object and the second account balance data object, and the one or more transfer conditions comprise a balance sufficiency of the first digital asset user account and/or a maximum unit limit for a digital asset transfer. In various embodiments, the defined number of digital asset units is based at least in part on a user-specified number of fiat currency units and a conversion rate between the digital asset and a fiat currency. In various embodiments, the first digital asset user account and the second digital asset user account are both associated with a closed-loop environment for the digital asset.

BRIEF DESCRIPTION OF THE DRAWING(S)

Having thus described the present disclosure in general terms, reference will now be made to the accompanying drawings, which are not necessarily drawn to scale, and wherein:

Figure 4A:
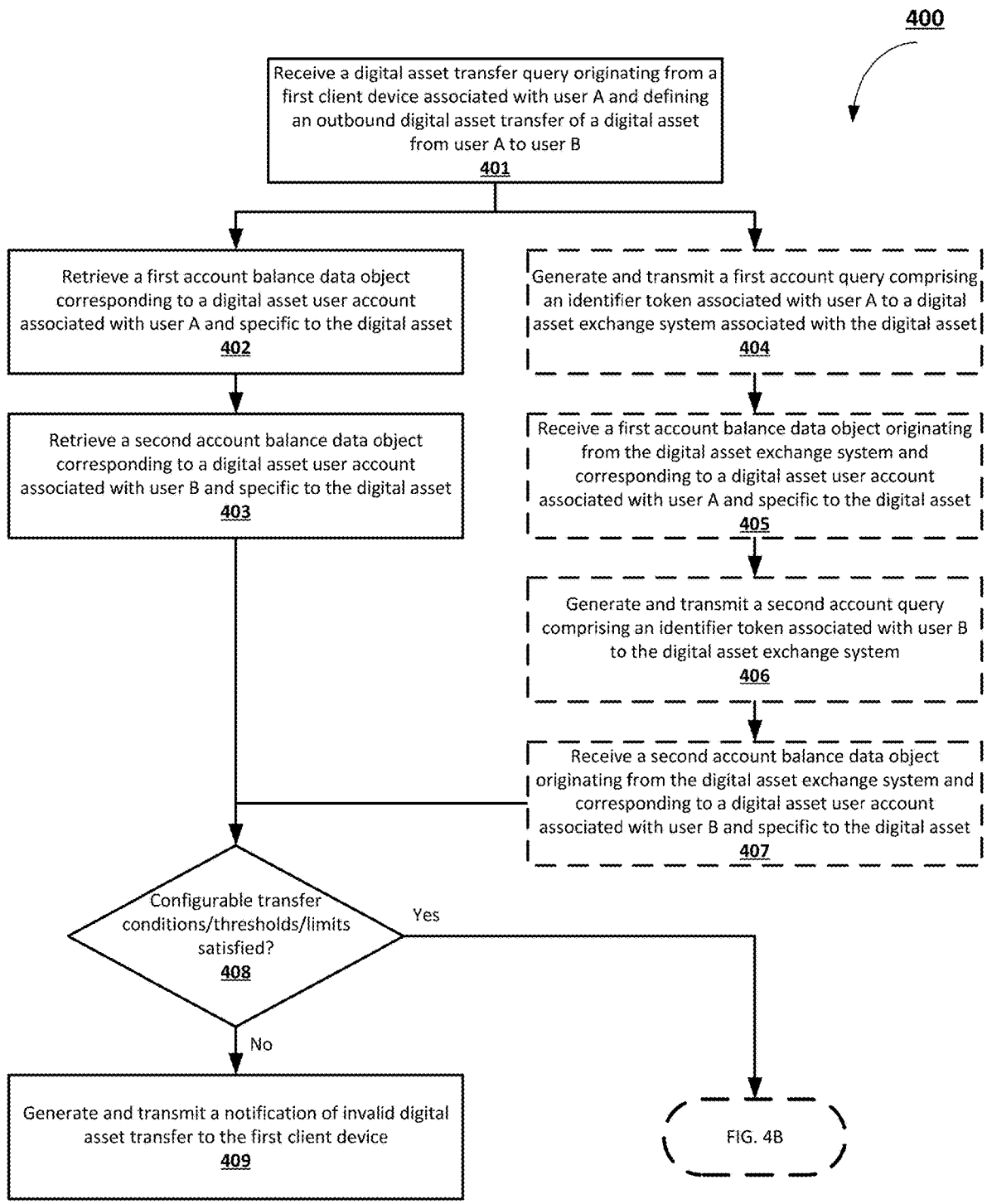
Figure 4B:
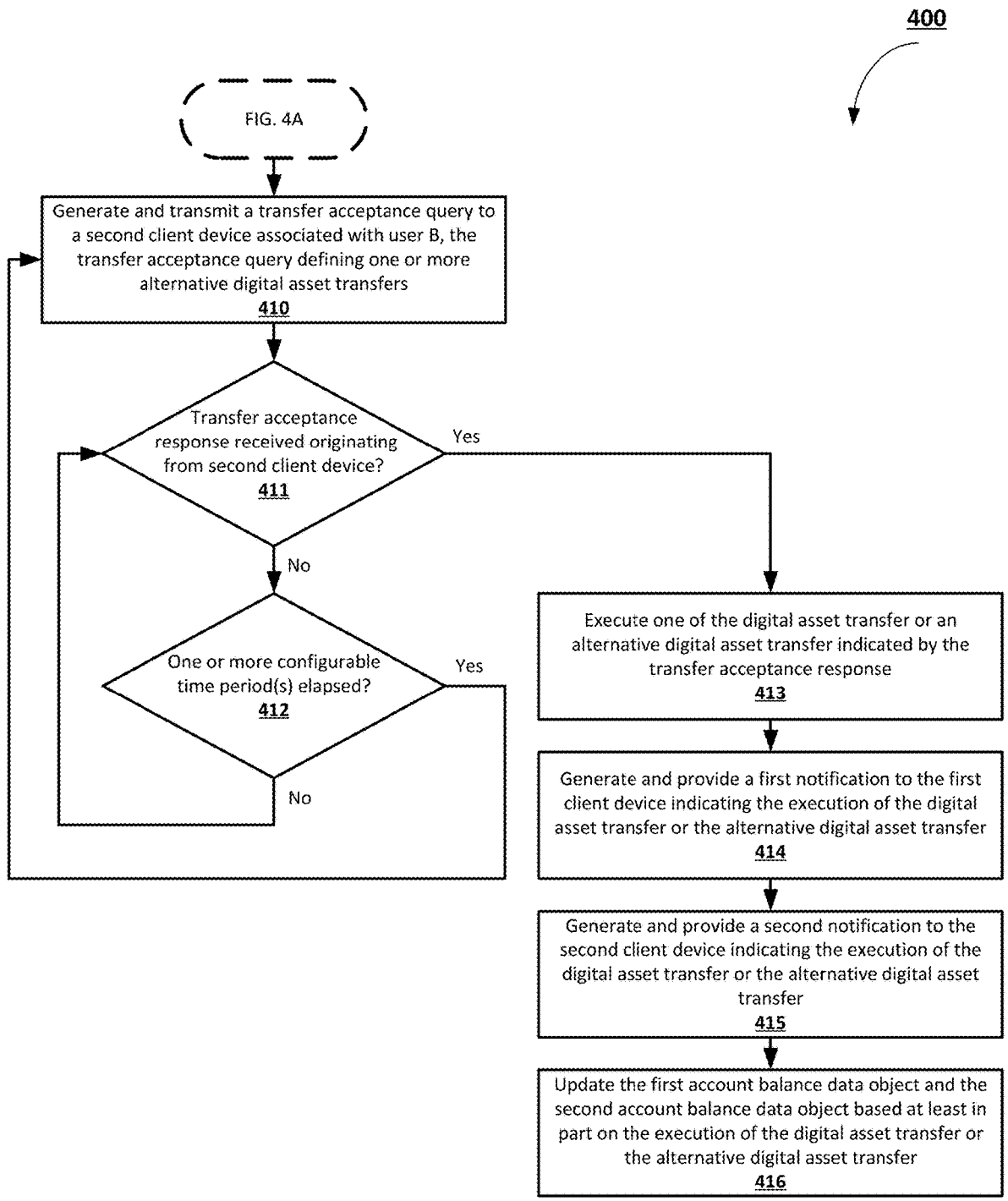
Figure 5A:
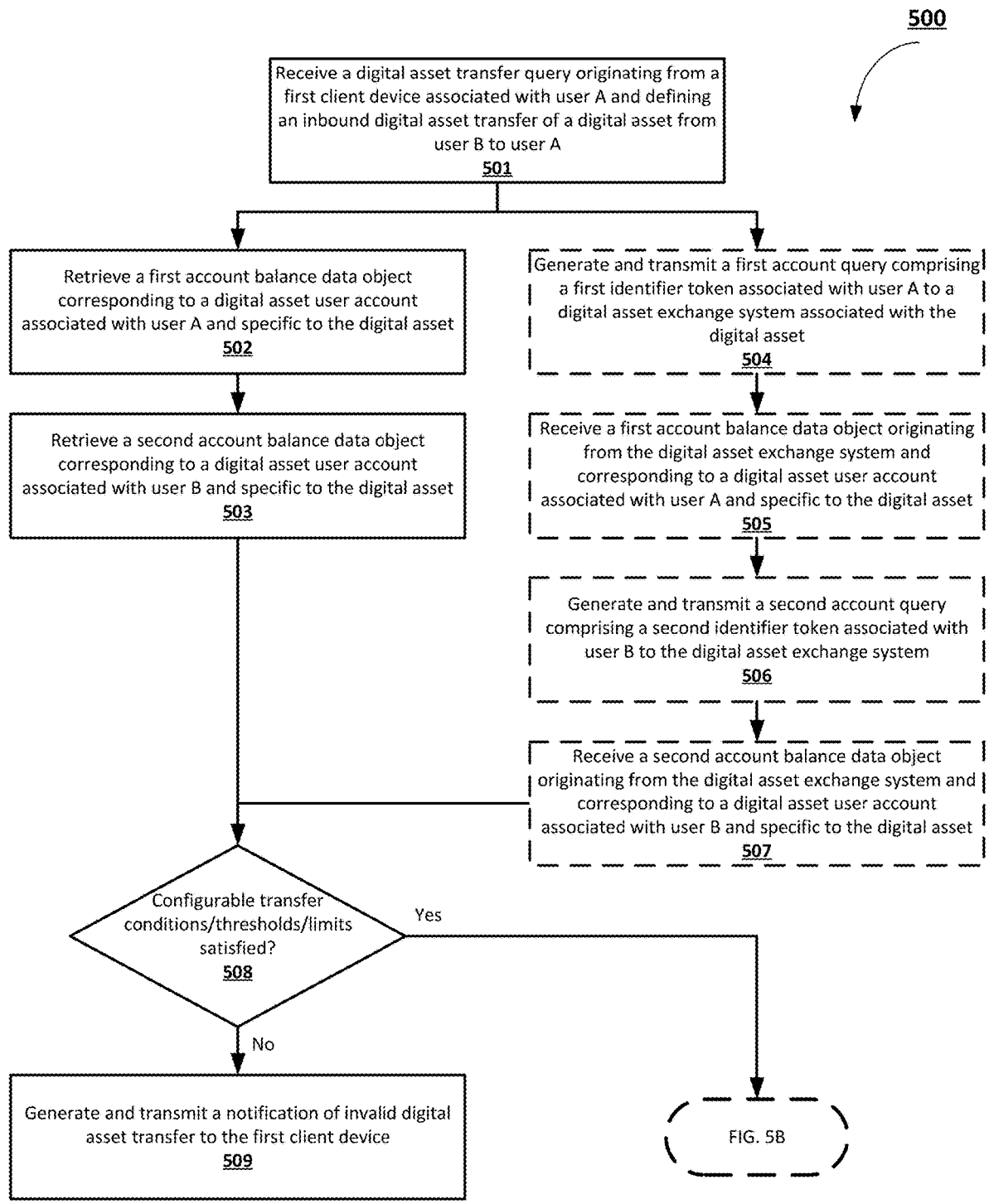
Figure 5B:
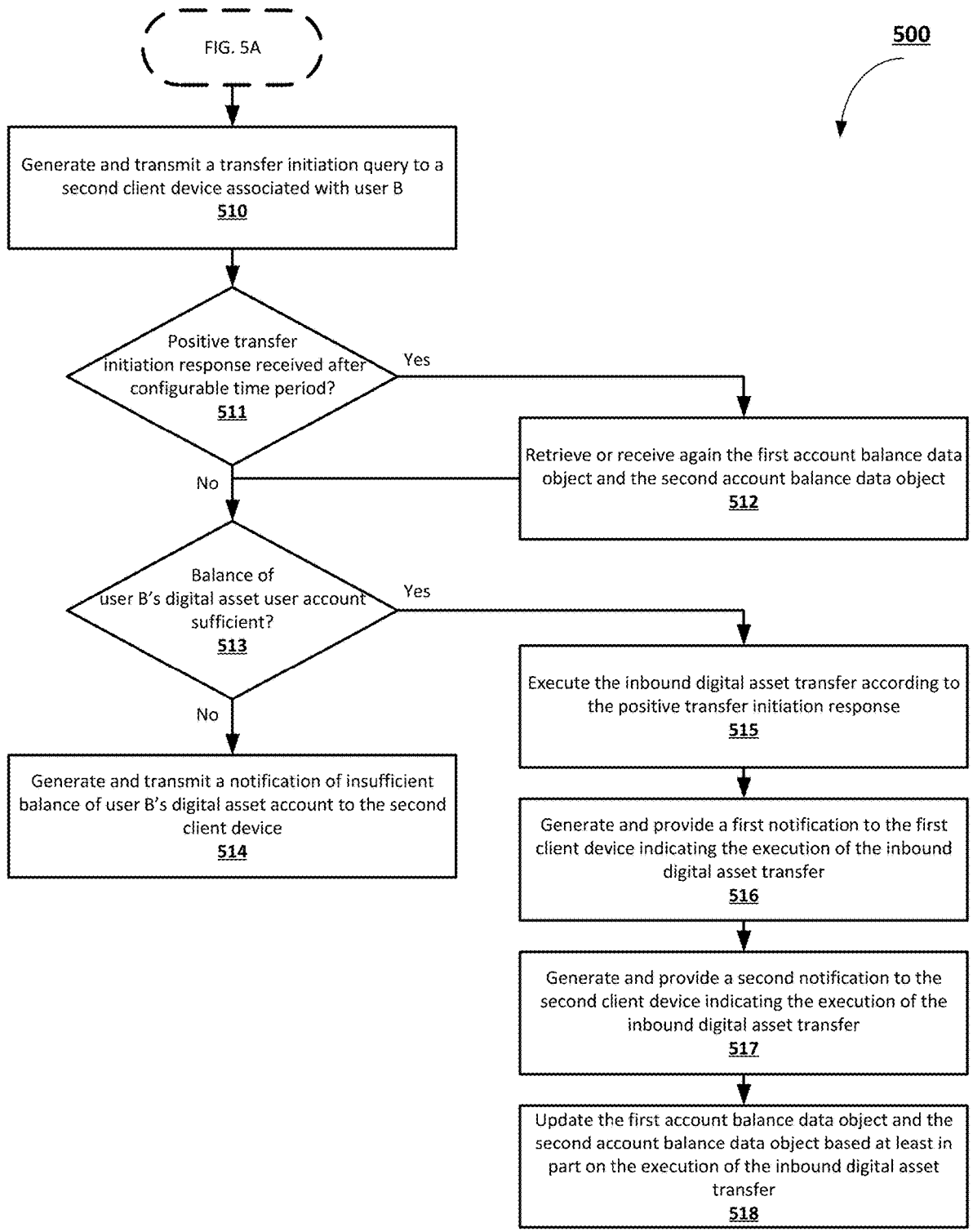
Figure 6:
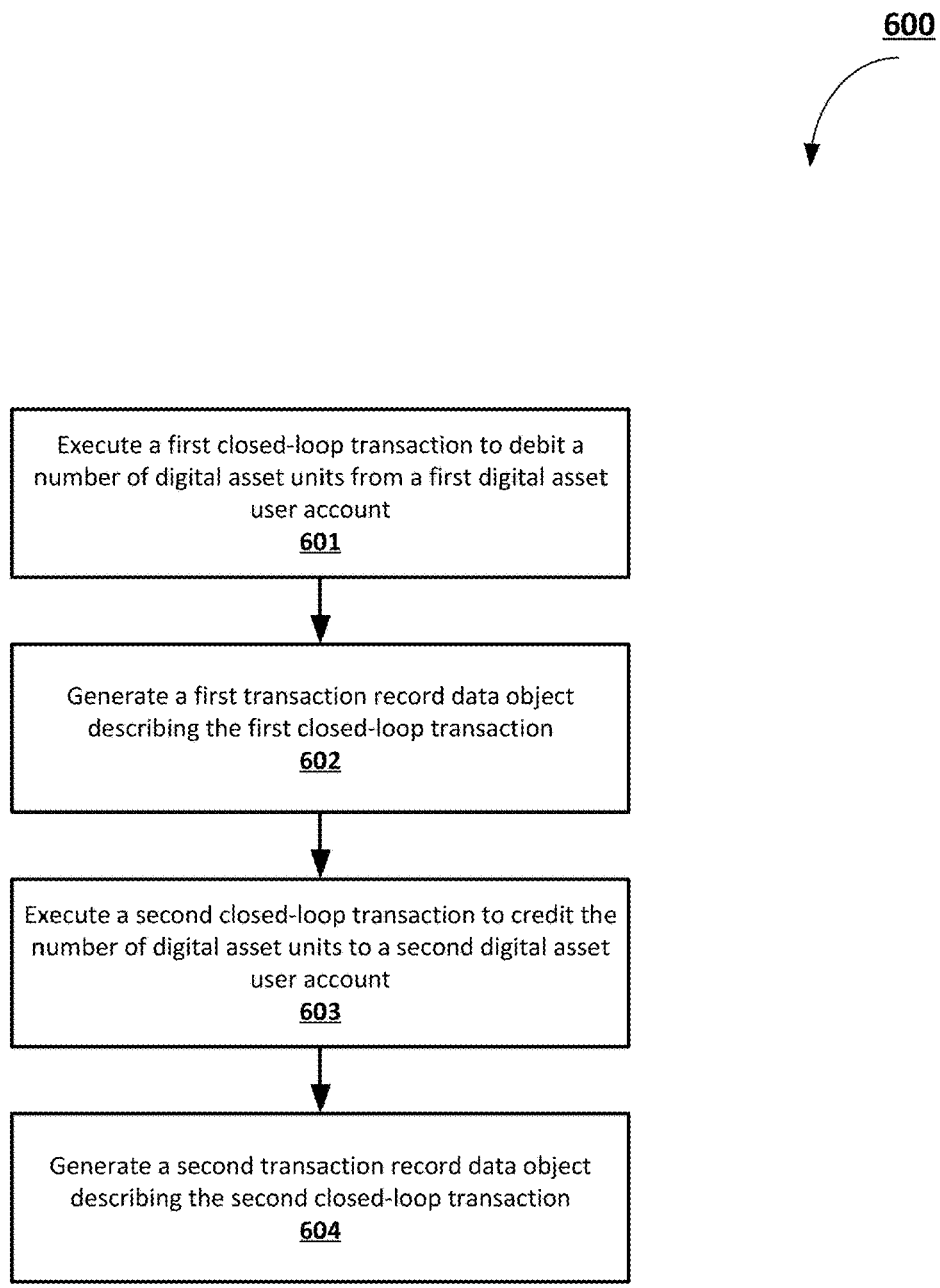
Figure 7:
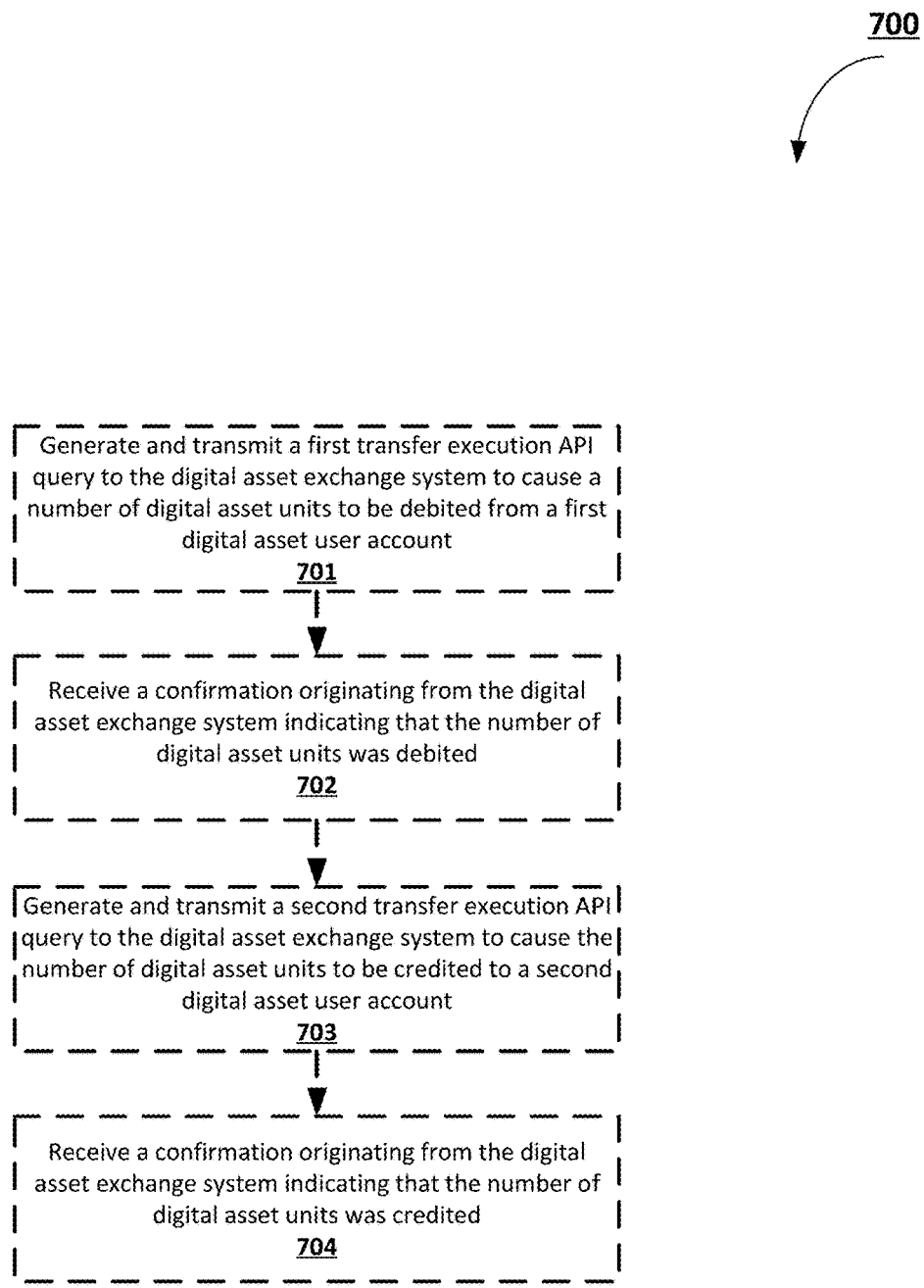
Figure 8:
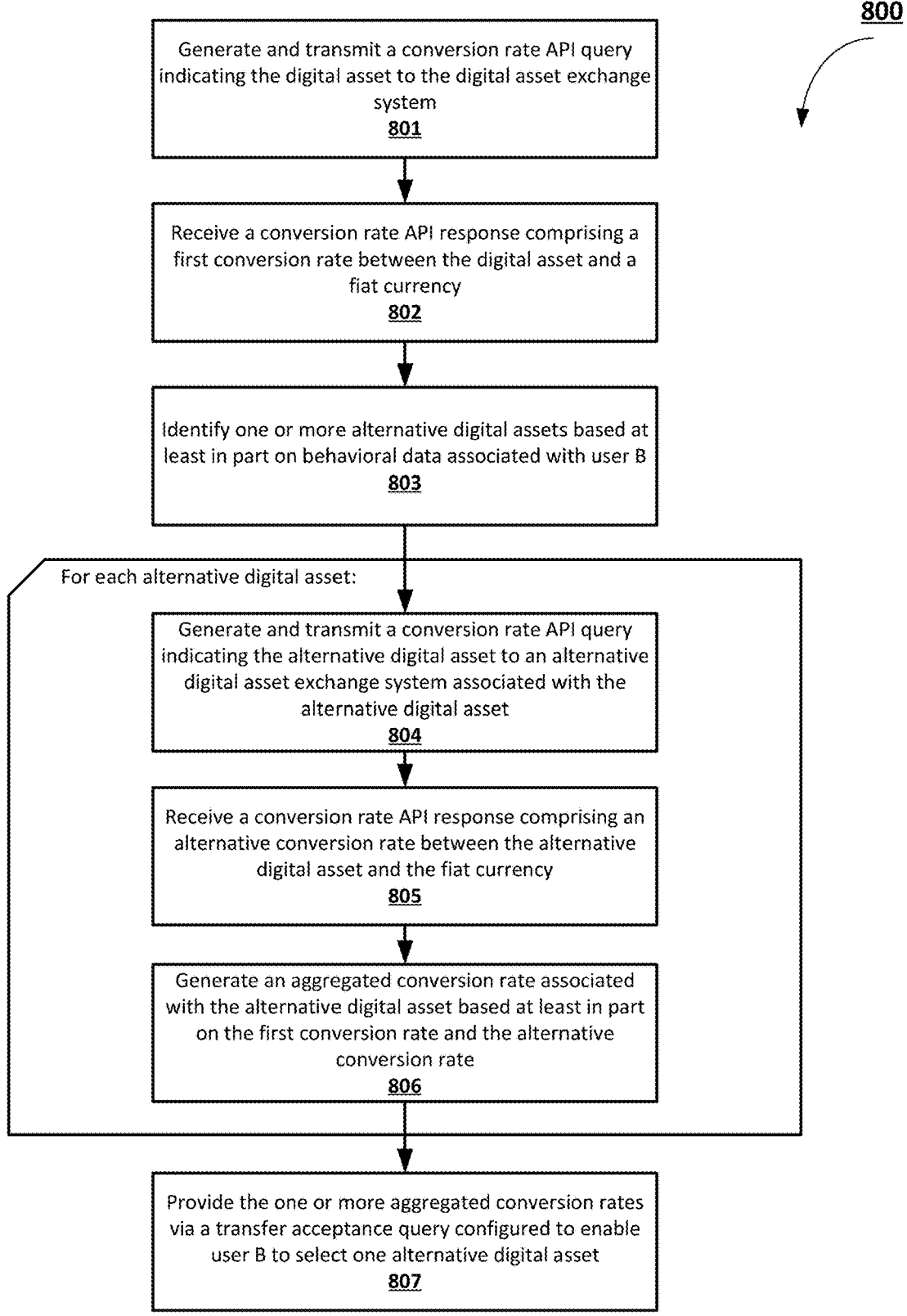
Figure 9A:
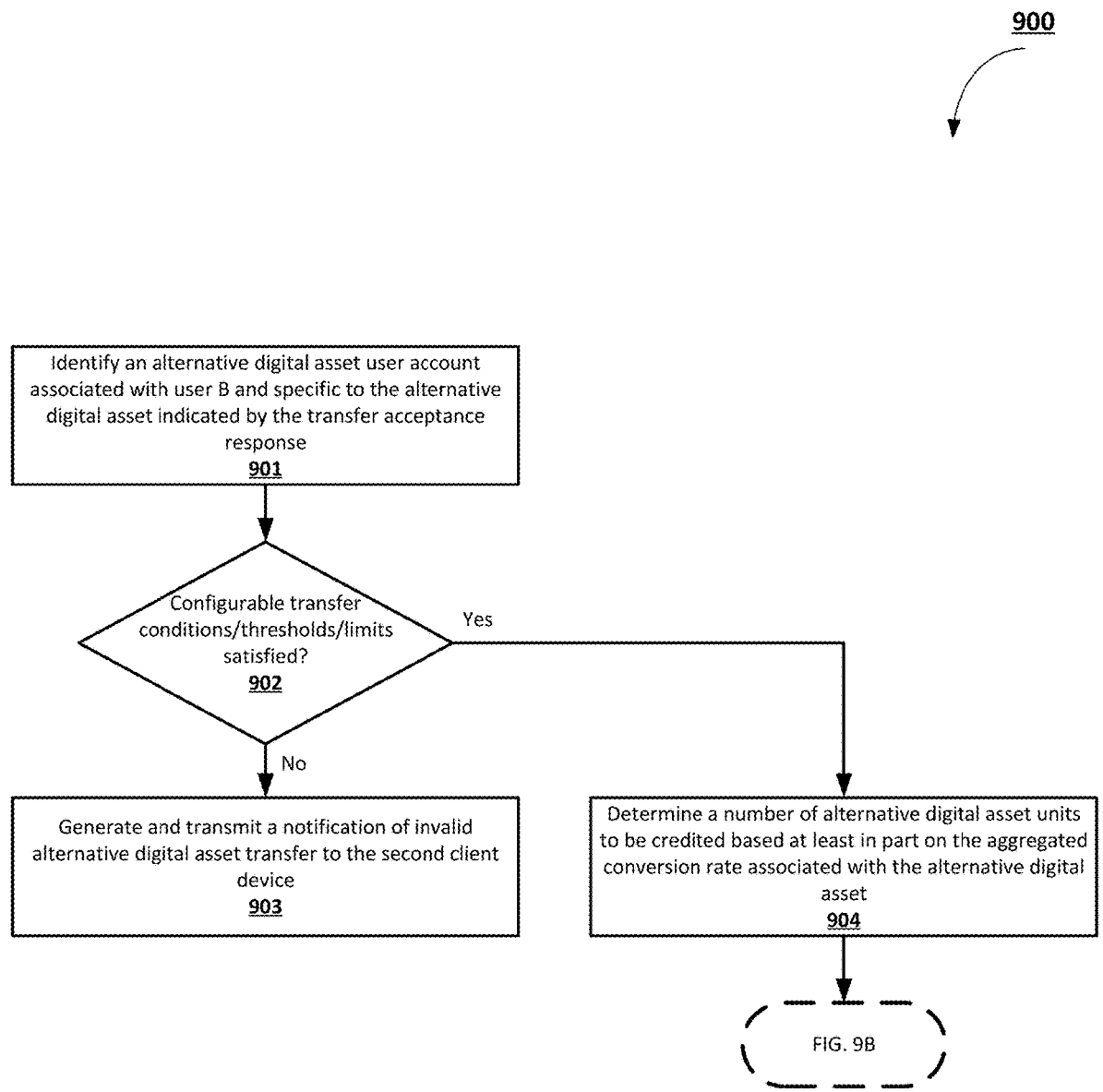
Figure 9B:
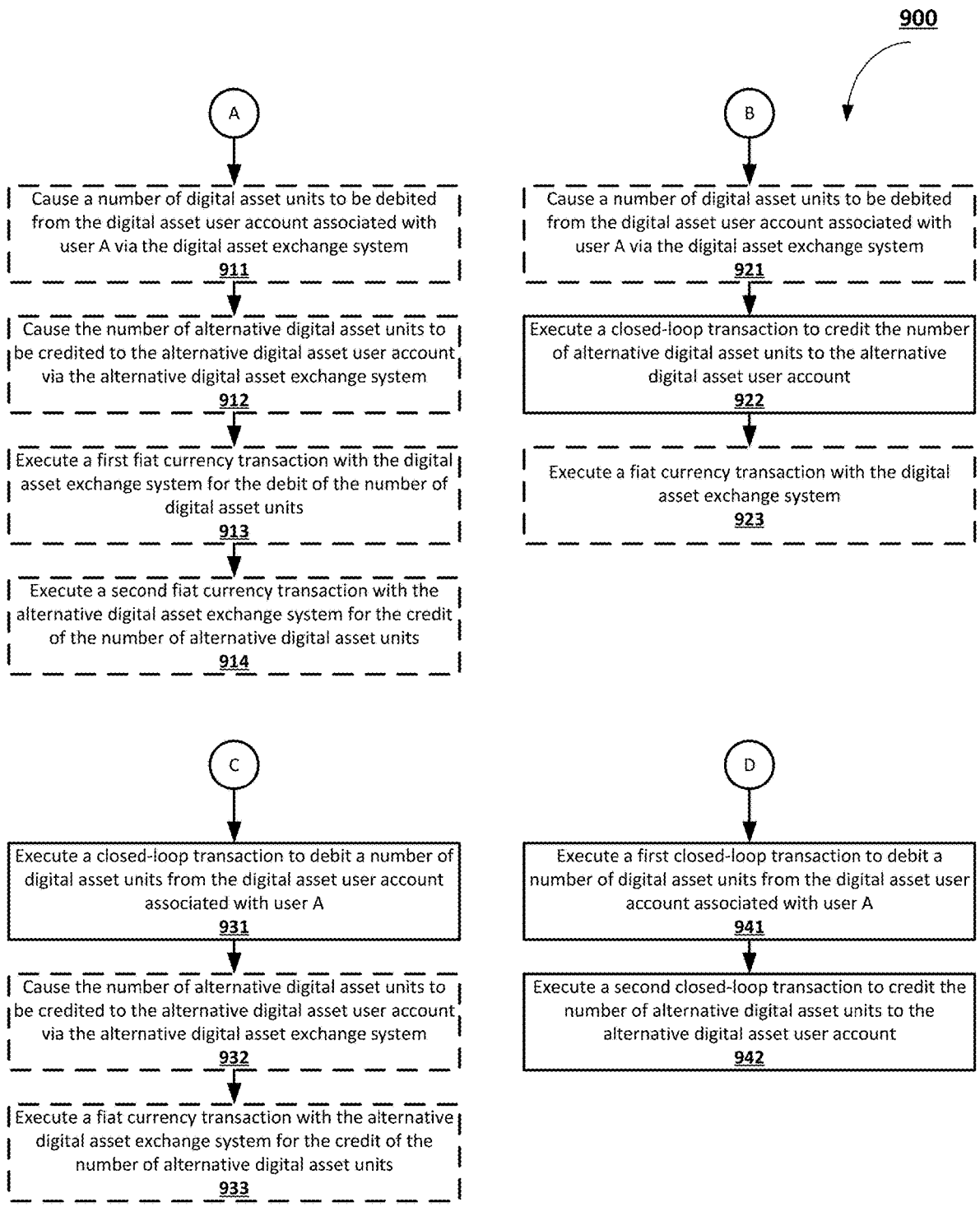

FIG. 4A and FIG. 4B provide flowchart diagrams of an example process enabling a first end user to transfer (e.g., send) units of a digital asset to a second end user, in accordance with various embodiments of the present disclosure;

FIG. 5A and FIG. 5B provide flowchart diagrams of an example process enabling a first end user to request and to receive units of a digital asset from a second end user, in accordance with various embodiments of the present disclosure;

FIG. 6 provides a flowchart diagram of an example process for executing a digital asset transfer of an internally-custodied digital asset, in accordance with various embodiments of the present disclosure;

FIG. 7 provides a flowchart diagram of an example process for executing a digital asset transfer of an externally-custodied digital asset, in accordance with various embodiments of the present disclosure;

FIG. 8 provides a flowchart diagram of an example process for identifying and providing alternative digital asset transfer choices, in accordance with various embodiments of the present disclosure;

FIG. 9A and FIG. 9B provide flowchart diagrams of an example process for executing an alternative digital asset transfer, in accordance with various embodiments of the present disclosure;

FIGS. 10-13 provide example user interfaces enabling a first end user to transfer units of a digital asset to a second end user, in accordance with various embodiments of the present disclosure; and FIGS. 14-17 provide example user interfaces enabling a first end user to request and to receive units of a digital asset from a second end user, in accordance with various embodiments of the present disclosure.

DETAILED DESCRIPTION OF SOME
EXAMPLE EMBODIMENTS

Various embodiments of the present disclosure now will be described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. General Overview and Technical Advantages

Various embodiments of the present disclosure are generally directed to enabling and executing digital asset transfers between two end users each associated with a client device. A first end user may define an outbound digital asset transfer involving digital asset units being credited to a second end user or may alternatively define an inbound digital asset transfer requesting that the first end user be credited with digital asset units from the second end user. Various embodiments enable both digital asset transfers involving internally-custodied digital assets and digital asset transfers involving externally-custodied digital assets to be defined and executed. For a digital asset transfer involving an internally-custodied digital asset, execution of the digital asset transfer involves the execution of an off-chain debit transaction (e.g., a sub-ledger adjustment) for a first end user and the execution of an off-chain credit transaction (e.g., a sub-ledger adjustment) for a second end user. For a digital asset transfer involving an externally-custodied digital asset, execution of the digital asset transfer involves generation and transmission of a first transfer execution API query to a digital asset exchange system to identify a first digital asset user account and to cause a number of digital asset units to be debited from the first digital asset user account. The execution of the digital asset transfer involving an externally-custodied digital asset further involves generation and transmission of a second transfer execution API query to the digital asset exchange system to identify a second digital asset user account and to cause the same number of digital asset units to be credited to the second digital asset user account.

Various embodiments enabling and executing digital asset transfers provide various technical advantages and solutions to technical challenges. With regard to the execution of a digital asset transfer involving an internally-custodied digital asset, closed-loop transactions to debit and/or credit digital asset units are executed to enable faster processing of the digital asset transfer and to result in the recipient of the digital asset transfer being credited with digital asset units within milliseconds and/or seconds. Closed-loop transactions within a closed-loop environment involve and are managed by the central operating or managing entity of the closed-loop environment, and such centralization ensures efficient processing (e.g., by obviating external communication for processing and validation), improved security (e.g., decreasing the amount of involved parties, such as for validation), and improved accuracy. For example, closed-loop transactions within closed-loop environments for cryptoassets and cryptocurrency digital assets are off-chain transactions that enable fast and efficient processing compared to on-chain transactions that inherently involve publication of transaction information and validation of the on-chain transaction by a large number of parties (e.g., occurring on a scale of hours and/or days) and compromising the privacy and confidentiality of the parties involved. Thus, digital asset transfers for an internally-custodied digital asset are accomplished via closed-loop transactions (e.g., off-chain transactions) within a closed-loop environment for the internally-custodied digital asset. Thus, a central operating entity and/or management system is configured to execute closed-loop transactions with end users within the closed-loop environment and to process digital asset transfers involving the internally-custodied digital asset without the need to publicize such transactions and request validation from multiple parties.

For externally-custodied digital assets, efficient communication with external systems to cause the debit and/or the credit of units of an externally custodied digital asset is performed in various embodiments of the present disclosure. For example, a transfer execution API query that identifiers a digital asset user account and defines a number of digital asset units to debit or to credit is generated and transmitted to an external system that manages the externally-custodied digital asset and corresponding digital asset user accounts. Such transfer execution API queries are lightweight and promptly communicated, extending the efficiency of digital asset transfers in various embodiments.

In various embodiments, the lightweight nature of transfer execution API queries and other communications with external systems is due in part to identifier tokens configured to identify end users. Specifically, each end user is associated with an identifier token, and the identifier token identifies one or more digital asset user accounts associated with (e.g., owned by) the end user. In doing so, the identifier token is federated, global, universal, and/or the like, as the identifier token identifies digital asset user accounts that may be managed by different external systems. Accordingly, the identifier token is configured to be recognizable and processed by different external systems. This configuration and use of identifier tokens conserves computing and processing resources that would be otherwise used to individually identify each digital asset user account for an end user according to different processing or identification protocols for different external systems.

Various embodiments of the present disclosure are also configured to improve accuracy of user account data used during execution of a digital asset transfer. In particular, accuracy of user account data is relevant for inbound digital asset transfers requested by a first end user, in which a second end user may respond and initiate the inbound digital asset transfer to the first end user after some amount of time. To define the inbound digital asset transfer and provide the request to the second end user, user account data is retrieved and/or received for each end user. User account data is needed again for the execution of the inbound digital asset transfer; however, the user account data may become outdated and inaccurate while the second end user responds to the request. Accordingly, configurable time periods and timing triggers are used to determine whether new user account data should be retrieved and/or received, thereby allowing for the most current and up-to-date user account data to be used for the execution of the inbound digital asset transfer.

Various embodiments further include identifying and providing alternative digital asset transfer to a recipient of a digital asset transfer (e.g., the end user to be credited with digital asset units). Such alternative digital asset transfers provide optionality and choice to a recipient, such as in instances when the recipient does not desire the digital asset indicated by the sender. In various embodiments, alternative digital assets for the alternative digital asset transfers are intelligently identified based at least in part on predicted interest by the recipient. The alternative digital asset transfers are further preemptively prepared such that an alternative digital asset transfer is efficiently executed upon selection by the recipient. Accordingly, various embodiments relating to alternative digital asset transfers enable system resources to be conserved by obviating the need for the system to handle multiple repeated requests for information regarding other digital assets from the recipient when the recipient does not desire the digital asset indicated by the sender. For example, the number of user interactions and the network communication traffic are both reduced through the intelligent identification and preemptive providing of alternative digital asset transfers.

II. Exemplary Definitions

The term "digital asset" may generally refer to any data entity that is perceived to hold value (e.g., transactional value). Examples of digital assets include a cryptoasset or cryptocurrency, a liability digital asset (e.g., vendor/merchant loyalty or reward points), an in-game asset or ecosystem-specific asset (e.g., a video game cosmetic item), and/or the like. A digital asset unit of a digital asset may be understood as a quantification or basis of the digital asset, such as an individual Bitcoin (BTC), one vender/merchant loyalty point, and/or the like, and for various digital assets, a total supply of the digital asset includes multiple digital asset units (e.g., number of digital asset units in circulation).

A digital asset may be quantified, managed, transacted, converted, exchanged, transferred and/or the like based at least in part on full and/or fractional units. For example, a digital asset transaction may involve one BTC unit, two BTC units, one-hundred BTC units, and/or the like (full units), while another digital asset transaction may involve 0.4 BTC units, 1.5 BTC units, 0.0150 BTC units, and/or the like (fractional units). A digital asset may also be a single-unit digital asset, such as a non-fungible token (NFT) or an ownership token, for which only one digital asset exists in circulation. The value held by a digital asset and an associated right to use the digital asset enable the digital asset to be used for purchasing goods and services, exchanging for fiat currency, and/or the like. A digital asset may be a strictly digital construct and may not exist in a physical state.

The term "fiat currency" may refer to a currency that is not necessarily related to or backed by a physical commodity. A fiat currency may be centrally managed and distributed by a central entity. Examples of fiat currencies may include U.S. dollars (USD, $), European Union (EU) euros, Chinese yen, English pounds, and/or the like that are managed and distributed by respective governments. The central entity managing a fiat currency may have the authority to increase and/or decrease the supply of a fiat currency. A fiat currency has an inherent and accepted transactional value, which may be based at least in part on a relationship between the supply of the fiat currency and the demand of the fiat currency. Thus, the value of fiat currency is managed by a central entity. The value of fiat currency may be used as a reference for evaluating a variable value of a digital asset. A fiat currency may be quantified by fiat currency units. For example, one unit of the U.S. dollar fiat currency may be understood as a single dollar. Value of various digital assets and other purchased goods or services may be described by an amount of fiat currency units.

The term "digital asset transfer" may generally refer to a change in digital asset ownership for two end users, parties, entities, and/or the like for a digital asset. A digital asset transfer may represent a number of digital asset units being paid, gifted, given, and/or the like from one end user to another. Each end user of the digital asset transfer holds and owns a balance of digital asset units in a digital asset user account, and various embodiments enable and execute a digital asset transfer based at least in part on debiting (e.g., removing, deducting, subtracting) a number of digital asset units from a first digital asset user account associated with a first end user and crediting the same number of digital asset units to a second digital asset user account associated with a second end user. Accordingly, the number of digital asset units is effectively "transferred" from the first end user to the second end user. In various embodiments, a digital asset transfer is defined as being an inbound digital asset transfer or an outbound digital asset transfer relative to the end user initiating the digital asset transfer. For example, an inbound digital asset transfer involves the first end user requesting digital asset units from the second end user, while an outbound digital asset transfer involves the first end user sending digital asset units to the second end user.

The term "internally-custodied digital asset" may refer to a digital asset that is managed by a system configured to enable and execute digital asset transfers according to various embodiments of the present disclosure. Specifically, management of a digital asset may involve issuance of digital asset units, generation and management of digital asset user accounts specific to the digital asset (e.g., having balances of units of the digital asset), redemption of digital asset units for goods and services, and/or the like. Thus, in various embodiments of the present disclosure, a system configured to enable and execute digital asset transfers is also configured to manage one or more internally-custodied digital assets, such as by debiting and/or crediting units of an internally-custodied digital asset from and/or to digital asset user accounts specific to the internally-custodied digital asset. In some instances, an internally-custodied digital asset is managed and distributed within a closed-loop environment or ecosystem managed by the system configured to enable and execute digital asset transfers according to various embodiments of the present disclosure.

The term "closed-loop environment" may describe an environment, ecosystem, system, platform, economy, and/or the like within which a total circulation supply of a digital asset is distributed among parties of the closed-loop digital asset environment. Accordingly, parties of the closed-loop environment may purchase or sell digital asset units with other parties within the closed-loop environment, while the total circulation supply of the digital asset remains relatively fixed. Digital asset transfers between different parties of the closed-loop environment may then represent a re-distribution of digital asset units among the parties of the closed-loop environment. A closed-loop environment is managed by a central operating or managing entity that may increase or decrease the total circulation supply of the digital asset via transactions with external systems, may oversee and/or execute transfers of digital assets within the closed-loop environment, may repossess digital asset units into a central operating account upon debit or redemption of the digital asset units by a party, and/or the like. Meanwhile, parties of the closed-loop environment may be restricted from transacting with the digital asset (e.g., purchasing, selling) externally from the closed-loop environment.

The term "closed-loop transaction" may describe a movement, a redistribution, an exchange, and/or the like of digital assets within a closed-loop environment. In general, a closed-loop transaction may be a debit of digital asset units from a digital asset user account in the closed-loop environment or a credit of digital asset units to a digital asset user account in the closed-loop environment. A closed-loop transaction that is a debit of digital asset units from a digital asset user account involves moving digital asset units from the digital asset user account to a central operating account (e.g., a reserve) of the closed-loop environment, while a closed-loop transaction that is a credit of digital asset units to a digital asset user account involves moving digital asset units from the central operating account to the digital asset user account. A closed-loop transaction is bounded by the closed-loop environment and does not involve parties external to the closed-loop environment. An example of a closed-loop transaction is an off-chain transaction of a cryptoasset or a cryptocurrency digital asset.

The term "externally-custodied digital asset" may refer to a digital asset that is managed by an external system different than the system via which end users request digital asset transfers. In contrast to internally-custodied digital assets, externally-custodied digital assets may not be managed by the system configured to enable and execute digital asset transfers according to various embodiments of the present disclosure. Transactions for an externally-custodied digital asset may be executed via communication between the system via which an end user has requested a digital asset transfer and the external system managing the externally-custodied digital asset.

The term "on-chain transaction" may describe a decentralized transaction for a digital asset that is executed and recorded on a distributed ledger (e.g., a blockchain). On-chain transactions are particularly relevant to cryptoassets, cryptocurrencies, and/or other digital assets managed in a decentralized manner. In various examples, on-chain transactions are executed by committing an on-chain transaction record data object to a distributed ledger. By way of decentralization, the on-chain transaction is processed (e.g., verified) by each participating party of the distributed ledger.

The term "on-chain transaction record data object" may refer to a data entity configured to describe an on-chain transaction. An on-chain transaction record data object is committed to a distributed ledger for processing (e.g., authentication, verification, validation, acceptance) of the on-chain transaction. An on-chain transaction record data object is configured to describe at least a number of digital asset units of the on-chain transaction, the nature of the on-chain transaction (e.g., purchase of digital asset units, sale of digital asset units), the time of transaction, the sender of the digital asset units, the recipient of the digital asset units, and/or the like. In various examples, an on-chain transaction record data object identifies the sender and recipient via cryptographic keys and/or key references associated with each of the sender and recipient (e.g., a Bitcoin public key). In various examples, an on-chain transaction record data object comprises one or more hash values enabling the authenticity and security of the on-chain transaction record data object to be publicly verified.

The term "off-chain transaction" may describe a transaction of a digital asset not recorded on a distributed ledger (e.g., a blockchain). As such, the off-chain transaction may be processed, agreed upon, verified, and/or the like by entities involved in the off-chain transaction, but the off-chain transaction may be unknown to participants of the distributed ledger who are not involved in the off-chain transaction. An off-chain transaction may rely on external validation methods, as an off-chain transaction is not recorded on a distributed ledger and may not be verified or validated based at least in part on distributed ledger public key values and/or distributed ledger private key values. In some aspects, an off-chain transaction is an example of a closed-loop transaction in a closed-loop environment for a cryptoasset or a cryptocurrency digital asset.

The term "off-chain transaction record data object" may refer to a data entity configured to describe an off-chain transaction. An off-chain transaction record data object is generated and primarily relevant to entities involved in the off-chain transaction. In various instances, an off-chain transaction record data object is not committed to a distributed ledger. An off-chain transaction record data object is configured to describe at least a number of digital asset units of the off-chain transaction, the nature of the off-chain transaction (e.g., purchase of digital asset units, sale of digital asset units), the time of transaction, the sender of digital asset units, the recipient of the digital asset units, and/or the like. As the off-chain transaction record data object serves to record the off-chain transaction for entities involved in the off-chain transaction, the off-chain transaction record data object identifies the sender and/or the recipient via internal identifiers recognized by the entities involved in the off-chain transaction. Thus, in some embodiments, the off-chain transaction record data object does not include cryptographic keys and/or key references configured to identify entities within a distributed ledger.

The term "alternative digital asset" may refer to a digital asset different from a digital asset involved in a digital asset transfer. As previously discussed, a digital asset transfer may represent a number of units of a digital asset being paid, gifted, given, and/or the like from a first end user to a second end user. Various embodiments of the present disclosure enable the second end user to select and receive units of an alternative digital asset in lieu of the original digital asset of the digital asset transfer. Various embodiments enable the selection and receipt of an alternative digital asset that is internally-custodied or externally-custodied. In various embodiments, specific alternative digital assets are identified and presented to the second end user for selection, and these alternative digital assets may be identified based at least in part on behavioral data associated with the second end user and/or associated with a behavioral cohort including the second end user. For example, one or more alternative digital assets are identified for the second end user using a predictive model, an optimization model, a machine learning model, and/or the like.

The term "alternative digital asset transfer" may refer to a digital asset transfer involving an alternative digital asset. As mentioned, various embodiments of the present disclosure enable a recipient in a digital asset transfer to select and receive units of an alternative digital asset instead of a digital asset originally specified for the digital asset transfer (e.g., the original digital asset). As such, an alternative digital asset transfer is executed responsive to a selection of an alternative digital asset by the recipient (e.g., the second end user). An alternative digital asset transfer involves the debit of a number of units of the original digital asset from the sender (e.g., the first end user) and the credit of a number of units of the alternative digital asset to the recipient, with the number of units of the alternative digital asset being substantially equivalent in value to the number of units of the original digital asset.

The term "conversion rate" may refer to a data entity describing a relative value (e.g., a transactional value) of a digital asset. Specifically, a conversion rate may describe the value of a digital asset with respect to a fiat currency or with respect to another digital asset. For example, a conversion rate for a liability digital asset may indicate that one unit of the liability digital asset (e.g., one reward point) is worth or equal in value to ten fiat currency units (e.g., USD $10). As another example, a conversion rate for the liability digital asset may indicate that one unit of the liability digital asset is worth or equal in value to one-tenth of a unit of a cryptocurrency digital asset (e.g., 0.1 BTC). As also shown, a conversion rate may describe a full and/or fractional value of a digital asset. An aggregated conversion rate between a first digital asset and a second digital asset may be generated using at least two conversion rates in a substantially transitive manner. For example, a first conversion rate with respect to a fiat currency for a first digital asset and a second conversion rate with respect to the fiat currency for the first digital asset are both used to generate an aggregated conversion rate between the first digital asset and the second digital asset (e.g., using the fiat currency as a common basis). A conversion rate for a digital asset may be variable over time. As such, a conversion rate may be historical, current, or indicative, and different conversion rates for a digital asset may be associated with different time points or periods. Various embodiments of the present disclosure involve continuous and periodic retrieval of conversion rates, such that an accurate and current value of the digital asset is provided to end users and used for relevant digital asset transactions, redemptions, conversions, transfers, and/or the like. In various instances, a conversion rate of a digital asset is individualized and/or cohort-based, such that different end users and/or cohorts (e.g., behavioral cohorts) are subject to different conversions rates of a digital asset. A conversion rate specific to a particular end user and/or a particular cohort (e.g., a particular behavioral cohort) may be determined using predictive models, optimization models, machine learning models, and/or the like, in some instances. For example, a conversion rate for an end user is determined based at least in part on behavioral data associated with the end user.

The terms "conversion rate API query" and "conversion rate API response" may each refer to data entities relating to determining a conversion rate for a digital asset. A conversion rate API query represents a request for a conversion rate for a digital asset and accordingly may identify the digital asset. The conversion rate API query may further indicate a particular fiat currency or a particular digital asset as a basis for the requested conversion rate. For example, a conversion rate API query may request a conversion rate with respect to U.S. dollars or a conversion rate with respect to Bitcoin. As previously discussed, conversion rates may be individualized and/or cohort-based, and as such, a conversion rate API query may identify one or more end users for whom the requested conversion rate is applicable. A conversion rate API response comprising a conversion rate is provided in response to a conversion rate API query.

The term "behavioral cohort" may refer to a data entity describing and/or identifying a plurality of end users that are each similar in some aspect to others of the plurality. A behavioral cohort may comprise various information related to each end user (e.g., name, birthdate, Social Security number, permanent address, account identifiers). Example common aspects among end users of a behavioral cohort include demographic information (e.g., age, location) and/or other information associated with the end user, digital asset user account statuses (e.g., account tier or level, account age, account type), digital asset transactional history (e.g., historical transactions, redemptions, conversions, exchanges, transfers), historical and/or predicted propensity for digital asset transactional activity (e.g., initiating a digital asset transfer, requesting a digital asset transfer, converting a digital asset to fiat currency, converting a digital asset to another digital asset), and/or the like. For example, an example behavioral cohort is comprised of end users who have frequently converted a digital asset to Bitcoin. As another example, an example behavioral cohort is comprised of end users who each have had less than a threshold amount of digital asset transaction activity within the past two weeks. As yet another example, an example behavioral cohort is comprised of end users who reside near a vendor/merchant offering a liability digital asset. A conversion behavior cohort is comprised of end users based at least in part on an individual aspect or any combination of aspects. In various embodiments, the behavioral cohort is a data object, a data structure, a matrix, an array, a vector, a graph, and/or the like.

The term "behavioral data object" may refer to a data entity configured to describe behavioral data of a particular end user and/or behavioral data common among or aggregated from a behavioral cohort. Example behavioral data includes digital asset user account status (e.g., account tier or level, account age, account type), digital asset transactional history (e.g., historical transactions, redemptions, conversions, exchanges, transfers), historical and/or predicted propensity for digital asset transactional activity (e.g., initiating a digital asset transfer, requesting a digital asset transfer, converting a digital asset to fiat currency, converting a digital asset to another digital asset), and/or the like. For example, behavioral data includes conversion rates at which the end user and/or the behavioral cohort has converted a digital asset. In various embodiments, a behavioral data object comprises predictive behavioral data, such as data generated using a predictive model, optimization model, machine learning model, and/or the like. For example, a behavioral data object indicates an alternative digital asset predicted to be of interest to an end user based at least in part on historical digital asset transactional activity of the end user. In various embodiments, the behavioral cohort is a data object, a data structure, a matrix, an array, a vector, a graph, and/or the like.

The term "digital asset user account" may refer to a data entity configured to describe ownership of a number of digital asset units. A digital asset user account is associated with an end user and is specific to a digital asset. Thus, a digital asset user account describes ownership of the digital asset by the end user, such as how many units of the digital asset are owned by the end user. Specifically, a digital asset user account describes liabilities or expenditures of the digital asset for the end user (e.g., decreases in owned number of digital asset units), income of the digital asset (e.g., increases in owned number of digital asset units), and/or the like, and may describe such via debit and credit entries.

The term "account balance data object" may refer to a data entity configured to describe a digital asset user account. In particular, an account balance data object comprises information including a current balance of digital asset units for the digital asset user account, various identifiers for the digital asset user account (e.g., account number, routing address, cryptographic keys and/or key references), end user information (e.g., demographics), transactional history for the digital asset user account (e.g., chronological recording of individual debits and credits of a digital asset), and/or the like. An account balance data object may be a data structure, a matrix, an array, a graph, a vector, embeddings, a dataset, and/or the like. An entity managing a digital asset may be responsible for managing account balance data objects corresponding to digital asset user accounts specific to the digital asset. For example, an external system associated with an externally-custodied digital asset generates, stores, updates, access, and/or the like account balance data objects corresponding to digital asset user accounts specific to the externally-custodied digital asset. Likewise, for example, a system configured for digital asset transfers in accordance with the present disclosure and for managing an internally-custodied digital asset is further configured to generate, store, update, access, and/or the like account balance data objects corresponding to digital asset user accounts specific to the internally-custodied digital asset.

The term "account query" may refer to a data entity representing a request for information associated with a digital asset user account. For example, an account query is transmitted to a system to cause the system to respond with information associated with a digital asset user account. The account query may be responded to with an account balance data object associated with the digital asset user account and/or a response comprising the account balance data object. The account query may specifically comprise an identifier token configured to identify the end user associated with the digital asset user account. The account query may be an API request, call, query, and/or the like.

The term "identifier token" may refer to a data entity associated with an end user and configured to identify the end user for one or more systems. In various embodiments, an identifier token is associated with each of a plurality of end users. An identifier token is configured to describe various user accounts associated with the end user, and as such may describe an ownership portfolio of the end user. For example, the identifier token may reference one or more fiat currency user accounts, one or more digital asset user accounts each specific to a digital asset, and or the like associated with the end user. In various embodiments, the identifier token is federated, global, universal, and/or the like, such that the end user may be identified by one or more systems when provided with an identifier token. For example, one identifier token is used to identify, locate, retrieve, reference, and/or the like digital asset user accounts specific to different digital assets and managed by different systems. In various embodiments, the identifier token uses single-sign-on (SSO) authentication techniques to identify the end user. The identifier token may comprise additional information including end user identifying information (e.g., name, birthdate, Social Security Number), a globally unique identifier (GUID), a universally unique identifier (UIUD), a hash or cryptographic value of user information or credentials, and/or the like. In various embodiments, the identifier token is a data object, a data structure, a matrix, an array, a vector, and/or the like.

The term "digital asset transfer query" may refer to a data entity configured to describe and define a digital asset transfer to be executed. A digital asset transfer query received originating from a first end user (e.g., via a first client device associated with the first end user) may define an outbound digital asset transfer (e.g., transfer of digital asset units from the first end user to a second end user) or may define an inbound digital asset transfer or a digital asset transfer request (e.g., transfer of digital asset units from the second end user to the first end user). In particular, a digital asset transfer query defines a specific digital asset for the digital asset transfer (e.g., a cryptoasset, liability points, an in-game asset), a number of digital asset units for the digital asset transfer, another party to be involved in the digital asset transfer (e.g., a recipient, a sender), and/or the like. In various embodiments, the digital asset transfer query is received via an API call at an API and is responded to with a confirmation of receipt via an API response.

The terms "transfer acceptance query" and "transfer acceptance response" may each refer to data entities communicated with a recipient in an outbound digital asset transfer (e.g., the second end user). A transfer acceptance query represents a notification of the outbound digital asset transfer to the recipient and indicates at least the sender (e.g., the first end user), the digital asset of the digital asset transfer, the number of digital asset units being transferred, and/or the like. In some embodiments, a transfer acceptance query requires a transfer acceptance response originating from the recipient (e.g., the second end user) to complete processing and execution of the digital asset transfer. For example, the recipient provides a positive transfer acceptance response to complete execution of the digital asset transfer and to be credited with the digital asset units. In some instances, the recipient may provide a negative transfer acceptance response to decline the digital asset transfer.

The terms "transfer initiation query" and "transfer initiation response" may each refer to data entities communicated with a prospective sender in an inbound digital asset transfer (e.g., the second end user). A transfer initiation query represents a notification of the inbound digital asset transfer requested by the prospective recipient (e.g., the first end user) and indicates at least the prospective recipient (e.g., the first end user, the requester), the digital asset of the digital asset transfer, the number of digital asset units requested to be transferred, and/or the like. In various embodiments, the transfer initiation query is associated with an expiration time period within which the transfer initiation query may be responded to with a transfer initiation response. The prospective sender (e.g., the second end user) may provide a positive transfer initiation response to accept the request for the inbound digital asset transfer and to cause credit of the requested digital asset units to the requester (e.g., the first end user). The prospective sender may also provide a negative transfer initiation response to decline the request for the inbound digital asset transfer.

The term "transfer execution API query" may refer to a data entity configured to cause execution of a digital asset transfer at least in part. Specifically, a transfer execution API query causes either a number of digital asset units to be debited from a digital asset user account or a number of digital asset units to be credited to a digital asset user account. In doing so, a transfer execution API query defines a number of digital asset units to debit or to credit and identifies a digital asset user account for the debit or for the credit. In various embodiments, a confirmation of execution is provided via an API response in response to a transfer execution API query.

III. Computer Program Products, Methods, and Computing Entities

Embodiments of the present disclosure may be implemented in various ways, including computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

Figure 1:
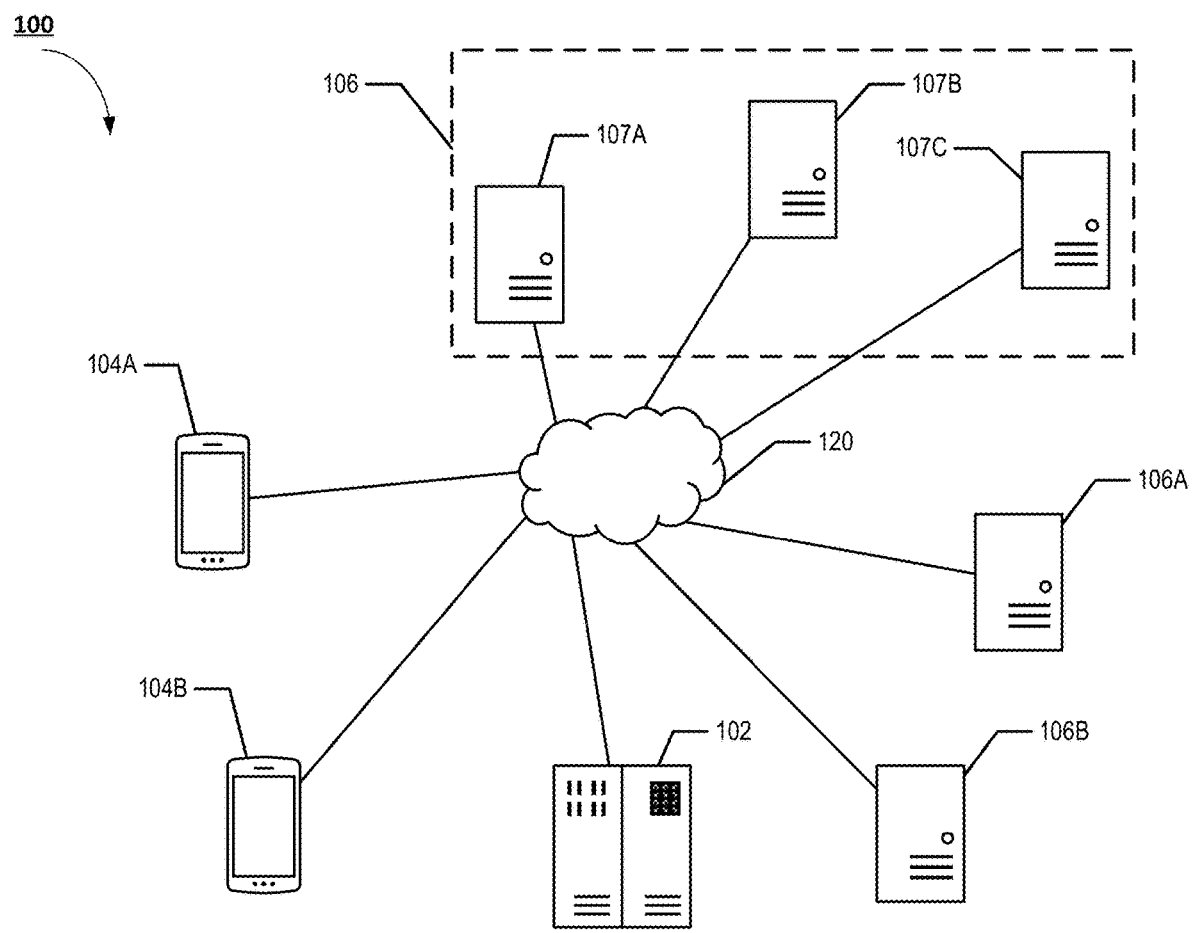
FIG. 1 is an exemplary diagram of a system architecture, in accordance with various embodiments of the present disclosure.

FIG. 1 provides an illustration of an architecture 100 that can be used in conjunction with various embodiments of the present disclosure. As shown in FIG. 1, the architecture 100 may comprise one or more account management systems 102, one or more client devices 104, one or more digital asset exchange systems 106, one or more networks 120, and/or the like. In various embodiments, an account management system 102 is configured to communicate with a plurality of client devices 104 and execute digital asset transfers (e.g., generally corresponding changes in digital asset user account balances for involved parties) for a plurality of end users associated with the plurality of client devices 104. In various embodiments, an account management system 102 may communicate with one or more digital asset exchange systems 106 for the execution of a digital asset transfer for an end user of a client device 104, such as for digital asset transfers involving externally-custodied digital assets. A digital asset exchange system 106 is an external system responsible for managing an externally-custodied digital asset and associated digital asset user accounts. The account management system 102 may communicate with a digital asset exchange system 106 at least to cause the debiting of digital asset units from a digital asset user account, to cause the crediting of digital asset units to a digital asset user account, to determine a conversion rate for a digital asset (e.g., an alternative digital asset), and to determine and/or update an account balance data object associated with a digital asset user account specific to an externally-custodied digital asset.

As shown in FIG. 1, a digital asset exchange system 106 may be and/or comprise a distributed ledger computing platform comprising a plurality of node computing entities 107 (e.g., 107A, 107B, 107C). For example, in an example embodiment, a digital asset exchange system 106 comprises a plurality of node computing entities 107 in communication with one another via a network 120 and each storing copies of a distributed ledger (e.g., a blockchain) for a digital asset (e.g., a cryptocurrency digital asset). Although not explicitly illustrated, the account management system 102 may be a node computing entity 107 of a digital asset exchange system 106, accordingly storing a copy of a distributed ledger for a digital asset and enabled to transact with the digital asset via the distributed ledger. Each node computing entity 107 may be configured to commit and retrieve portions of the distributed ledger (e.g., distributed ledger entries, records, blocks, and/or the like). A node computing entity 107 may be a full node computing entity that stores the entirety of a distributed ledger (e.g., a blockchain), a mining node computing entity that maintains the distributed ledger (e.g., a blockchain) by publishing updated records, entries, blocks and/or the like while also storing the entirety of the distributed ledger, a lightweight node computing entity that does not store the entirety of the distributed ledger (e.g., a blockchain), and/or the like. Various node computing entities 107 may be configured for providing events, consensus requests, and/or the like; performing consensus processing; storing a copy of a distributed ledger; and/or the like.

Each of the components of the architecture 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. In some embodiments, the plurality of node computing entities 107 of a digital asset exchange system 106 may be in electronic communication with one another over a different wireless or wired network 120 than the account management system 102 and/or the client device 104. While FIG. 1 illustrates certain systems as separate, standalone entities, the various embodiments are not limited to this particular architecture.

a. Exemplary Account Management System

In an example embodiment, an account management system 102 may be a computing entity configured for enabling, managing, processing, executing, and/or the like digital asset transfers between various end users of a plurality of client devices 104. The account management system 102 is configured to enable both outbound digital asset transfers (e.g., by causing digital asset units to be debited from a first end user and credited to a second end user) and inbound digital asset transfers (e.g., by generating a transfer initiation request for the second end user and executing the inbound digital asset transfer responsive to the second end user accepting the request). For the execution of various digital asset transfers, an account management system 102 is configured to access user account data for digital asset user accounts to be involved in the various digital asset transfers, for example by retrieving and/or receiving account balance data objects. The account management system 102 is further configured to maintain a closed-loop environment for one or more internally-custodied digital assets and to manage such internally-custodied digital assets over multiple closed-loop transactions (e.g., off-chain transactions for an internally-custodied digital asset that is a cryptoasset or a cryptocurrency digital asset). The account management system 102 is also configured to generate and transmit transfer execution API queries to various digital asset exchange systems 106 to cause units of externally-custodied digital assets to be debited and/or credited from various digital asset user accounts managed by the various digital asset exchange systems 106. For each end user, the account management system 102 is configured to maintain and update account balance data objects for one or more digital asset user accounts associated with the end user and specific to both internally-custodied digital assets and externally-custodied digital assets.

The account management system 102 is configured to manage concurrent communications with a plurality of client devices 104 and end users, such as a plurality of digital asset transfer queries (e.g., defining outbound digital asset transfers and/or inbound digital asset transfers) received at substantially the same time. Other communications received and managed by the account management system 102 include transfer initiation queries provided to end users for inbound digital asset transfers, as well as responses to the same. In various embodiments, the account management system 102 stores and/or has access to a plurality of account balance data objects, which each indicate a historical account activity of a corresponding user account (e.g., via transaction record data objects each corresponding to an executed digital asset transfer). As such, the account management system 102 maintains a record of a plurality of digital asset transfers requested and/or executed and is configured to search and find specific digital asset transfers within the plurality of account balance data objects. Accordingly, the account management system 102 is configured to maintain a historical record of internally-custodied digital assets and externally-custodied digital assets.

In various embodiments, an account management system 102 may be operated by one or more various entities to manage and execute digital asset transfers between various end users. For example, an account management system 102 may be operated by banking institution entities, digital asset exchange entities, stock exchange entities, trading platform entities, and/or the like. In various embodiments, an account management system 102 may be operated by a single such entity, while in other embodiments, an account management system 102 may host and/or be operated by multiple such entities, each managing digital asset conversions for various client devices 104.

Figure 2:
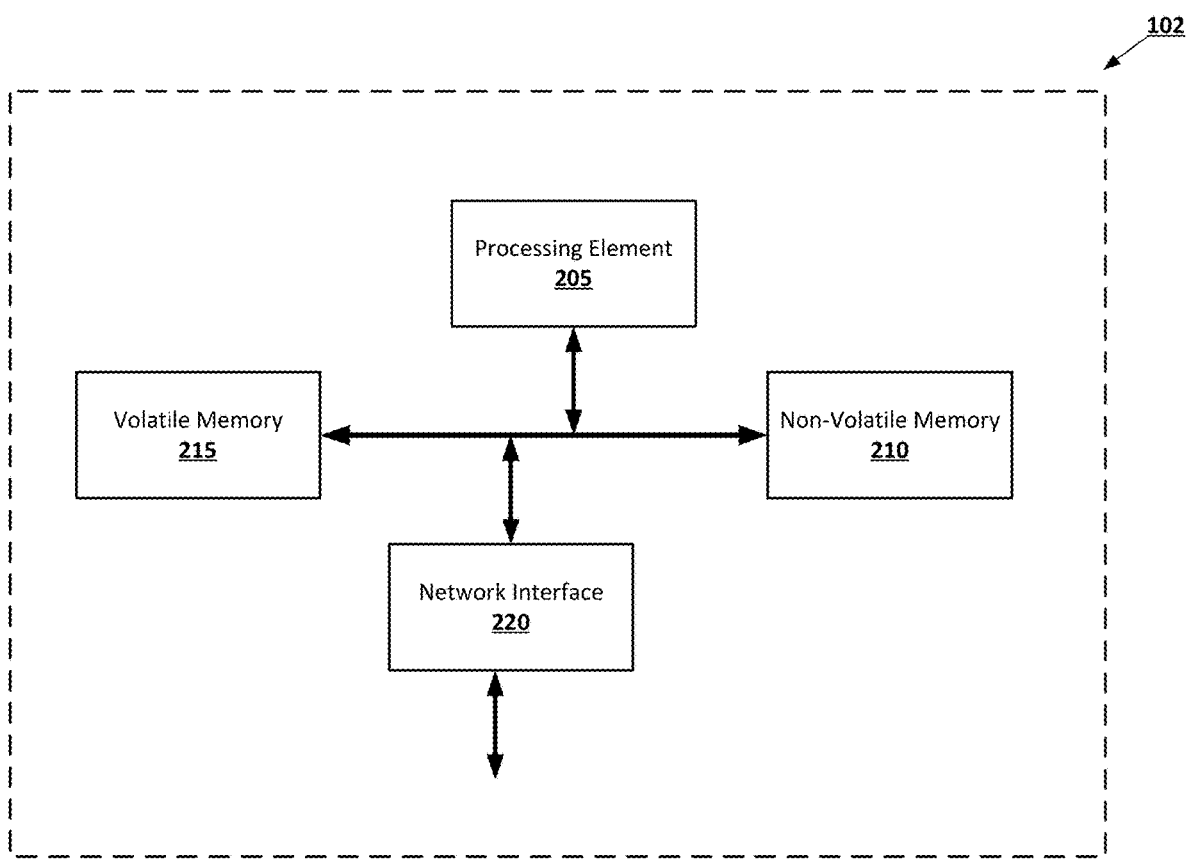
FIG. 2 is an exemplary schematic of an account management system, in accordance with various embodiments of the present disclosure.

FIG. 2 illustrates a schematic of an example account management system 102, according to one embodiment of the present disclosure. As shown in FIG. 2, in one embodiment, the account management system 102 may include, or be in communication with, one or more processing elements 205 (also referred to as processors, processing circuitry, and/or similar terms used herein interchangeably) that communicate with other elements within the account management system 102 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the account management system 102 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the account management system 102 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the step/operation of the account management system 102 with the assistance of the processing element 205 and operating system.

As indicated, in one embodiment, the account management system 102 may also include one or more network interfaces 220 for communicating with various computing entities (e.g., one or more client devices 104, one or more digital asset exchange systems 106), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the account management system 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the account management system 102 may include, or be in communication with, one or more input elements, such as a keyboard input, a mouse input, a touch screen/display input, motion input, movement input, audio input, pointing device input, joystick input, keypad input, and/or the like. The account management system 102 may also include, or be in communication with, one or more output elements (not shown), such as audio output, video output, screen/display output, motion output, movement output, and/or the like.

As will be appreciated, one or more of the components of the account management system 102 may be located remotely from other components of the account management system 102, such as in a distributed system architecture. Furthermore, one or more of the components of the account management system 102 may be combined. Additional components performing functions, operations, methods, processes, and/or the like described herein may be included in the account management system 102. Thus, the account management system 102 may be adapted to accommodate a variety of needs and circumstances.

b. Exemplary Client Device

Figure 3:
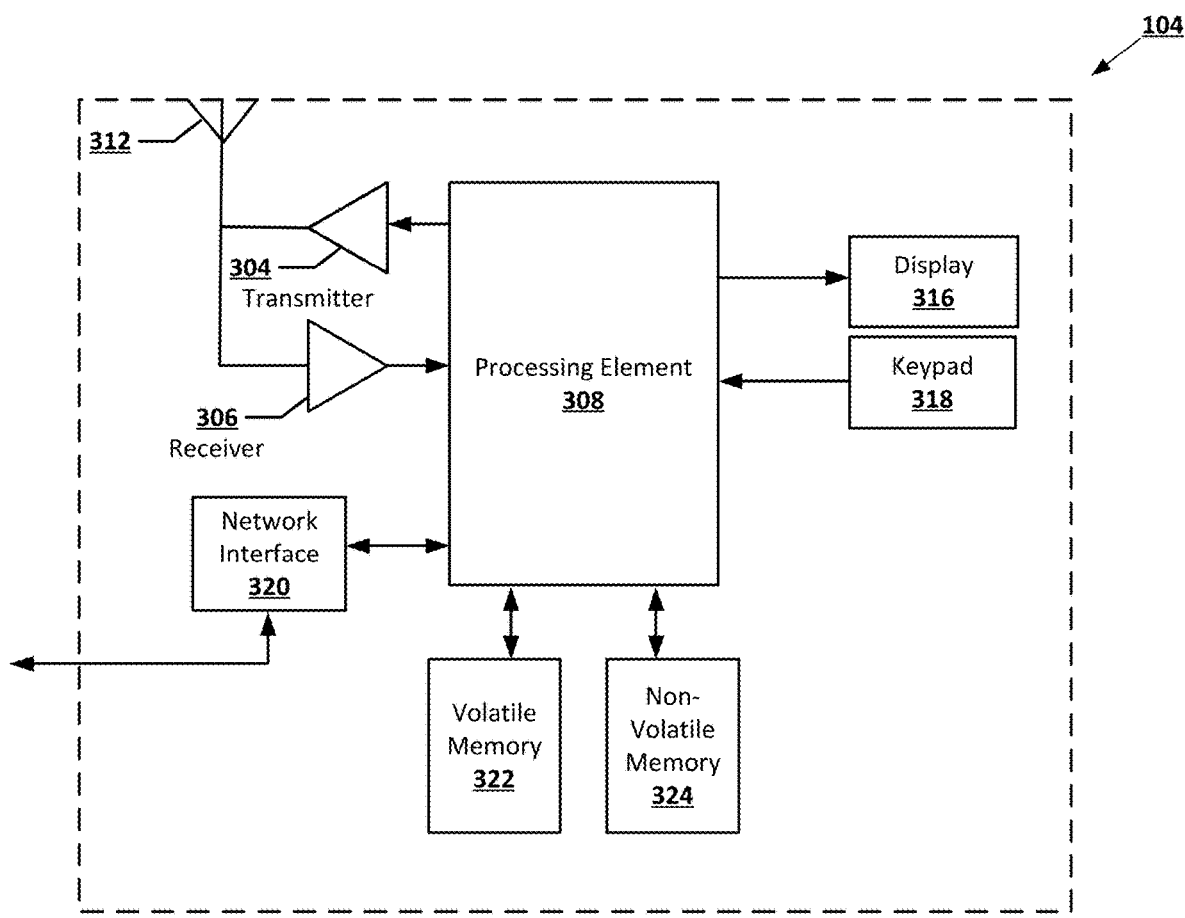
FIG. 3 is an exemplary schematic of a client device, in accordance with various embodiments of the present disclosure.

FIG. 3 provides a schematic of an example client device 104 that may be used in conjunction with embodiments of the present disclosure. Client devices 104 can be operated by various entities, and an example architecture 100 may include one or more client devices 104. For example, a client device 104 may be associated with, owned by, operated by, and/or the like by one or more end users. In various instances, an end user of a client device 104 may wish to give, gift, send, pay, and/or the like units of a digital asset (e.g., an internally-custodied digital asset, an externally-custodied digital asset) to another end user, and the end user generates and provides, via the client device 104 to an account management system 102, a digital asset transfer query defining an outbound digital asset transfer to cause digital asset units to be given, gifted, sent, paid, and/or the like to the other end user. Similarly, in various instances, the end user of the client device 104 may wish to receive, be paid with, and/or the like units of a digital asset (e.g., an internally-custodied digital asset, an externally-custodied digital asset) from another end user, and the end user generates and provides, via the client device 104 to an account management system 102, a digital asset transfer query defining an inbound digital asset transfer to cause the other end user to be notified of the end user's wish for digital asset units. The other end user may receive a notification of the end user's wish (e.g., via a transfer initiation query) at an associated client device 104 and may respond to the end user's wish for digital asset units.

A client device 104 may be a personal computing device, smartphone, tablet, laptop, personal digital assistant, and/or the like. As shown in FIG. 3, the client device 104 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the account management system 102. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the account management system 102 via a network interface 320.

Via these communication standards and protocols, the client device 104 can communicate with an account management system 102 using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 can also download changes, add-ons, and updates, for instance, to its firmware, software (e.g., including executable instructions, applications, program modules), and operating system.

According to one embodiment, the client device 104 may include location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client device 104 may also comprise a user interface (that can include a display 316 coupled to a processing element 308) and/or a user input interface (coupled to a processing element 308). For example, the user interface may be a user application, app, browser, user interface, and/or similar words used herein interchangeably executing on and/or accessible via the client device 104 to interact with and/or cause display of information/data from the account management system 102, as described herein. The user input interface can comprise any of a number of devices or interfaces allowing the client device 104 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client device 104 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client device 104. As indicated, this may include a user application that is resident on the entity or accessible through a browser or other user interface for communicating with the account management system 102.

In another embodiment, the client device 104 may include one or more components or functionality that are the same or similar to those of the account management system 102, as described in greater detail above. As will be recognized, these architectures and descriptions are provided for exemplary purposes only and are not limiting to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Exemplary Digital Asset Exchange Systems

In various embodiments, an example architecture (e.g., the architecture 100 illustrated in FIG. 1) comprises one or more digital asset exchange systems 106. A digital asset exchange system 106 is an external system (e.g., external to the account management system 102 and/or the entity associated with the account management system 102) responsible for the management of an externally-custodied digital asset. As described, management of an externally-custodied digital asset by a digital asset exchange system 106 includes management of digital asset user accounts specific to the externally-custodied digital asset, execution of various debits and credits of the externally-custodied digital asset from and to the digital asset user accounts, configuration of various transaction (e.g., transfers, conversions, redemptions) conditions, thresholds, and limits, and/or the like.

Thus, a digital asset exchange system 106 is involved in the debiting and/or crediting of digital asset units for a digital asset transfer involving an externally-custodied digital asset. Accordingly, the architecture 100 may include one or more digital asset exchange systems 106 to thereby enable end users to transfer a variety of different digital assets. In some instances, one or more different externally-custodied digital assets are managed by a digital asset exchange system 106. In instances involving an alternative digital asset transfer, a first digital asset exchange system may be responsible for the management of the digital asset specified by the sender (e.g., the original digital asset), while a second digital asset exchange system (e.g., an alternative digital asset exchange system 106B) may be responsible for the management of the alternative digital asset selected by the recipient.

In various embodiments, a digital asset exchange system 106 may be a computing entity configured for engaging with an account management system 102 to debit and/or credit units of an externally-custodied digital asset for an end user. Specifically, a digital asset exchange system 106 is configured to manage a digital asset user account associated with the end user for a particular digital asset and to debit, deduct, withdraw, transfer, credit, deposit, and/or the like a number of digital asset units from and/or to the digital asset user account responsive to receiving a transfer execution API query originating from the account management system 102.

A digital asset exchange system 106 may be further responsible for executing and/or participating in fiat currency transactions with the account management system 102 and/or the entity associated with the account management system 102. For example, an alternative digital asset transfer involves individual debits and credits of different digital assets (e.g., the original digital asset and the alternative digital asset), while require settlement via fiat currency transactions. Thus, the digital asset exchange system 106 is configured to transfer fiat currency units to a fiat currency account associated with the account management system 102 and/or the entity associated with the account management system 102 (e.g., a fiat currency central operating account) and/or to receive fiat currency units from the fiat currency account associated with the account management system 102.

Various entities may be associated with and/or operate a digital asset exchange system 106. For example, a digital asset exchange system 106 may be associated with a liability digital asset that may be loyalty or reward points, and the digital asset exchange system 106 may be operated by or associated with a liability holder entity distributing and/or accepting the loyalty or reward points, such as a vendor entity, merchant entity, a service provider entity, a banking institution entity, a credit card manager entity, and/or the like. In some instances, a digital asset exchange system 106 associated with a liability digital asset and a liability holder entity may be operated by a third-party entity on behalf of the liability holder entity and/or the liability holder entity itself. Thus, the digital asset exchange system 106 may be and/or comprise one or more computing entities associated with the liability holder entity and may maintain digital asset user accounts (each associated with liability digital assets) for end users corresponding to the liability holder entity. As such, the digital asset exchange system 106 may store and/or have access to records of transactions made by end users with the liability holders that resulted in the assignment or crediting of liability digital asset units to the end users at a previous point in time.

Meanwhile, a digital asset exchange system 106 involved in the conversion of cryptocurrency digital assets may be associated with and/or operated by banking institution entities, monetary exchange entities, cryptocurrency exchange entities, stock exchange entities, trading platform entities, and/or the like and may be configured to communicate with and/or may comprise a distributed ledger computing platform. Further, a digital asset exchange system 106 may be associated with and/or operating by an auctioning platform entity, an asset holding entity, and/or the like. For example, such a digital asset exchange system 106 may be involved in the conversion (e.g., sale) of a NFT by an end user.

In managing an externally-custodied digital asset, a digital asset exchange system 106 is configured to generate, establish, configure, and/or communicate transfer conditions, thresholds, and limits for the externally-custodied digital asset. These transfer conditions, thresholds, and limits constrain the execution of various digital asset transfers for the externally-custodied digital asset and enable an entity managing the externally-custodied digital asset and associated with the digital asset exchange system 106 to maintain economic control over the externally-custodied digital asset. For example, an entity managing the externally-custodied digital asset configures various transfer conditions, thresholds, and limits to control the supply and demand for the externally-custodied digital asset and to manipulate the value of the externally-custodied digital asset. Such transfer conditions, thresholds, and limits include a total number of digital asset units that can be transferred within a time period, a limit of digital asset units that can be transferred by a particular end user, a limit of digital asset units that can be transferred by a behavioral cohort of end users, a number of digital asset transfers that can be executed, and/or the like. These transfer conditions, thresholds, and limits are configured using a digital asset exchange system 106, and the digital asset exchange system 106 communicates and indicates such transfer conditions, thresholds, and limits to the account management system 102, such that the account management system 102 does not proceed with execution of a digital asset transfer that does not satisfy or that violates one or more transfer conditions, thresholds, and limits.

Thus, a digital asset exchange system 106 may comprise various means for performing at least the herein described functions, operations, methods, processes and/or the like. For example, a digital asset exchange system 106 may comprise various processing elements, volatile and/or non-volatile memory or memory media, network interfaces, user interfaces, and/or the like—including those described with regard to the account management systems 102 and/or client devices 104.

d. Exemplary Networks

In one embodiment, any two or more of the illustrative components of the architecture of FIG. 1 (e.g., one or more account management systems 102, one or more client devices 104, one or more digital asset exchange systems 106) may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operation

Various embodiments of the present disclosure include various functions, steps, operations, methods, processes, and/or the like that may (or may be performed to) address technical challenges related to enabling, managing, processing, executing, and/or the like digital asset transfers between end users. In various embodiments, execution of a digital asset transfer for a particular digital asset comprises a debit of a number of digital asset units from a digital asset user account associated with a first end user and specific to the particular digital asset and a credit of the number of digital asset units to a digital asset user account associated with a second end user and specific to the particular digital asset. According to whether the particular digital asset is an internally-custodied digital asset or an externally-custodied digital asset, the debit and the credit involved in the digital asset transfer is executed via closed-loop transactions (e.g., closed-loop debits and credits) or via transfer execution API queries generated and transmitted to a digital asset exchange system 106, respectively. Various embodiments of the present disclosure enable a first end user to define an outbound digital asset transfer involving a second end user being credited with digital asset units or an inbound digital asset transfer involving the first end user being credited with digital asset units.

Throughout at least the above, various embodiments provide technical advantages that include the reduction of overall system load, required user interactions, processing time and resources, and network communication. Various embodiments further improve security, accuracy, and efficiency in management of end user data relating to digital assets. Overall efficiency is achieved in various embodiments in processing and executing digital asset transfers such that a recipient in a digital asset transfer is credited with digital asset units within a time scale of milliseconds and/or seconds, which is improvement to existing systems and methods which require hours and/or days to process and execute a digital asset transfer.

a. Exemplary Outbound Digital Asset Transfers

FIG. 4A and FIG. 4B illustrate a process 400 for processing and executing a digital asset transfer. Specifically, process 400 relates to the processing and executing of an outbound digital asset transfer, in which a first end user (e.g., user A) sends, gives, gifts, pays, transmits, and/or the like units of a digital asset to a second end user (e.g., user B). Process 400 includes steps/operations for processing and executing an outbound digital asset transfer for an internally-custodied digital asset and for processing and executing an outbound digital asset transfer for an externally-custodied digital asset. In various embodiments, the account management system 102 comprises means, such as processing element 205, memories 210, 215, network interface 220, and/or the like, for performing each of the steps/operations of process 400 to process and to execute an outbound digital asset transfer.

Process 400 comprises step/operation 401. In one embodiment, process 400 begins with and is triggered by step/operation 401. Step/operation 401 comprises receiving a digital asset transfer query originating from a first client device 104A associated with user A and defining an outbound digital asset transfer of a digital asset from user A to user B. For example, the account management system 102 receives the digital asset transfer query originating from the first client device 104A via a network interface 220. In various embodiments, the digital asset transfer query may be an API call, query, request, and/or the like transmitted by the client device 104 responsive to user interaction with a user interface provided for display via the client device 104.

As mentioned, the digital asset for the outbound digital asset transfer may be an internally-custodied digital asset or an externally-custodied digital asset. In various examples, the digital asset is an internally-custodied digital asset managed in a closed-loop environment. For example, the digital asset is a cryptocurrency in a closed-loop environment managed by the account management system 102. In various other examples, the digital asset is an externally-custodied digital asset managed by a digital asset exchange system 106. For example, the externally-custodied digital asset is a vendor reward point distributed and redeemable with a vendor entity associated with a digital asset exchange system 106.

As previously described, an outbound digital asset transfer is defined by the digital asset transfer query, and the digital asset transfer query is configured to particularly indicate the outbound nature of the defined digital asset transfer (e.g., in contrast to an inbound digital asset transfer). In various embodiments, the digital asset transfer query comprises an indication of a recipient for the outbound digital asset transfer. The recipient, or user B for example, may be identified via one or more identifiers, such as a name, a username, a numerical code, and/or the like. In some embodiments, the digital asset transfer query comprises an identifier token associated with the recipient and configured to identify the recipient for the account management system 102.

The digital asset transfer query further defines the outbound digital asset transfer by specifically identifying the digital asset for the digital asset transfer. For example, the digital asset transfer query comprises an indication of a cryptocurrency that user A has selected to send, gift, give, pay, transmit, and/or the like to user B. The digital asset transfer query additionally defines a specified number of digital asset units for the outbound digital asset transfer. For example, user A specifies that 0.25 BTC should be sent to user B in the outbound digital asset transfer. The specified number of digital asset units is the number of digital asset units that are debited from the sender and also the number of digital asset units that are credited to the recipient, in various embodiments.

Process 400 then comprises steps/operations for retrieving and/or receiving user account data for both the sender and the recipient identified for the digital asset transfer (e.g., the outbound digital asset transfer). In various instances, the digital asset transfer is for an internally-custodied digital asset (e.g., the digital asset transfer query identifies an internally-custodied digital asset), and step/operation 402 and step/operation 403 are performed.

Specifically, step/operation 402 comprises retrieving a first account balance data object corresponding to a digital asset user account associated with the sender (e.g., user A) and specific to the digital asset. Step/operation 403 comprises retrieving a second account balance data object corresponding to a digital asset user account associated with the recipient (e.g., user B) and specific to the digital asset. In various embodiments, the account balance data objects are stored in memory accessible by the account management system 102, such as in memory 210, 215. In various embodiments, the account management system 102 retrieves the account balance data objects from a database configured to securely store a plurality of account balance data objects and in communication with the account management system 102. With the digital asset being an internally-custodied digital asset, the account management system 102 is responsible for managing account balance data objects corresponding to digital asset user accounts specific to the internally-custodied digital asset and accordingly is configured to (e.g., with permission configurations) access, read, write, generate, delete, and/or the like the first account balance data object and the second account balance data object.

An account balance data object is configured to describe a digital asset user account, such as a digital asset user account associated with user A or a digital asset user account associated with user B. In particular, an account balance data object comprises information including a current balance of digital asset units for the digital asset user account, various identifiers for the digital asset user account (e.g., account number, routing address, cryptographic keys and/or key references), end user information (e.g., demographics), transactional history for the digital asset user account (e.g., chronological recording of individual debits and credits of a digital asset), and/or the like. An account balance data object may be a data structure, a matrix, an array, a graph, a vector, embeddings, a dataset, and/or the like.

In various embodiments, the account balance data objects are identified, located, and/or retrieved based at least in part on the sender (e.g., user A) and the recipient (e.g., user B) being identified via the digital asset transfer query. In particular, the sender (e.g., user A) is identified by the account management system 102 based at least in part on the digital asset transfer query originating from the first client device 104A associated with the sender. The account management system 102 may, for example, locate and process an identifier token associated with the sender in order to identify one or more digital asset user accounts associated with the sender. In various embodiments, the digital asset transfer query defines a particular digital asset user account specific to the digital asset that the sender has selected to be debited during the outbound digital asset transfer. For example, the sender may select a particular account name, account number, account identifier, and/or the like associated with the particular digital asset user account. Accordingly, the account management system 102 retrieves a first account balance data object corresponding to the particular digital asset user account selected by the sender (e.g., user A).

Meanwhile, the digital asset transfer query may define the recipient (e.g., user B) via an identifier token associated with the recipient. In some embodiments, the account management system 102 is configured to process an identifier token associated with the recipient based at least in part on the recipient being identified in the digital asset transfer query and to identify one or more digital asset user accounts associated with the recipient. The account management system 102 may then retrieve a second account balance data object corresponding to a digital asset user account associated with the recipient and specific to the internally-custodied digital asset. In some instances, the recipient is associated with more than one digital asset user account specific to the internally-custodied digital asset, and the account management system 102 retrieves an account balance data object corresponding to a digital asset user account pre-configured and/or pre-selected as a default digital asset user account.

Each of the first account balance data object and the second account balance data object may be associated with transfer conditions, thresholds, and limits configured by the account management system 102, as the account management system 102 is responsible for managing the internally-custodied digital asset and digital asset user accounts thereof. Such transfer conditions, thresholds, and limits that are specifically associated with each of the first account balance data object and the second account balance data object include individual and/or cohort-based transfer conditions. For example, the account management system 102 may have imposed a limit of five digital asset transfers per day for the sender (e.g., user A), and in retrieving the first account balance data object corresponding to a digital asset user account associated with the sender (e.g., user A), the limit of five digital asset transfers per day is also retrieved and identified. Thus, for each of the sender (e.g., user A) and the recipient (e.g., user B), retrieving an account balance data object comprises retrieving transfer conditions, thresholds, and limits associated with the sender and the recipient and/or the digital asset user accounts associated with the sender and the recipient. In various embodiments, general information such as demographic information is also retrieved with the account balance data objects for both the sender and the recipient.

In various other instances, the digital asset transfer query received at step/operation 401 defines an externally-custodied digital asset (e.g., managed by and/or via a digital asset exchange system 106), and step/operation 404, step/operation 405, step/operation 406, and step/operation 407 are performed.

At step/operation 404, a first account query is generated and transmitted to a digital asset exchange system 106 associated with the digital asset (e.g., the externally-custodied digital asset). In various embodiments, the first account query comprises the identifier token associated with the sender (e.g., user A), and the identifier token is configured to cause the digital asset exchange system 106 to identify digital asset user accounts associated with the sender (e.g., user A) and managed by the digital asset exchange system 106. In some instances, the digital asset exchange system 106 manages multiple digital assets, and the first account query specifies the externally-custodied digital asset for the outbound digital asset transfer (e.g., defined by the digital asset transfer query) such that the digital asset exchange system 106 identifies a digital asset user account associated with the sender (e.g., user A) specific to the externally-custodied digital asset. In various embodiments, the first account query is an API query received at an API of the digital asset exchange system 106.

At step/operation 405, a first account balance data object corresponding to the digital asset user account associated with the sender (e.g., user A) and specific to the digital asset is received originating from the digital asset exchange system 106. In various embodiments, the first account balance data object is provided via an API response to the first account query.

At step/operation 405, a second account query is generated and transmitted to the digital asset exchange system 106 to cause the digital asset exchange system 106 to identify a digital asset user account associated with the recipient (e.g., user B). The second account query may similarly be an API query received at an API of the digital asset exchange system 106. At step/operation 406, a second account balance data object is received originating from the digital asset exchange system 106 (e.g., via an API response to the second account query). The second account balance data object specifically corresponds to an identified digital asset user account associated with the recipient (e.g., user B) and specific to the externally-custodied digital asset.

In various embodiments, each of the first account balance data object and the second account balance data object received originating from the digital asset exchange system 106 and specific to the externally-custodied digital asset are received with, are associated with, comprise, and/or the like transfer conditions, thresholds, and limits configured by the digital asset exchange system 106. As the externally-custodied digital asset is managed via the digital asset exchange system 106, the digital asset exchange system 106 may impose various transfer limits that are received by the account management system 102 with the account balance data objects. For example, the digital asset exchange system 106 provides the first account balance data object corresponding to the digital asset user account associated with the sender (e.g., user A) with the limit that a maximum of sixty digital asset units may be transferred in a single digital asset transfer from the digital asset user account associated with the sender.

Upon receiving the account balance data objects for both the sender and the recipient, the account management system 102 may identify further transfer conditions, thresholds, and limits applicable and imposed on the sender and/or the recipient by the account management system 102 and/or other authoritative entities. Thus, receiving the first account balance data object corresponding to the digital asset user account associated with the sender (e.g., user A) comprises receiving one or more transfer conditions, thresholds, and limits applicable and imposed on the sender, in various embodiments. Likewise, receiving the second account balance data object corresponding to the digital asset user account associated with the recipient (e.g., user B) comprises receiving one or more transfer conditions, thresholds, and limits applicable and imposed on the recipient, in various embodiments.

Thus, process 400 may comprise retrieving (e.g., from memory, from a database) a first account balance data object and a second account balance data object for the sender and the recipient, respectively, when the digital asset transfer is for an internally-custodied digital asset. In contrast, process 400 may comprise communicating with the digital asset exchange system 106 via account queries to receive the first account balance data object and the second account balance data object for the sender and the recipient, respectively, when the digital asset transfer is for an externally-custodied digital asset.

Process 400 comprises step/operation 408, which includes determining whether the outbound digital asset transfer (e.g., as defined by the digital asset transfer query received at step/operation 401) satisfies various configurable transfer conditions, thresholds, and limits. As mentioned, each of the sender and the recipient may be associated with one or more transfer conditions, thresholds, and limits configured by the digital asset exchange system 106, by the account management system 102, by an authoritative entity, and/or the like, which include individual and/or cohort-based limits. For example, the sender is limited to a certain number of digital asset transfers for a time period, a maximum number of digital asset units per digital asset transfer, and/or the like. As another example, the recipient is barred by an authoritative entity from transacting with a cryptocurrency digital asset. Thus, according to the various defined aspects of the outbound digital asset transfer (e.g., the number of digital asset units, the sender, the recipient), the account management system 102 evaluates whether such individual and/or cohort-based limits are satisfied, at step/operation 408.

Various other transfer conditions, thresholds, and limits are evaluated at step/operation 408, such as whether the sender (e.g., user A) has enough digital asset units to send, gift, give, pay, transmit and/or the like to the recipient (e.g., user B). To evaluate such a condition, the account management system 102 uses the first account balance data object corresponding to the digital asset user account associated with the sender (e.g., user A) that is retrieved or received from the digital asset exchange system 106. The first account balance data object describes a balance of the digital asset user account, and accordingly, the balance of the digital asset user account associated with the sender is compared with the defined number of digital assets for the outbound digital asset transfer.

If one or more transfer conditions, thresholds, and limits are not satisfied, the process 400 continues to step/operation 409, which comprises generating and transmitting a notification of invalid digital asset transfer to the first client device 104A associated with the sender (e.g., user A). For example, the sender is notified of insufficient balance of the digital asset user account associated with the sender. That is, the notification of invalid digital asset transfer may provide one or more indications for the invalidity of the outbound digital asset transfer, such as an indication of the one or more transfer conditions, thresholds, and limits that are not satisfied. It will be appreciated here that in instances where the outbound digital asset transfer is invalid due to some aspect relating to the recipient not satisfying one or more transfer conditions, thresholds, and limits, the one or more indications are not provided, such that information relating to the recipient is not compromised and exposed. For example, the sender is not notified about why the outbound digital asset transfer in invalid, when the recipient is barred (e.g., by the digital asset exchange system 106, by an authoritative entity) from receiving digital assets, participating in digital asset transfers, and/or the like.

In various embodiments, the outbound digital asset transfer may be modified or canceled in accordance with one or more transfer conditions, thresholds, and limits not being satisfied. For example, the number of digital asset units for the outbound digital asset transfer may be lowered based at least in part on the balance of the digital asset user account associated with the sender (e.g., user A). As another example, another digital asset user account associated with the sender (e.g., user A) and specific to the digital asset is selected (e.g., by user A via user interaction with the first client device 104A) to be debited for the outbound digital asset transfer. In various embodiments, modifying the digital asset transfer comprises notifying the sender (e.g., via the first client device 104A) and receiving approval of the modified digital asset conversion. In some instances, the account management system 102 receives an indication to cancel the digital asset conversion from the end user. In some embodiments, the account management system 102 may modify the digital asset conversion by canceling the digital asset conversion and accordingly notifying the end user (e.g., via the client device 104) that the digital asset conversion was canceled for not satisfying one or more transfer conditions, thresholds, and limits.

Otherwise, if the defined outbound digital asset transfer satisfies the transfer conditions, thresholds, and limits configured by the account management system 102, the digital asset exchange system 106, an authoritative entity, and/or the like (e.g., the sender has sufficient balance in the digital asset user account), process 400 continues to step/operation 410, illustrated in FIG. 4B. FIG. 4B illustrates additional steps/operations of process 400 for processing and executing an outbound digital asset transfer.

Step/operation 410 comprises generating and transmitting a transfer acceptance query to a second client device 104B associated with the recipient (e.g., user B). The transfer acceptance query represents a notification of the outbound digital asset transfer to the recipient and indicates at least the sender (e.g., the first end user), the digital asset of the digital asset transfer, the number of digital asset units being transferred, and/or the like. In some embodiments, a transfer acceptance query requires a transfer acceptance response originating from the recipient (e.g., the second end user) to complete execution of the digital asset transfer.

In various embodiments, the transfer acceptance query defines one or more alternative digital asset transfers. Each alternative digital asset transfer includes an alternative digital asset that, upon execution of the alternative digital asset transfer, is credited to the recipient (e.g., user B) instead of the original digital asset defined by the sender (e.g., in the digital asset transfer query received at step/operation 401). The number of units of the alternative digital asset that is credited to the recipient is equivalent in value to the original number of units of the original digital asset that was defined by the sender (e.g., user A).

Alternative digital asset transfers are particularly advantageous when the recipient does not want to be credited with units of the original digital asset. For example, the sender defines a vendor gift card digital asset for the outbound digital asset transfer; however, the recipient does not frequent the vendor associated with the vendor gift card digital asset and would likely prefer another digital asset that the recipient would use (e.g., transact, redeem). Accordingly, the definition of one or more alternative digital asset transfers and providing the alternative digital asset transfers to the recipient (e.g., user B) with the transfer acceptance query provides various technical advantages. For one, system load, including processing and network communication resources, are conserved by this preemptive definition of alternative digital asset transfer, as the recipient would otherwise transmit a multitude of queries and requests for information regarding other alternative digital assets.

FIG. 8 provides a process 800 for identifying one or more alternative digital assets for the recipient (e.g., user B) and providing one or more alternative digital asset transfers to the recipient via the transfer acceptance query. For example, performing step/operation 410 comprises performing process 800, and/or process 800 is an example embodiment of step/operation 410. In some example embodiments, the account management system 102 comprises means, such as processing element 205, memories 210, 215, network interface 220, and/or the like, for performing each step/operation of process 800 to identify one or more alternative digital assets for the recipient and to provide alternative digital asset transfers to the recipient via the transfer acceptance query. In some embodiments, the second client device 104B associated with the recipient (e.g., user B) is configured to identify one or more alternative digital assets and provide (e.g., for display) alternative digital asset transfers to the recipient responsive to receiving a transfer acceptance query originating from the account management system 102.

Process 800 comprises step/operation 801, which includes generating and transmitting a conversion rate API query indicating the originally defined digital asset of the outbound digital asset transfer to the digital asset exchange system 106. As an alternative digital asset transfer involves the credit of a number of alternative digital asset units equivalent in value to the defined number of original digital asset units, a conversion rate between the original digital asset and the alternative digital asset is required. The conversion rate API query indicating the originally defined digital asset is configured to cause the digital asset exchange system 106 to determine a conversion rate between the originally defined digital asset and a fiat currency (e.g., USD, $). In various embodiments, the conversion rate API query comprises an identifier token associated with the recipient (e.g., user B), and the digital asset exchange system 106 determines a conversion rate between the originally defined digital asset and the fiat currency applicable for the recipient and/or a cohort including the recipient. The conversion rate API query may further comprise a behavioral data object describing behavioral data of the recipient and/or a behavioral cohort including the recipient, and the digital asset exchange system 106 is configured to use the behavioral data object with one or more predictive models, optimization models, machine learning models, and/or the like to determine a conversion rate likely to be perceived as favorable by the recipient.

At step/operation 802 then, a conversion rate API response is receiving originating from the digital asset exchange system 106. The conversion rate API response comprises a first conversion rate between the originally defined digital asset and the fiat currency. For example, the first conversion rate indicates that the five units of the originally defined digital asset is worth USD $10. In various embodiments, the conversion rate API response comprises one or more rate-specific constraints associated with the first conversion rate that constrain use of the first conversion rate in an alternative digital asset, a digital asset conversion, a redemption of the digital asset, and/or the like. An example rate-specific constraint may be a maximum limit of two-hundred units of the originally defined digital asset to convert to the fiat currency at the first conversion rate of five units to USD $10. Various rate-specific constraints may be individual and/or cohort-based.

The process 800 comprises step/operation 803, which involves identifying one or more alternative digital assets based at least in part on behavioral data associated with the recipient (e.g., user B). In various embodiments, the alternative digital assets are identified based at least in part on predicted interest of the recipient. For example, a particular alternative digital asset is predicted to be of more interest to the recipient relative to the originally defined digital asset of the outbound digital asset transfer. Thus, in various embodiments, the one or more alternative digital assets are identified based at least in part on providing a behavioral data object associated with the recipient to one or more predictive models, optimization models, machine learning models, and/or the like configured to predict recipient interest for a digital asset. In various embodiments, the account management system 102 and/or the second client device 104B is configured to identify the one or more alternative digital assets.

The process comprises step/operation 804, step/operation 805, and step/operation 806, which are performed for each identified alternative digital asset, in various embodiments. For an alternative digital asset, a conversion rate API query indicating the alternative digital asset is generated and transmitted to an alternative digital asset exchange system 106B associated with the alternative digital asset, at step/operation 804. The conversion rate API query indicating the alternative digital asset, similar to the conversion rate API query indicating the originally defined digital asset, is configured to cause the alternative digital asset exchange system 106B to determine an alternative conversion rate between the alternative digital asset and the fiat currency, and the conversion rate API query may comprise the identifier token associated with the recipient (e.g., user B) and a behavioral data object associated with the recipient.

At step/operation 805, a conversion rate API response comprising an alternative conversion rate between the alternative digital asset and the fiat currency is received originating from the alternative digital asset exchange system 106B and in response to the conversion rate API query. Similar to the first conversion rate, the alternative conversion rate is associated with various rate-specific constraints, which are also received via the conversion rate API response, in various embodiments.

Step/operation 806 comprises generating an aggregated conversion rate associated with the alternative digital asset based at least in part on the first conversion rate and the alternative conversion rate. The aggregated conversion rate specifically describes a relationship in value between the alternative digital asset and the originally defined digital asset for the outbound digital asset transfer. For example, the aggregated conversion rate indicates that five units of the original digital asset is equivalent in value to sixty units of the alternative digital asset. In various embodiments, the aggregated conversion rate is generated in a substantially transitive manner using the first conversion rate associated with the original digital asset and the alternative conversion rate associated with the alternative digital asset. For example, the aggregated conversion rate of five units of the original digital asset to sixty units of the alternative digital asset is generated based at least in part on a first conversion rate of five units of the original digital asset to USD $1 and an alternative conversion rate of sixty units of the alternative digital asset to USD $1. In various embodiments, the aggregated conversion rate is generated to satisfy one or more rate-specific constraints associated with each of the first conversion rate and the alternative conversion rate. For example, the alternative conversion rate may be composed of one or more rates for one or more different amounts and/or amount tiers (e.g., 5 units to USD $1, 8 units to USD $2, and 15 units to USD $5), and the aggregated conversion rate is transitively generated using a particular tier of the alternative conversion rate in relation to a rate-specific constraint of the first conversion rate (e.g., maximum of USD $4 can be received for converting the original digital asset at a rate of 3 units to USD $1).

With step/operation 804, step/operation 805, and step/operation 806 performed for each alternative digital asset (e.g., identified at step/operation 803), an aggregated conversion rate between the original digital asset and each of the one or more alternative digital assets defined is generated. Process 800 comprises step/operation 807, which comprises providing the one or more aggregated conversion rates via the transfer acceptance query. The transfer acceptance query is configured to enable the recipient (e.g., user B) to select one alternative digital asset. In various embodiments, the one or more aggregated conversion rates are provided as alternative digital asset transfers. For example, the transfer acceptance query comprises an indication of an alternative digital asset transfer by indicating the alternative digital asset and the number of units of the alternative digital asset that would be credited upon execution of the alternative digital asset transfer (e.g., based at least in part on the aggregated conversion rate).

Returning to FIG. 4, a transfer acceptance query defining one or more alternative digital asset transfers is generated (e.g., via process 800) and transmitted to the second client device 104B associated with the recipient (e.g., user B), at step/operation 410. In some embodiments, the transfer acceptance query requires a transfer acceptance response originating from the recipient (e.g., via the second client device 104B) to complete processing and execution of the outbound digital asset transfer. For example, the recipient provides a positive transfer acceptance response to proceed with execution of the outbound digital asset transfer and to be credited with the digital asset units. In some instances, the recipient may provide a negative transfer acceptance response to decline the digital asset transfer, and digital asset units are neither debited from the sender nor credited to the recipient.

Accordingly, step/operation 411 comprises determining whether a transfer acceptance response is received originating from the second client device 104B. If a transfer acceptance response has not been received, process 400 continues to step/operation 412, which comprises determining whether one or more configurable time periods have elapsed. The configurable time periods are associated with the first conversion rate, the alternative conversion rates, and/or the aggregated conversion rates. Specifically, the configurable time periods include a refresh time period and/or an execution time period associated with a conversion rate and may be received with a conversion rate API response originating from a digital asset exchange system 106. In particular, a refresh time period associated with a conversion rate (e.g., the first conversion rate, an alternative conversion rate, an aggregated conversion rate) may be configured to indicate a time period within which the conversion rate is accurate with regard to the value of a digital asset (e.g., the original digital asset, an alternative digital asset), and the elapsing or expiration of a refresh time period is configured to cause a new and updated conversion rate to be determined. Similarly, the execution time period associated with a conversion rate indicates a time period within which a digital asset conversion, redemption, and/or the like may be executed at the conversion rate. For a digital asset that is particularly volatile in value, the execution time period provides indicative and temporary stability, such that a digital asset conversion, redemption, and/or the like may be executed without unpredictable, unforeseen, and volatile value and unit amounts.

In various embodiments, the one or more configurable time periods include an expiration time period for the digital asset transfer. The expiration time period may be configured by the account management system 102 and/or specified by the sender (e.g., user A). The expiration time period indicates a time period within which the digital asset transfer is valid and may be executed, and elapsing or expiration of the expiration time period causes further processing and execution of the digital asset transfer to stop. Accordingly, a transfer acceptance response from the recipient (e.g., user B) is required within the expiration time period, in various embodiments.

Thus, if it is determined that the one or more configurable time periods have not elapsed, process 400 continues to determine whether a transfer acceptance response has been received, at step/operation 411. Otherwise, if it is determined that one or more configurable time periods have elapsed, the alternative digital asset transfers provided via the transfer acceptance query are generated again and updated, at step/operation 410, such that the recipient (e.g., user B) is provided with current, real-time, and accurate information relating to each alternative digital asset transfer. In various embodiments, a determination that the expiration time period has elapsed causes cancelation and/or invalidation of the transfer acceptance query provided to the recipient (e.g., user B) and notification to the sender (e.g., user A) that the recipient failed to respond within the expiration time period.

Returning to step/operation 411, a determination that a transfer acceptance response has been received originating from the second client device 104B leads to step/operation 413 being performed. To be specific, the transfer acceptance response being a negative transfer acceptance response (e.g., the recipient declines the outbound digital asset transfer) results in the sender being notified of the negative transfer acceptance response, and no digital asset transfer is executed. Otherwise, step/operation 413 is performed when a positive transfer acceptance response is received.

Step/operation 413 comprises executing either the digital asset transfer or an alternative digital asset transfer indicated by the transfer acceptance response. That is, the transfer acceptance response, in response to the transfer acceptance query, indicates whether the recipient has selected to proceed with the original digital asset transfer defined by the sender or to proceed with an alternative digital asset transfer. In accordance with the recipient selecting to proceed with the original digital asset transfer, the original digital asset transfer is executed, at step/operation 413. Otherwise, a particular one of the alternative digital asset transfers provided via the transfer acceptance query is executed, at step/operation 413, in accordance with the selection of the recipient (e.g., user B).

As previously discussed, the original digital asset transfer may be for an internally-custodied digital asset (e.g., managed by the account management system 102) or for an externally-custodied digital asset (e.g., managed by the digital asset exchange system 106). Turning to FIG. 6, process 600 is provided for execution of the original digital asset transfer for an internally-custodied digital asset, and in particular, an internally-custodied digital asset managed by the account management system 102 in a closed-loop environment. Thus, step/operation 413 may be embodied by process 600 for executing the original outbound digital asset transfer. In various embodiments, the account management system 102 comprises means, such as processing element 205, memories 210, 215, network interface 220, and/or the like, for performing each step/operation of process 600 to execute the original digital asset transfer for an internally-custodied digital asset.

Process 600 comprises step/operation 601 for executing a first closed-loop transaction to debit of a number of digital asset units from a first digital asset user account. Specifically, the number of digital asset units is the number of digital asset units defined for the outbound digital asset transfer (e.g., defined in the digital asset transfer query received at step/operation 401), and the debit of the digital asset units is from the digital asset user account associated with the sender (e.g., user A) and specific to the originally defined internally-custodied digital asset.

The first closed-loop transaction occurs within the closed-loop environment for the originally defined internally-custodied digital asset and accordingly involves and is processed by the account management system 102, which is associated with the central operating or managing entity of the closed-loop environment for the originally defined internally-custodied digital asset. The first closed-loop transaction (e.g., a closed-loop debit) involves moving digital asset units from the first digital asset user account to a central operating account (e.g., a reserve) of the closed-loop environment.

In various instances when the originally defined internally-custodied digital asset is a cryptoasset or a cryptocurrency digital asset, the first closed-loop transaction is an off-chain transaction. The off-chain transaction is a transaction of a digital asset not recorded on a distributed ledger (e.g., a blockchain). As such, the off-chain transaction may be processed, agreed upon, verified, and/or the like by entities involved in the off-chain transaction (e.g., the account management system 102), but the off-chain transaction may be unknown to participants of the distributed ledger who are not involved in the off-chain transaction. An off-chain transaction may rely on external validation methods, as an off-chain transaction is not recorded on a distributed ledger and may not be verified or validated based at least in part on distributed ledger public key values and/or distributed ledger private key values. In an exemplary illustrative scenario, the internally-custodied digital asset is Bitcoin managed in a closed-loop environment by the account management system 102, and the first closed-loop transactions involves moving Bitcoin units from the digital asset user account to the central operating account.

At step/operation 602 then, a first transaction record data object is generated, and the first transaction record data object describes the closed-loop debit from the sender (e.g., user A). In managing the internally-custodied digital asset, the account management system 102 is configured to generate and store a plurality of transaction record data objects such that a comprehensive history of transactions within the closed-loop environment of the internally-custodied digital asset is maintained. In an example embodiment, the account management system 102 generates and stores the first transaction record data object in a database configured to store a plurality of transaction record data objects for the closed-loop environment of the internally-custodied digital asset.

The first transaction record data object describes aspects of the first closed-loop transaction (e.g., the closed-loop debit) including the sender, the number of digital asset units debited, the time of the transaction, and/or the like. In various embodiments, the first transaction record data object comprises one or more identifiers for the sender, such as a name, a username, an identifying code or value, and/or the like, and/or the identifier token associated with the sender. The first transaction record data object may be associated with a record identifier or identifying value such that the first transaction record data object may be identified, located, retrieved, accessed, and/or the like at a future point in time.

Step/operation 603 comprises executing a second closed-loop transaction to credit the number of digital asset units to a second digital asset user account, and in various embodiments, step/operation 603 is performed subsequent to at least step/operation 601. The number of digital asset units credited to the second digital asset user account is substantially the same as and/or based at least in part on the number of digital asset units debited from the first digital asset user account associated with the sender. The second digital asset user account is the digital asset user account associated with the recipient (e.g., user B) and is specific to the internally-custodied digital asset. In various embodiments, the second digital asset user account is credited with digital asset units from the central operating account for the closed-loop environment for the internally-custodied digital asset. Accordingly, the second closed-loop transaction (e.g., the closed-loop credit) is performed subsequent to the first closed-loop transaction (e.g., the closed-loop debit), such that a balance of the central operating account does not decrease below a threshold number of digital asset units.

At step/operation 604 then, a second transaction record data object is generated, and the second transaction record data object describes the second closed-loop transaction, which may be an off-chain credit transaction for a cryptoasset or a cryptocurrency digital asset. In various embodiments, the second transaction record data object is associated with, references, is stored with, and/or the like the first transaction record data object due to both being involved in the outbound digital asset transfer. The second transaction record data object is stored in the database configured to store a plurality of transaction record data objects for the closed-loop environment of the internally-custodied digital asset, in some embodiments.

With the outbound digital asset transfer for an internally-custodied digital asset being executed via closed-loop transactions, as described by FIG. 6, various embodiments of the present disclosure improve the efficiency of processing and execution of digital asset transfers. Such closed-loop transactions are inherently enabled by both the sender and the recipient being parties to or members of the closed-loop environment for the internally-custodied digital asset and managed by the account management system 102. Closed-loop transactions are processed by the account management system 102, and as being responsible for the management of the closed-loop environment, the account management system 102 does not need to rely on other entities (e.g., external entities associated with a distributed ledger for a cryptoasset or a cryptocurrency digital asset) to process and validate closed-loop transactions within the closed-loop environment. As such, processing and execution time for debits and credits of the internally-custodied digital asset are improved, resulting in the recipient (e.g., user B) of the outbound digital asset transfer being credited with digital asset units within milliseconds or seconds.

As previously discussed, the original and outbound digital asset transfer may instead be for an externally-custodied digital asset managed by the digital asset exchange system 106 and/or an entity associated with the digital asset exchange system 106. FIG. 7 provides process 700 for execution of the original digital asset transfer for an externally-custodied digital asset. Thus, step/operation 413 for executing the original outbound digital asset transfer may be embodied by process 700 in instances when the original outbound digital asset transfer defines an externally-custodied digital asset. In various embodiments, the account management system 102 comprises means, such as processing element 205, memories 210, 215, network interface 220, and/or the like, for performing each step/operation of process 700 to execute a digital asset transfer for an externally-custodied digital asset.

Process 700 comprises step/operation 701, at which a first transfer execution API query is generated and transmitted to the digital asset exchange system 106 associated with the externally-custodied digital asset. The first transfer execution API query is configured to cause the digital asset exchange system 106 to debit a number of digital asset units from a first digital asset user account. Specifically, the first transfer execution API query indicates the number of digital asset units defined for the outbound digital asset transfer (e.g., via the digital asset transfer query received at step/operation 401) and identifies the digital asset user account associated with the sender (e.g., user A) and specific to the externally-custodied digital asset. In various embodiments, the first transfer execution API query identifies the first digital asset user account via the identifier token associated with the sender (e.g., user A). Additionally or alternatively, the first transfer execution API query may comprise one or more identifiers (e.g., an account number, a username, an e-mail address, a routing number) associated with the first digital asset user account.

At step/operation 702, a confirmation indicating that the debit was executed and completed is received originating from the digital asset exchange system 106. In various embodiments, the confirmation is provided via an API response to the first transfer execution API query. The confirmation may comprise and/or may be received with a transaction record data object describing the debit, such as the time of debit, the number of digital asset units debited, and the first digital asset user account.

Step/operation 703 comprises generating and transmitting a second transfer execution API query to the digital asset exchange system 106 associated with the externally-custodied digital asset, and the second transfer execution API query is configured to cause the digital asset exchange system 106 to credit a number of digital asset units to a second digital asset user account. In various embodiments, step/operation 703 is performed at some point in time after at least step/operation 701 is performed, such that the digital asset exchange system 106 and/or the entity associated with the digital asset exchange system 106 remains in possession or ownership of at least a threshold number of units of the externally-custodied digital asset. That is, the debit of digital asset units occurs first to ensure sufficiency for the credit of digital asset units to the recipient (e.g., user B).

The second transfer execution API query specifically indicates the number of digital asset units to credit to the second digital asset user account, which may be the same as and/or based at least in part on the number of digital asset units debited from the sender (e.g., user A). The second transfer execution API query further identifies the second digital asset user account, which is the digital asset user account associated with the recipient (e.g., user B) and specific to the externally-custodied digital asset. Similar to the first transfer execution API query, the second transfer execution API query may identify the second digital asset user account for the digital asset exchange system 106 using one or more identifiers (e.g., an account number, a username, an e-mail address, a routing number) and/or the identifier token associated with the recipient (e.g., user B).

At step/operation 704, a confirmation indicating that the credit was executed and completed is received originating from the digital asset exchange system 106. In various embodiments, the confirmation is provided via an API response to the second transfer execution API query. The confirmation may comprise and/or may be received with a transaction record data object describing the credited, such as the time of credit, the number of digital asset units credited, and the second digital asset user account.

Accordingly, various embodiments of the present disclosure provide for the efficient execution of digital asset transfers for externally-custodied digital assets. For example, the account management system 102 is configured to (e.g., through at least process 600 and process 700) process digital asset transfers for a large variety of digital assets whether they be internally-custodied or externally-custodied. Regarding digital asset transfers for externally-custodied digital assets specifically, various embodiments communicate via transfer execution API queries to a digital asset exchange system 106 to efficiently cause digital asset units to be debited from and credited to digital asset user accounts by the digital asset exchange system 106. Such communication effectively reduces overall system load experienced by the digital asset exchange system 106, as the digital asset exchange system 106 does not need to process large amounts of information regarding a digital asset transfer and generally only needs to validate received transfer execution API queries.

As previously described, step/operation 413 may comprise execution of an alternative digital asset transfer if selected by the recipient (e.g., user B) and indicated by the transfer acceptance response (e.g., received at step/operation 411). Accordingly, FIG. 9A and FIG. 9B provide process 900 for execution of an alternative digital asset transfer. Thus, step/operation 413 may be embodied in some instances by process 900 when the recipient (e.g., user B) has selected an alternative digital asset transfer and when the transfer acceptance response indicates the alternative digital asset transfer selected by the recipient (e.g., user B). In various embodiments, the account management system 102 comprises means, such as processing element 205, memories 210, 215, network interface 220, and/or the like, for performing each step/operation of process 900 to execute an alternative digital asset transfer.

Process 900 comprises step/operation 901, at which an alternative digital asset user account associated with the recipient (e.g., user B) and specific to the alternative digital asset for the alternative digital asset transfer is identified. Identifying the alternative digital asset user account involves retrieving and/or receiving an account balance data object corresponding to the alternative digital asset user account. In some example instances, the alternative digital asset selected by the recipient (e.g., user B) is an internally-custodied digital asset, and the account balance data object corresponding to the alternative digital asset user account is retrieved (e.g., from memory 210 and/or 215, from a database) by the account management system 102, similar to step/operation 402 and step/operation 403. In other example instances, the alternative digital asset selected by the recipient is an externally-custodied digital asset, and the account balance data object corresponding to the alternative digital asset user account is received originating from the alternative digital asset exchange system 106B by the account management system 102 responsive to an account query, similar to step/operation 404, step/operation 405, step/operation 406, and step/operation 407.

In various embodiments, identifying the alternative digital asset user account comprises identifying one or more transfer conditions, thresholds, and limits applicable to the recipient (e.g., user B) and/or the alternative digital asset user account. These transfer conditions, thresholds, and limits are configurable by the account management system 102, the alternative digital asset exchange system 106B, an authoritative entity, and/or the like. As previously discussed, transfer conditions, thresholds, and limits may include individual and/or cohort-based limits. Accordingly, step/operation 902 comprises determining whether one or more transfer conditions, thresholds, and limits applicable to the recipient (e.g., user B) and/or the alternative digital asset user account are satisfied.

If it is determined that one or more transfer conditions, thresholds, and limits are not satisfied, process 900 continues to step/operation 903, at which a notification of invalid alternative digital asset transfer is generated and transmitted to the second client device 104B associated with the recipient (e.g., user B). For example, user B is notified that user B's selection of a cryptocurrency digital asset as an alternative digital asset is prohibited or limited by some transfer condition, threshold, or limit. In some instances, the notification comprises one or more indications as to why the alternative digital asset transfer is invalid.

Process 900 comprises step/operation 904, which may be performed upon determination that the one or more transfer conditions, thresholds, and limits are satisfied. Step/operation 904 comprises determining a number of alternative digital asset units to be credited to the recipient (e.g., user B) based at least in part on the aggregated conversion rate associated with the alternative digital asset. Specifically, the aggregated conversion rate is used along with the defined number of original digital asset units for the digital asset transfer to determine the number of alternative digital asset units to be credited to the recipient (e.g., user B). For example, the aggregated conversion rate indicates that five units of the original digital asset are equivalent in value to sixty units of the alternative digital asset, and when twenty units of the original digital asset are specified by the sender for the original digital asset transfer, the alternative digital asset for the alternative digital asset would then involve the credit of two-hundred-forty units of the alternative digital asset to the recipient (e.g., user B).

With the determination of the number of alternative digital asset units to credit and the already-defined number of original digital asset units to debit, the alternative digital asset transfer is executed. FIG. 9B illustrates additional steps/operations of process 900 for the execution of the alternative digital asset transfer. In particular, FIG. 9B illustrates steps/operations of process 900 for four different exemplary scenarios: (A) the original digital asset is an externally-custodied digital asset, and the alternative digital asset selected by the recipient is another externally-custodied digital asset; (B) the original digital asset is an externally-custodied digital asset, and the alternative digital asset selected by the recipient is an internally-custodied digital asset; (C) the original digital asset is an internally-custodied digital asset, and the alternative digital asset selected by the recipient is an externally-custodied digital asset; and (D) the original digital asset is an internally-custodied digital asset, and the alternative digital asset selected by the recipient is another internally-custodied digital asset.

Referring first to exemplary scenario A, step/operation 911 comprises causing the number of original digital asset units to be debited from the digital asset user account associated with the sender and specific to the original digital asset via the digital asset exchange system 106. At step/operation 911, original digital asset units are debited from the sender similar to the debit performed in step/operation 701 and step/operation 702. That is, step/operation 911 comprises generating and transmitting a transfer execution API query defining a debit (e.g., indicating the number of units to debit and the digital asset user account to debit) to the digital asset exchange system 106, and receiving confirmation originating from the digital asset exchange system 106 that the debit was executed and completed.

Step/operation 912 comprises causing the number of alterative digital asset units to be credited to the alternative digital asset user account via the alternative digital asset exchange system 106B. Similar to step/operation 912, step/operation 912 comprises generating a transmitting a transfer execution API query defining a credit (e.g., indicating the number of units to credit and the digital asset user account to credit) to the alternative digital asset exchange system 106B and receiving confirmation originating from the alternative digital asset exchange system 106 that the credit was executed and completed.

Because step/operation 911 and step/operation 912 involve different digital assets, the debit of step/operation 911 and the credit of step/operation 912 each require a settlement, as the debit and the credit do not balance each other in the same economy. Thus, at step/operation 913, a first fiat currency transaction is executed with the digital asset exchange system 106 associated with the original digital asset for the debit of original digital asset units. In particular, the first flat currency transaction is a settlement for the debit of original digital asset units and involves a number of fiat currency units determined based at least in part on the first conversion rate between the original digital asset and the fiat currency. During the first fiat currency transaction, the flat currency units are paid from the digital asset exchange system 106 to the account management system 102. Effectively, the account management system 102 sells the number of original digital asset units on behalf of the sender (e.g., user A).

At step/operation 914, a second fiat currency transaction is executed with the alternative digital asset exchange system 106B associated with the alternative digital asset for the credit of alternative digital asset units. In particular, the second currency transaction is a settlement for the credit of alternative digital asset units and involves a number of fiat currency units determined based at least in part on the alternative conversion rate between the alternative digital asset and the fiat currency. During the second fiat currency transaction, the fiat currency units are paid from the account management system 102 to the alternative digital asset exchange system 106B. Effectively, the account management system 102 purchases the number of alternative digital asset units for the recipient (e.g., user B). It will be understood that the number of fiat currency units received by the account management system 102 at step/operation 913 and the number of fiat currency units paid by the account management system 102 at step/operation 914 are substantially similar or the same, as the debit of original digital asset units and the credit of alternative digital asset units are based at least in part on the aggregated conversion rate between the original digital asset and the alternative digital asset.

Each of the first fiat currency transaction and the second fiat currency transaction may be configured to settle more than one debit of digital asset units and more than one credit of digital asset units, in various embodiments. For example, the account management system 102 generates, updates, records, and/or the like a settlement record data object describing a plurality of debits with the digital asset exchange system 106 within a configurable time period (e.g., for a plurality of digital asset transfers between different end users). The account management system 102 is then paid in the first fiat currency transaction for the plurality of debits based at least in part on transmitting the settlement record data object to the digital asset exchange system 106. Likewise, the account management system 102 generates, updates, records, and/or the like a settlement record data object describing a plurality of credits with the alternative digital asset exchange system 106B within a configurable time period (e.g., for a plurality of digital asset transfers between different end users). The account management system 102 may then pay the alternative digital asset exchange system 106B for the plurality of credits with one fiat currency transaction and may provide the settlement record data object in doing so. When executing one fiat currency transaction to settle a plurality of debits of digital asset units or a plurality of credits of digital asset units, various embodiments of the present disclosure advantageously reduce network bandwidth and network load.

Turning now to exemplary scenario B, step/operation 921 comprises causing the number of original asset units to be debited from the digital asset user account associated with the sender (e.g., user A) and specific to the original digital asset via the digital asset exchange system 106 associated with the original digital asset. In various embodiments, the debit is caused via generating and transmitting a transfer execution API query to the digital asset exchange system 106.

At step/operation 922, a closed-loop transaction to credit the number of alternative digital asset units to the alternative digital asset user account (e.g., a closed-loop credit) is executed. The closed-loop credit is executed at step/operation 922 similar to step/operation 601 and step/operation 602, and a transaction record data object describing the off-chain credit transaction is generated and stored by the account management system 102. As discussed, the closed-loop transaction involves transferring, moving, distributing, and/or the like digital asset units from a central operating account of the closed-loop environment for the alternative digital asset to the alternative digital asset user account.

Step/operation 923 comprises executing a fiat currency transaction with the digital asset exchange system 106 to settle the debit of original digital asset units at step/operation 921. In the fiat currency transaction, the account management system 102 effectively receives payment from the digital asset exchange system 106 and/or the entity associated with the digital asset exchange system 106 for the sale of the sender's (e.g., user A's) digital asset units.

In various embodiments, the account management system 102 executes an open-loop transaction based at least in part on the closed-loop credit to the alternative digital asset user account. The account management system 102 is configured to monitor the balance of the central operating account of the closed-loop environment for the alternative digital asset and determine whether various balance thresholds are satisfied. In some instances, the closed-loop credit may cause the balance of the central operating account to not satisfy one or more balance thresholds, and the account management system 102 executes an open-loop transaction to manage the balance of the central operating account. In an example embodiment, the alternative digital asset is a cryptoasset or a cryptocurrency digital asset, and the open-loop transaction is an on-chain transaction involving the purchase of additional units of the cryptoasset or a cryptocurrency digital asset by the account management system 102 and/or the entity associated with the account management system 102 in order to adequately supply the closed loop environment for the cryptoasset or a cryptocurrency digital asset (e.g., by funding the central operating account). The account management system 102 executes the on-chain transaction based at least in part on committing an on-chain transaction record data object to a distributed ledger (e.g., a blockchain) for the alternative digital asset. In various instances, multiple closed-loop credits may be executed (e.g., in an off-chain manner) within a short amount of time for multiple alternative and/or original digital asset transfers, and the account management system 102 is configured to preemptively execute an open-loop transaction (e.g., on-chain transaction) based at least in part on projecting and predicting the balance of the central operating account using one or more predictive models, projection models, optimization models, machine learning models, and/or the like.

Turning now to exemplary scenario C, step/operation 931 comprises executing a closed-loop transaction to debit the number of original digital asset units from the digital asset user account associated with user A (e.g., a closed-loop debit) and specific to the original digital asset. Execution of the closed-loop debit comprises generating a transaction record data object describing the off-chain debit transaction. The account management system 102 may execute an open-loop transaction (e.g., on-chain transaction) based at least in part on the executed closed-loop debit and one or more balance thresholds for the central operating account. The executed closed-loop debit results in an increase in balance of the central operating account, and to comply with regulations, for example, an open-loop sale of the original digital asset may be executed. For example, an on-chain sale of a cryptoasset or a cryptocurrency digital asset involving committing a transaction record data object to a distributed ledger (e.g., a blockchain) is executed.

Step/operation 932 comprises causing the number of alternative digital asset units to be credited to the alternative digital asset user account associated with the recipient (e.g., user B) via the alternative digital asset exchange system 106B. Step/operation 932 accordingly may comprise generating and transmitting a transfer execution API query to the alternative digital asset exchange system 106B.

At step/operation 933, a fiat currency transaction is executed to settle the credit of alternative digital asset units with the alternative digital asset exchange system 106B. During the fiat currency transaction, the account management system 102 pays fiat currency units to the alternative digital asset exchange system 106B to effectively complete the purchase of the alternative digital asset units for the recipient (e.g., user B). The fiat currency transaction at step/operation 933 may serve to settlement multiple credits of alternative digital asset units, in various embodiments.

Turning now to exemplary scenario D, step/operation 941 comprises executing a first closed-loop transaction (e.g., an off-chain transaction) to debit the number of original digital asset units from the digital asset user account associated with the sender (e.g., user A), or executing a closed-loop debit. Step/operation 941 is followed by step/operation 942, which comprises executing a second closed-loop transaction (e.g., an off-chain transaction) to credit the number of alternative digital asset units to the alternative digital asset user account, or executing a closed-loop credit. For each of the original digital asset and the alternative digital asset (whose close-loop environments are independent), open-loop transactions (e.g., on-chain transactions committed to a distributed ledger) may be executed to in order to maintain a satisfactory balance for each respective central operating account.

Each exemplary scenario of an alternative digital asset transfer then, the sender (e.g., user A) is debited by the number of original digital asset units, and the recipient (e.g., user B) is credited with the number of alternative digital asset units. In each exemplary scenario, the debit of original digital asset units precedes the credit of alternative digital asset units.

Returning to FIG. 4 then, step/operation 413 is executed (e.g., and embodied by process 600, process 700, and/or process 900) to debit digital asset units from the sender (e.g., user A) and to credit digital asset units to the recipient (e.g., user B).

Process 400 comprises step/operation 414, which comprises generating and providing a first notification to the first client device 104A associated with the sender (e.g., user A). The first notification indicates the execution of the digital asset transfer or the alternative digital asset transfer. In doing so, the first notification may describe the digital asset transfer or the alternative digital asset transfer, such as by indicating the recipient (e.g., user B), the number of digital asset units transferred (e.g., debited from user A and credited to user B), the resulting balance of the digital asset user account associated with the sender (e.g., user A), the time of execution, and/or the like.

Process 400 additionally comprises step/operation 415, which comprises generating and providing a second notification to the second client device 104B associated with the recipient (e.g., user B) to indicate the execution of the digital asset transfer or the alternative digital asset transfer. The second notification similarly describes the digital asset transfer or the alternative digital asset transfer, such as by indicating the sender (e.g., user A), the number of digital asset units transferred, the resulting balance of the digital asset user account associated with the recipient, the time of execution, and/or the like.

At step/operation 416, the first account balance data object and the second account balance data object are both updated. As previously described, the first account balance data object corresponds to the digital asset user account associated with the sender, and the second account balance data object corresponds to the digital asset user account associated with the recipient (e.g., or the alternative digital asset user account). Each account balance data object is updated based at least in part on the execution of the digital asset transfer or the alternative digital asset transfer. In various embodiments, each account balance data object is updated to comprise, reference, associate with, and/or the like a transaction record data object (e.g., a transaction record data object describing a closed-loop debit or a closed-loop credit, an off-chain transaction record data object, a transaction record data object received from the digital asset exchange system 106). The first account balance data object is updated to describe the present balance of the digital asset user account associated with the sender resulting from the debit of digital asset units, and the second account balance data object is updated to describe the present balance of the digital asset user account associated with the recipient resulting from the credit of digital asset units (e.g., original digital asset units, alternative digital asset units).

In various embodiments, behavioral data objects associated with each of the sender and the recipient are also updated. For example, the behavioral data object associated with the sender may be updated to indicate that the sender is willing to transfer a particular digital asset to the recipient. As another example, the behavioral data object associated with the recipient is updated to indicate that the recipient prefers an alternative digital asset more than the original digital asset defined by the sender. As yet another example, the behavioral data object associated with the sender is updated to indicate that the sender routinely transfers a particular number of digital asset units to the recipient.

Having thus described various functions, steps/operations, methods, processes, and/or the like for processing and executing outbound digital asset transfers defined by a sender or a first end user (e.g., user A), additional embodiments generally relating to outbound digital asset transfers are herein described in the context of various user interfaces. In various embodiments, the user interfaces provided and described in the present disclosure are configured to be provided via a client device 104 (e.g., via a display 316). In other embodiments, the user interfaces may be provided via the account management system 102, a digital asset exchange system 106, and/or other various systems or devices involved in the outbound digital asset transfer.

Figure 10:
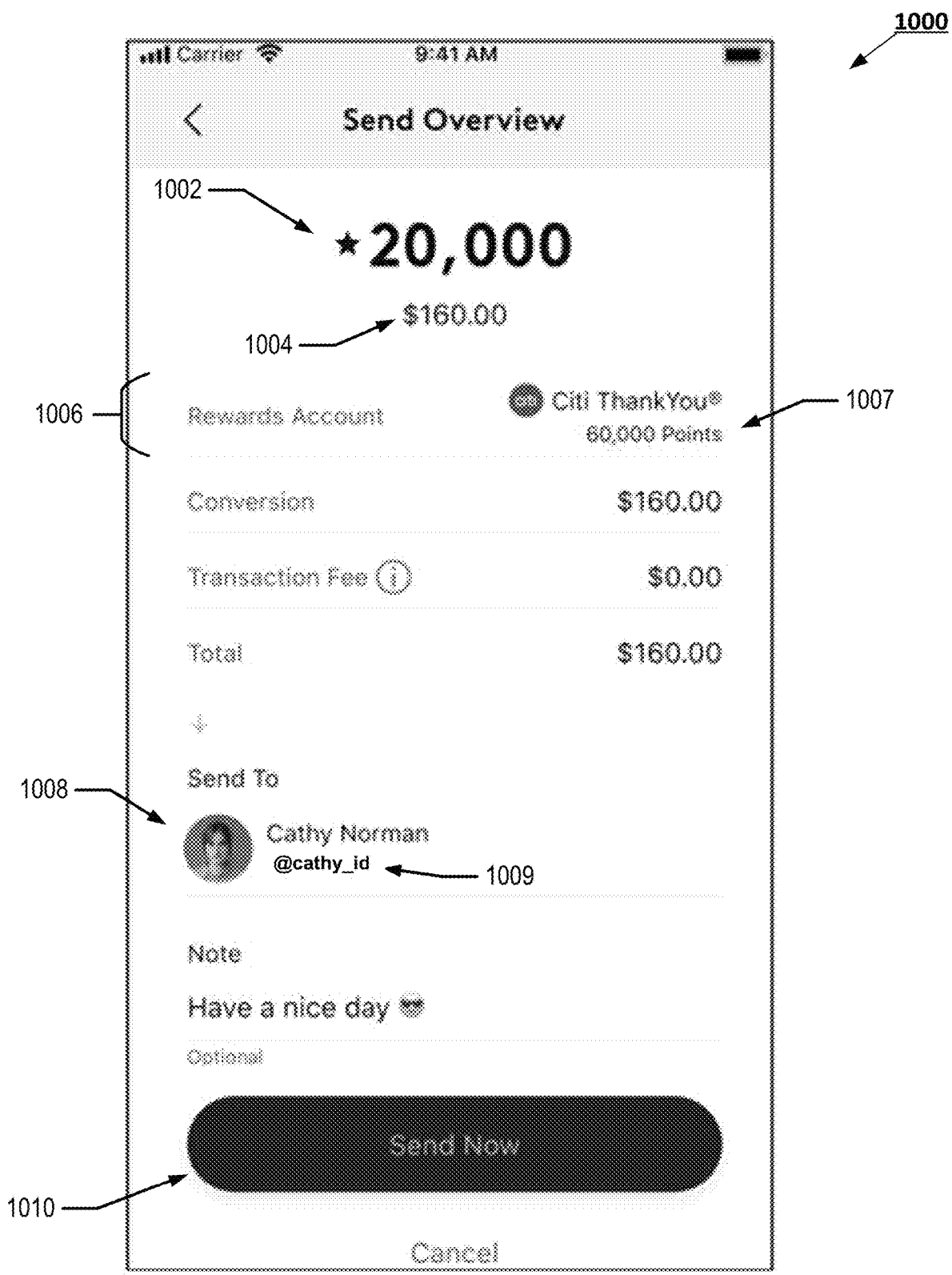

FIG. 10 illustrates a user interface 1000 for defining and initiating an outbound digital asset transfer. User interface 1000 is specifically provided at a first client device 104A associated with the sender, or the end user defining the outbound digital asset transfer (e.g., user A). In various embodiments, a user interface (e.g., user interface 1000) is provided to an end user to enable the end user to define an outbound digital asset transfer. Specifically, the end user may define or specify (e.g., via user interface 1000) a number of digital asset units 1002 to transfer to a recipient. In the illustrated embodiment, user interface 1000 further provides a number of fiat currency units 1004 equivalent in value to the defined or specified number of digital asset units 1002. A conversion rate between the digital asset and the fiat currency is used to determine the number of fiat currency units 1004 equivalent in value to the defined or specified number of digital asset units 1002. In the illustrated embodiment, for example, the digital asset for the digital asset transfer is a banking reward point, and the user interface 1000 indicates that twenty-thousand banking reward points are equivalent in value to USD $160. In various embodiments, the user interface 1000 enables the end user to specify a number of fiat currency units 1004, and the user interface 1000 is configured to automatically generate and provide a number of digital asset units 1002 equivalent in value. Thus, an end user may specify the number of digital asset units 1002 for the digital asset transfer by specifying a number of fiat currency units 1004.

User interface 1000 is further configured to indicate a digital asset user account associated with the end user and specific to the digital asset, or a sender digital asset user account 1006. The user interface 1000 indicates the sender digital asset user account 1006 as the account to debit for the digital asset transfer, and in various embodiments, the end user may select (e.g., via user interface 1000) a particular sender digital asset user account 1006 if the end user is associated with (e.g., owns) multiple digital asset user accounts specific to the digital asset.

The end user further defines or specifies (e.g., via user interface 1000) a recipient 1008 for the digital asset transfer, and user interface 1000 indicates the recipient 1008 with a recipient identifier 1009. In various embodiments, the end user is provided with a list of recipients and is enabled to select a recipient 1008 from the list of recipients (e.g., via user interface 1000). The recipient identifier 1009 is an identifier recognizable, verifiable, recordable, usable, and/or the like by end users, such as an e-mail address and/or a username. In various embodiments, the first client device 104A and/or the account management system 102 is configured to map the recipient identifier 1009 to an identifier token associated with the recipient 1008. Using the identifier token associated with the recipient 1008, the account management system 102 may identify one or more digital asset user accounts associated with the recipient 1008, locate a behavioral data object associated with the recipient 1008, provide information to a digital asset exchange system 106 relating to the recipient 1008, and/or the like.

In the illustrated embodiment, user interface 1000 provides an outbound transfer query mechanism 1010 configured to be interactable with the end user. Responsive to user interaction, the outbound transfer query mechanism 1010 is configured to generate a digital asset transfer query based at least in part on the various aspects defined by the end user (e.g., number of digital asset units 1002, sender digital asset user account 1006, recipient 1008) and transmit the digital asset transfer query to an account management system 102. Thus, the end user, as the sender, may initiate an outbound digital asset transfer via user interface 1000, specifically using the transfer query mechanism 1010.

Figure 11:
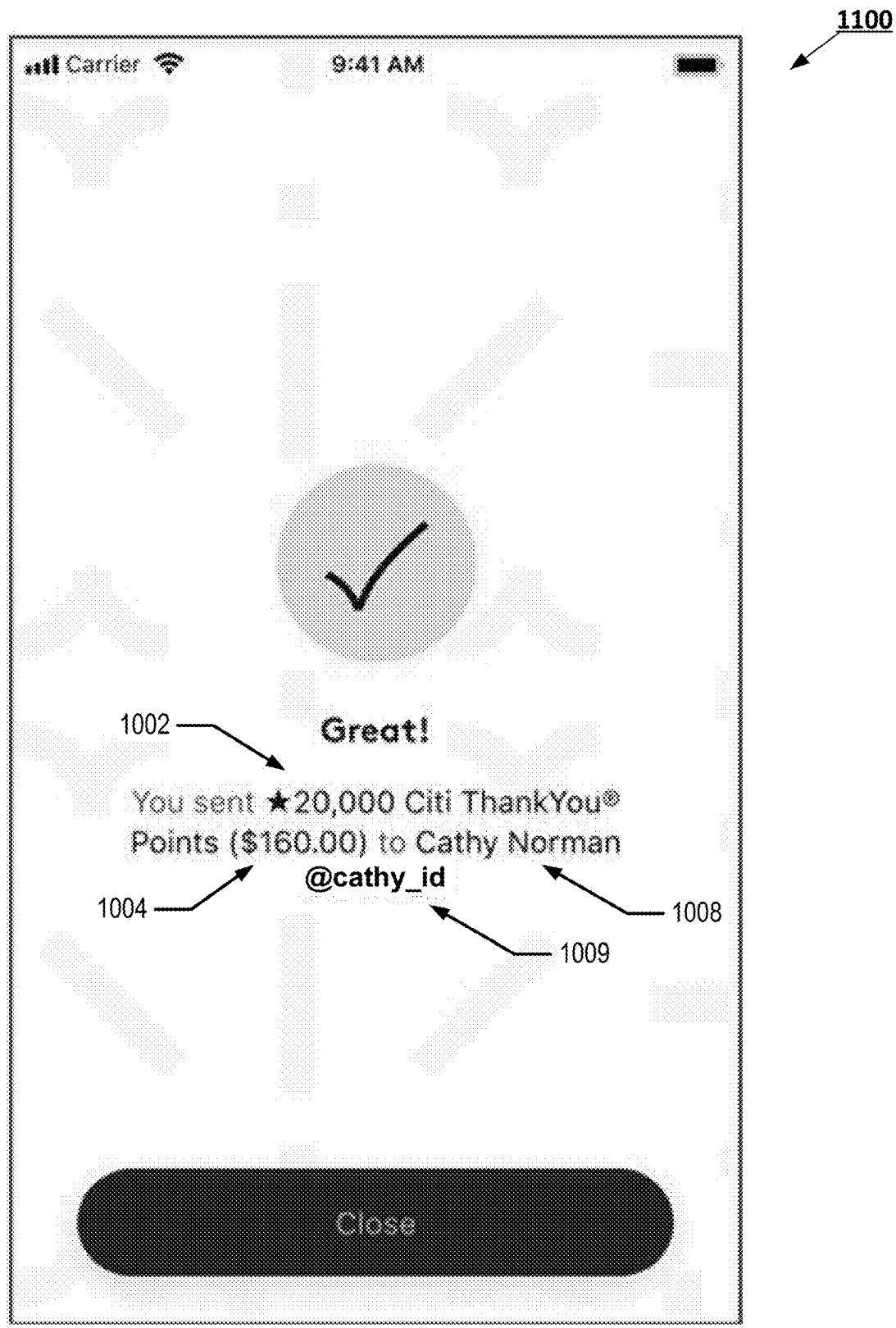

FIG. 11 provides a user interface 1100 that may be provided responsive to user interaction with the outbound transfer query mechanism 1010 of user interface 1000, in various embodiments. The user interface 1100 is provided via the first client device 104A to the end user, or sender (e.g., user A), to confirm that the outbound digital asset transfer has been initiated. In doing so, user interface 1100 may provide confirmation for various aspects of the outbound digital asset transfer, including the number of digital asset units 1002 to transfer, the number of fiat currency units 1004 equivalent in value, the recipient 1008, the recipient identifier 1009, and/or the like.

Figure 12:
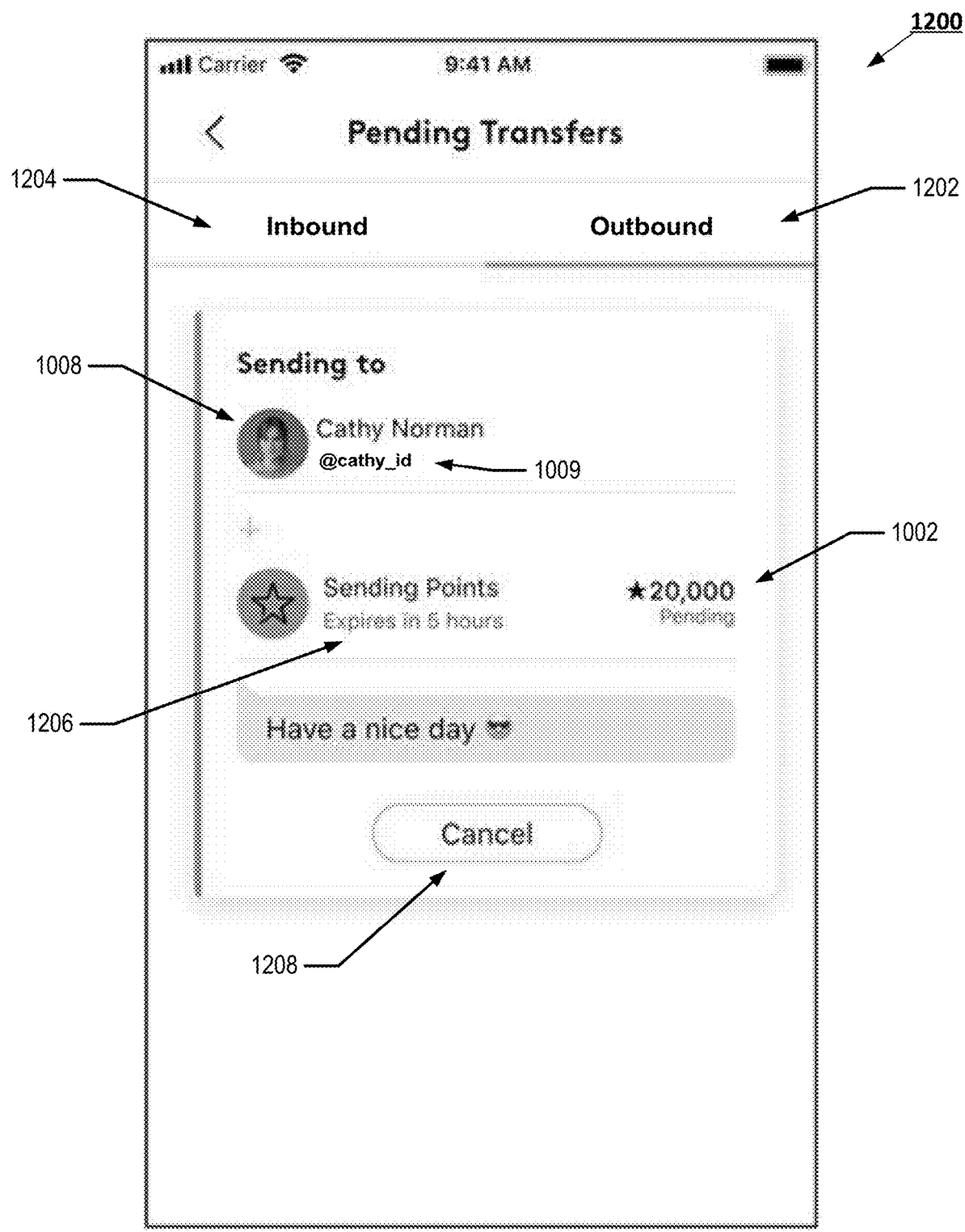

FIG. 12 provides a user interface 1200 that is provided via the first client device 104A to the end user, or sender (e.g., user A) and configured to indicate digital asset transfers that are pending. In the illustrated embodiment, user interface 1200 comprises an outbound selection mechanism 1202 that the end user may interact with to cause outbound digital asset transfers that are pending to be provided by user interface 1200. Likewise, user interface 1200 comprises an inbound selection mechanism 1204 that the end user may interact with to cause inbound digital asset transfers that are pending to be provided by user interface 1200. An outbound digital asset transfer that is pending has not been accepted by the recipient 1008. As discussed, an outbound digital asset transfer may be associated with an expiration time period 1206, which is indicated by user interface 1200. User interface 1200 provides a cancelation mechanism 1208 that the sender may interact with to cancel the outbound digital asset transfer, thereby precluding the recipient from accepting the outbound digital asset transfer.

Figure 13:
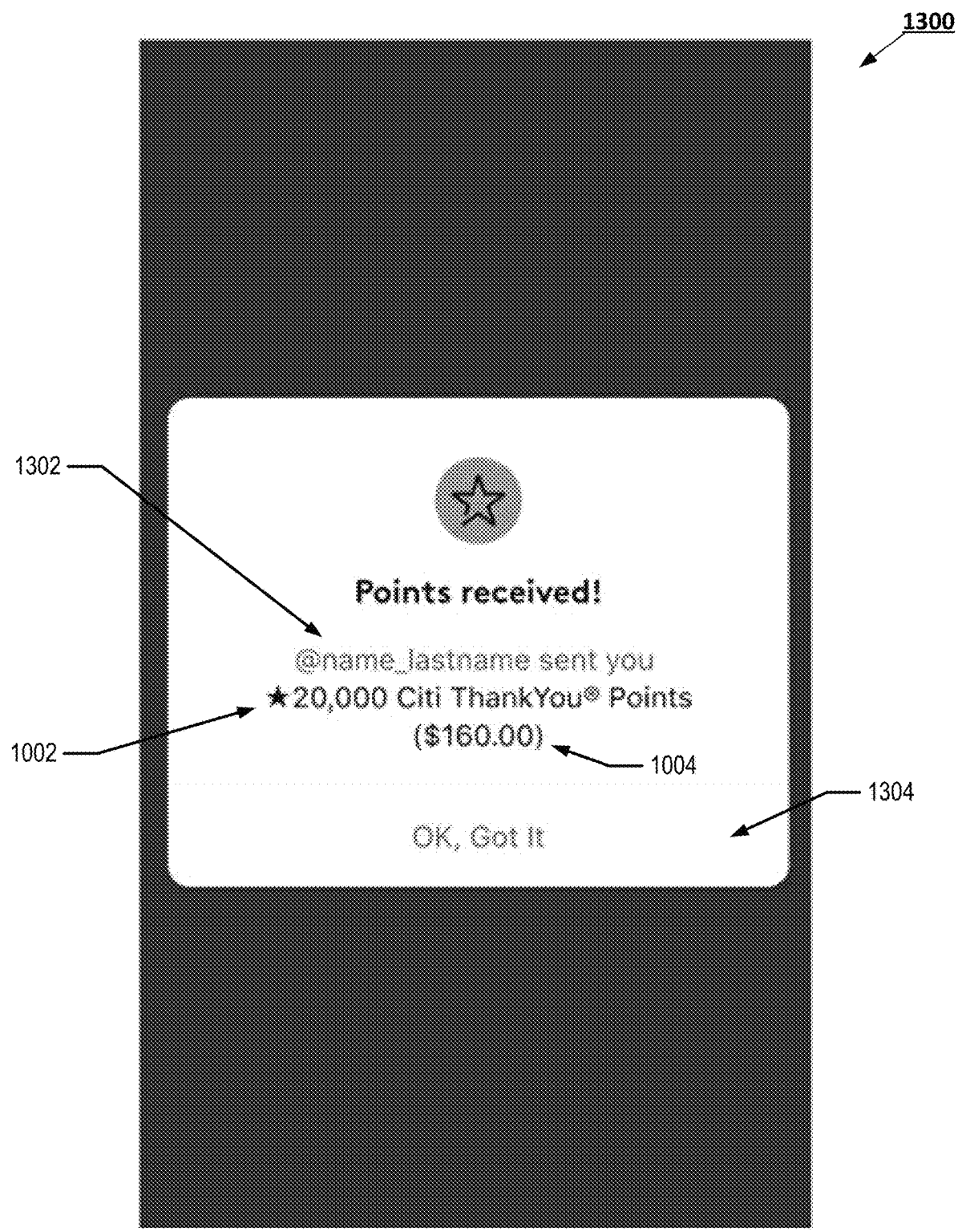

FIG. 13 provides a user interface 1300 that is provided via a second client device 104B to the recipient 1008 (e.g., user B) and configured to provide a transfer acceptance query to the recipient. In various embodiments, user interface 1300 is provided responsive to and/or subsequent to the sender initiating the outbound digital asset transfer (e.g., via the outbound transfer query mechanism 1010 of user interface 1000). The transfer acceptance query provided by user interface 1300 describe the outbound digital asset transfer, such as by identifying the sender (e.g., user A) using a sender identifier 1302 (e.g., a username, an e-mail address). User interface 1300 further indicates the number of digital asset units 1002 being transferred (e.g., being credited to the recipient 1008), as well as the number of fiat currency units 1004 equivalent in value to the number of digital asset units 1002. In providing the transfer acceptance, user interface 1300 comprises a transfer acceptance mechanism 1304 configured to be interactable by an end user (e.g., the recipient 1008). Responsive to user interaction, the transfer acceptance mechanism 1304 causes a transfer acceptance response to be generated and transmitted to the account management system 102, in various embodiments.

b. Exemplary Inbound Digital Asset Transfers

Various embodiments directed to enabling, managing, processing, executing, and/or the like outbound digital asset transfers, for which a first end user (e.g., user A) defining the digital asset transfer is the sender of the digital asset transfer and a second end user (e.g., user B) specified by the first end user is a recipient of the digital asset transfer. Various embodiments of the present disclosure are further directed to enabling, managing, processing, executing, and/or the like inbound digital asset transfer, for which a first end user (e.g., user A) defining the digital asset transfer is the recipient of the digital asset transfer and a second end user (e.g., user B) specified by the first end user is the sender of the digital asset transfer. Thus, the first end user (e.g., user A) defining the digital asset transfer effectively requests digital asset units from the second end user (e.g., user B), or the sender.

FIG. 5A and FIG. 5B illustrate a process 500 for processing and executing an inbound digital asset transfer, in which a first end user (e.g., user A) requests to be sent, gifted, given, paid, and/or the like units of a digital asset from a second end user (e.g., user B). Process 500 includes steps/operations for processing and executing an inbound digital asset transfer for an internally-custodied digital asset and for processing and executing an inbound digital asset transfer for an externally-custodied digital asset. In various embodiments, the account management system 102 comprises means, such as processing element 205, memories, 210, 215, network interface 220, and/or the like, for performing each of the steps/operations of process 500 to process and to execute an inbound digital asset transfer.

Process 500 comprises step/operation 501, and in one embodiment, process 500 begins with and is triggered by step/operation 501. Step/operation 501 comprises receiving a digital asset transfer query originating from the first client device 104A associated with user A and defining an inbound digital asset transfer of a digital asset from user B to user A. The digital asset transfer query is an API request, call, query, and/or the like, in various embodiments. The inbound digital asset transfer is defined by the digital asset transfer query at least with regard to the number of digital asset units to transfer, the sender (e.g., user B), and a digital asset user account associated with user A to be credited with the digital asset units.

Responsive to receiving the digital asset transfer query, process 500 involves retrieving and/or receiving account balance data objects corresponding to digital asset user accounts associated with the recipient (e.g., user A) and the sender (e.g., user B). In various example instances, the digital asset transfer is defined for an internally-custodied digital asset, and step/operation 502 and step/operation 503 are performed. At step/operation 502, a first account balance data object corresponding to a digital asset user account associated with the recipient (e.g., user A) and specific to the internally-custodied digital asset is retrieved (e.g., from memory 210, 215, from a database). The first account balance data object may correspond specifically to a digital asset user account specified and selected by the recipient (e.g., user A) in the digital asset transfer query. At step/operation 503, a second account balance data object corresponding to a digital asset user account associated with the sender (e.g., user B) and specific to the internally-custodied digital asset is retrieved (e.g., from memory 210, 215, from a database).

In various other example instances, the digital asset transfer involves an externally-custodied digital asset. Accordingly, step/operation 504 and step/operation 505 are performed to receive a first account balance data object originating from a digital asset exchange system 106 associated with the externally-custodied digital asset based at least in part on generating and transmitting a first account query. Similarly, step/operation 506 and step/operation 507 involve receiving a second account balance data object originating from the digital asset exchange system 106 based at least in part on generating and transmitting a second account query. Each of the account queries identifies the recipient or the end user; for example, the first account query comprises the identifier token associated with the recipient (e.g., user A), and the second account query comprises the identifier token associated with the sender (e.g., user B). Thus, via communication with the digital asset exchange system 106 associated with the externally-custodied digital asset, account balance data objects that correspond to digital asset user accounts for the recipient (e.g., user A) and the sender (e.g., user B) are received.

Process 500 comprises step/operation 508, which comprises determining whether one or more transfer conditions, thresholds, and limits are satisfied, specifically by the inbound digital asset transfer as defined by the digital asset transfer query received at step/operation 501. As previously described, the one or more transfer conditions, thresholds, and limits may be configured by the account management system 102, the digital asset exchange system 106, an authoritative entity, and/or the like.

In accordance with a determination that one or more transfer conditions, thresholds, and limits are not satisfied, step/operation 509 is performed. Step/operation 509 comprises generating and transmitting a notification of invalid digital asset transfer to the first client device 104A associated with the recipient (e.g., user A). In some instances, the notification of invalid digital asset transfer indicates why the digital asset transfer, such as which specific transfer conditions, thresholds, and limits are not satisfied. However, it may be appreciated that when transfer conditions, thresholds, and limits specific to the sender (e.g., user B) are not satisfied, such indications may not be provided to the recipient (e.g., user A) to maintain privacy of information for the sender (e.g., user B).

Otherwise, the inbound digital asset transfer continues to be processed and executed if the one or more transfer conditions, thresholds, and limits are determined to be satisfied. FIG. 5B illustrates additional steps/operations of process 500 for processing and executing the inbound digital asset transfer.

At step/operation 510, a transfer initiation query is generated and transmitted to a second client device 104B associated with the sender (e.g., user B). In various embodiments, the transfer initiation query serves as and/or represents a notification to the sender (e.g., user B) that digital asset units are being requested of the sender (e.g., user B), by the recipient (e.g., user A) specifically. Thus, the transfer initiation query describes the inbound digital asset transfer, such as be identifying the recipient (e.g., user A) and indicating the number of digital asset units to transfer. In various embodiments, the transfer initiation query is associated with an expiration time period, which is also indicated to the sender (e.g., user B). Thus, the sender (e.g., user B) is made aware of a time period within which the sender may initiate the inbound digital asset transfer.

In some instances, a transfer initiation response for the transfer initiation query is not received originating from the sender within the expiration time period, and the recipient (e.g., user A) is accordingly notified by a notification generated and transmitted to the first client device 104A associated with the recipient (e.g., user A). A negative transfer initiation response for the transfer initiation query may be received originating from the sender (e.g., user A), representing the sender denying, declining, rejecting, and/or the like the request for digital asset units by the recipient (e.g., user B). In such instances, a notification that the sender (e.g., user A) has provided a negative transfer initiation response is generated and provided to the recipient (e.g., user B).

Otherwise, a positive transfer initiation response may be received, and step/operation 511 comprises determining whether the positive transfer initiation response was received after one or more configurable time periods. In particular, the one or more configurable time periods include an account refresh time period. The account refresh time period indicates a time period within which the account balance data objects retrieved and/or received (e.g., in steps/operations 502-507) for digital asset user accounts associated with the recipient (e.g., user A) and the sender (e.g., user B) are valid and accurate.

With a determination that the account refresh time period has elapsed or expired, step/operation 512 is performed to retrieve and/or receive again the first account balance data object and the second account balance data object. In various embodiments, an account refresh time period is configured such that if a positive transfer initiation response is received after elapsing or expiration of the account refresh time period, account balance data objects corresponding to the digital asset user accounts of the sender (e.g., user B) and the recipient (e.g., user A) are retrieved (e.g., from memory 210, 215, from a database) and/or received (e.g., originating from the digital asset exchange system 106) again. As such, various embodiments ensure accurate, current, and real-time account data is referenced and used for execution of the inbound digital asset transfer, particularly for example instances in which the sender (e.g., user B) provides a positive transfer initiation response after a significant amount of time. Retrieving and/or receiving account balance data objects also comprises identifying transfer conditions, thresholds, and limits, and such allows for identification and detection of transfer conditions, thresholds, and limits that have been newly imposed or established during the account refresh time period.

Process 500 comprises step/operation 513, which may be performed in accordance with a determination that the positive transfer initiation response was received before elapsing or expiration of the account refresh time period. Step/operation 513 may also be performed subsequent to retrieving and/or receiving again the account balance data objects. Step/operation 513 comprises determining whether the balance of the digital asset user account associated with the sender (e.g., user B) is sufficient. In various embodiments, additional transfer conditions, thresholds, and limits, such as those identified upon elapsing or expiration of the account refresh data object are also evaluated.

If the balance of the digital asset user account associated with the sender (e.g., user B) is determined to be insufficient for the inbound digital asset transfer, a notification is generating and transmitted to the second client device 104B associated with the sender (e.g., user B). The notification indicates the insufficient balance to the sender (e.g., user B), and in various embodiments, enables the sender (e.g., user B) to select a different digital asset user account to use for the inbound digital asset transfer.

Otherwise, if the balance of the sender's digital asset user account is sufficient, step/operation 515 is performed. Step/operation 515 comprises executing the inbound digital asset transfer according to the positive transfer initiation response. For example, the positive transfer initiation response may indicate a particular digital asset user account selected by the sender (e.g., user B) to use for the inbound digital asset transfer. Execution of the inbound digital asset transfer generally involves the debit of the defined number of digital asset units from the sender (e.g., user B) and the credit of a number of digital asset units to the recipient (e.g., user A). In various embodiments, the number of digital asset units credited to the recipient is substantially the same as and/or based at least in part on the number of digital asset units debited from the sender. Thus, the defined number of digital asset units is effectively "transferred" from the sender (e.g., user B) to the recipient (e.g., user A).

In various embodiments, step/operation 515 for executing the inbound digital asset transfer is similar to step/operation 413 for executing the outbound digital asset transfer. In various example instances, the inbound digital asset transfer involves an internally-custodied digital asset, and step/operation 515 is embodied by process 600, which as previously discussed involves the execution of closed-loop transactions. Specifically, a first closed-loop transaction to debit digital asset units from the digital asset user account of the sender (e.g., user B) is executed, and a second closed-loop transaction to credit digital asset units to the digital asset user account of the recipient (e.g., user A) is executed. In some example instances, the internally-custodied digital asset is a cryptoasset or a cryptocurrency digital asset, and the closed-loop transactions are off-chain transactions. For each closed-loop transaction, a transaction record data object is generated to describe the closed-loop transaction.

In various other example instances, the inbound digital asset transfer involves an externally-custodied digital asset, and step/operation 515 is embodied by process 700. Process 700 involves generating and transmitting transfer execution API queries to the digital asset exchange system 106 associated with the externally-custodied digital asset to cause the defined number of digital asset units to be debited from the digital asset user account associated with the sender (e.g., user B) and the defined number of digital asset units to be credited to the digital asset user account associated with the recipient (e.g., user A). For each of the debit and the credit, a confirmation comprising a transaction record data object is received originating from the digital asset exchange system 106, in various embodiments.

With step/operation 515 being performed according to process 600 or process 700 based at least in part on the digital asset of the inbound digital asset transfer, units of the digital asset owned by the sender (e.g., user B) are effectively transferred to the recipient (e.g., user A). Process 500 comprises step/operation 516, which comprises generating and providing a first notification to the first client device 104A associated with the recipient (e.g., user A) indicating the execution of the inbound digital asset transfer. The notification may indicate aspects of the inbound digital asset transfer including the number of digital asset units transferred, or credited to the recipient (e.g., user A), a resulting balance of the digital asset user account associated with the recipient, the time of execution of the inbound digital asset transfer, the sender (e.g., user B), and/or the like.

Similarly, step/operation 517 comprises generating and providing a second notification to the second client device 104B associated with the sender (e.g., user B) indicating the execution of the inbound digital asset transfer. The notification confirms aspects of the inbound digital asset transfer with the sender (e.g., user B), such as by indicating the number of digital asset units transferred, or debited from the sender (e.g., user B), a resulting balance of the digital asset user account associated with the sender (e.g., user B), a resulting balance of the digital asset user account associated with the sender, the time of execution of the inbound digital asset transfer, the recipient (e.g., user A), and/or the like.

Process 500 comprises step/operation 518 for updating the first account balance data object and the second account balance data object based at least in part on the execution of the inbound digital asset transfer, the first account balance data object corresponding to the digital asset user account associated with the recipient (e.g., user A) and the second account balance data object corresponding to the digital asset user account associated with the sender (e.g., user B). Each account balance data object is updated to comprise a transaction record data object. For example, the first account balance data object is updated to comprise a transaction record data object describing the closed-loop credit of an internally-custodied digital asset. As another example, the first account balance data object is updated to comprise a transaction record data object received originating from the digital asset exchange system 106 and describing the credit of an externally-custodied digital asset. The account balance data objects are also updated to reflect the resulting balances of a respective digital asset user account from the debit or the credit of the inbound digital asset transfer. In various embodiments, behavioral data objects associated with each of the recipient (e.g., user A) and the sender (e.g., user B) are also updated based at least in part on the inbound digital asset transfer.

Having thus described various functions, steps/operations, methods, processes, and/or the like for processing and executing inbound digital asset transfers defined by a recipient or a first end user (e.g., user A), additional embodiments generally relating to inbound digital asset transfers are herein described in the context of various user interfaces. In various embodiments, the user interfaces provided and described in the present disclosure are configured to be provided via a client device 104 (e.g., via a display 316). In other embodiments, the user interfaces may be provided via the account management system 102, a digital asset exchange system 106, and/or other various systems or devices involved in the inbound digital asset transfer.

Figure 14:
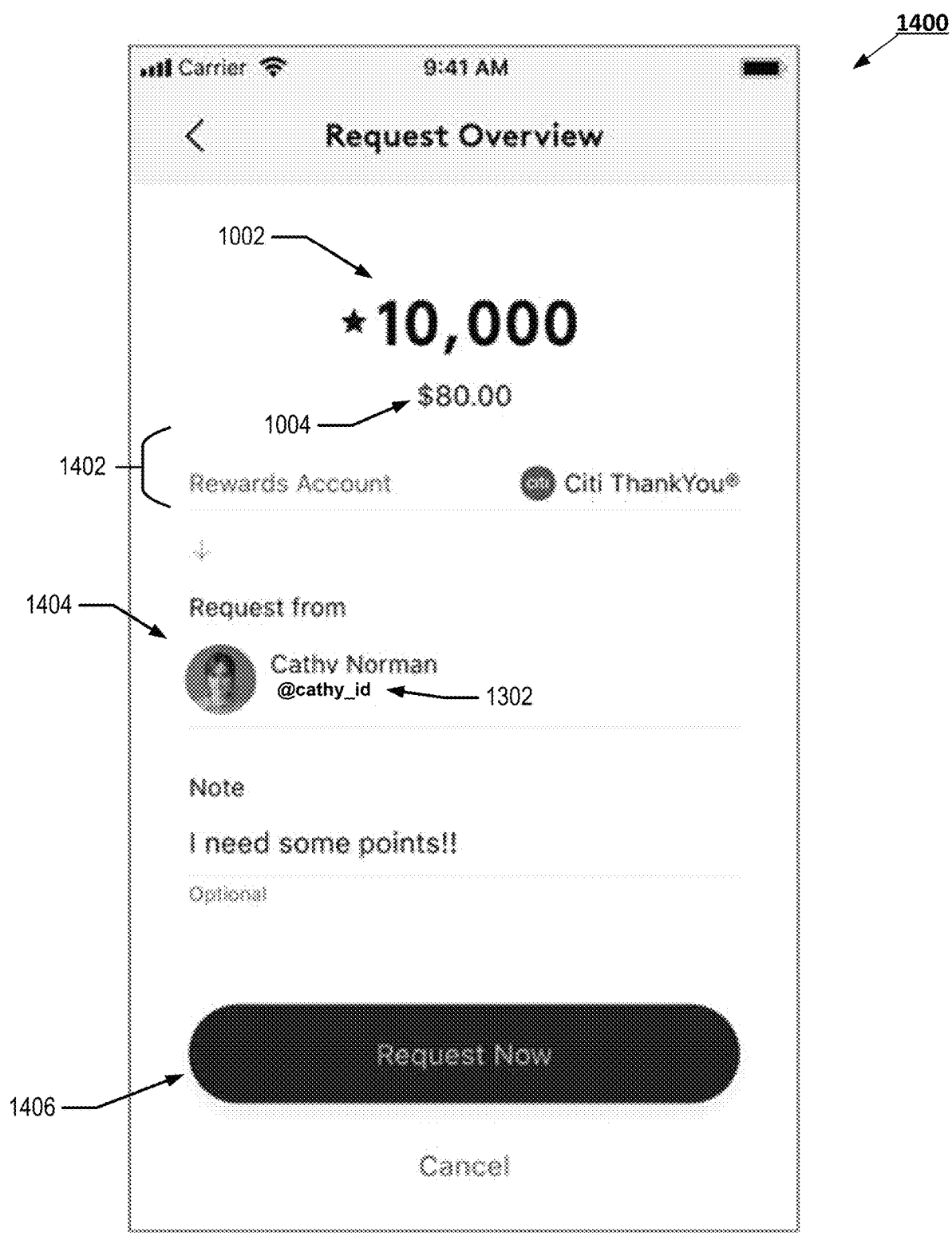

Referring to FIG. 14, a user interface 1400 is provided. In the illustrated embodiment, user interface 1400 is provided for defining and initiating an inbound digital asset transfer. For example, user interface 1400 is provided at a first client device 104A associated with the recipient, or the end user defining the inbound digital asset transfer (e.g., user A). Using user interface 1400, the recipient defines a number of digital asset units 1002 to request from a sender. User interface 1400 is configured to indicate a number of fiat currency units 1004 equivalent in value to the number of digital asset units 1002. In various embodiments, user interface 1400 enables direct specification of the number of digital asset units 1002 to request, as well as indirect specification through the number of fiat currency units 1004. A conversion rate between the digital asset and the fiat currency is used to determine the number of fiat currency units 1004 equivalent in value to the defined or specified number of digital asset units 1002.

User interface 1400 further indicates a digital asset user account associated with the recipient, or a recipient digital asset user account 1402. In various embodiments, the recipient selects or specifies a recipient digital asset user account 1402 from one or more digital asset user accounts via user interface 1400.

The recipient (e.g., user A) is enabled to select a sender 1404 for the inbound digital asset transfer via user interface 1400. For example, user interface 1400 provides a plurality of prospective senders, such as a contact list of the recipient, and the recipient selects a sender 1404 via user interaction with user interface 1400. User interface 1400 is configured to then indicate the sender 1404 and may identify the sender 1404 with a sender identifier 1302, which may be a user-name, an e-mail address, and/or the like.

Figure 15:
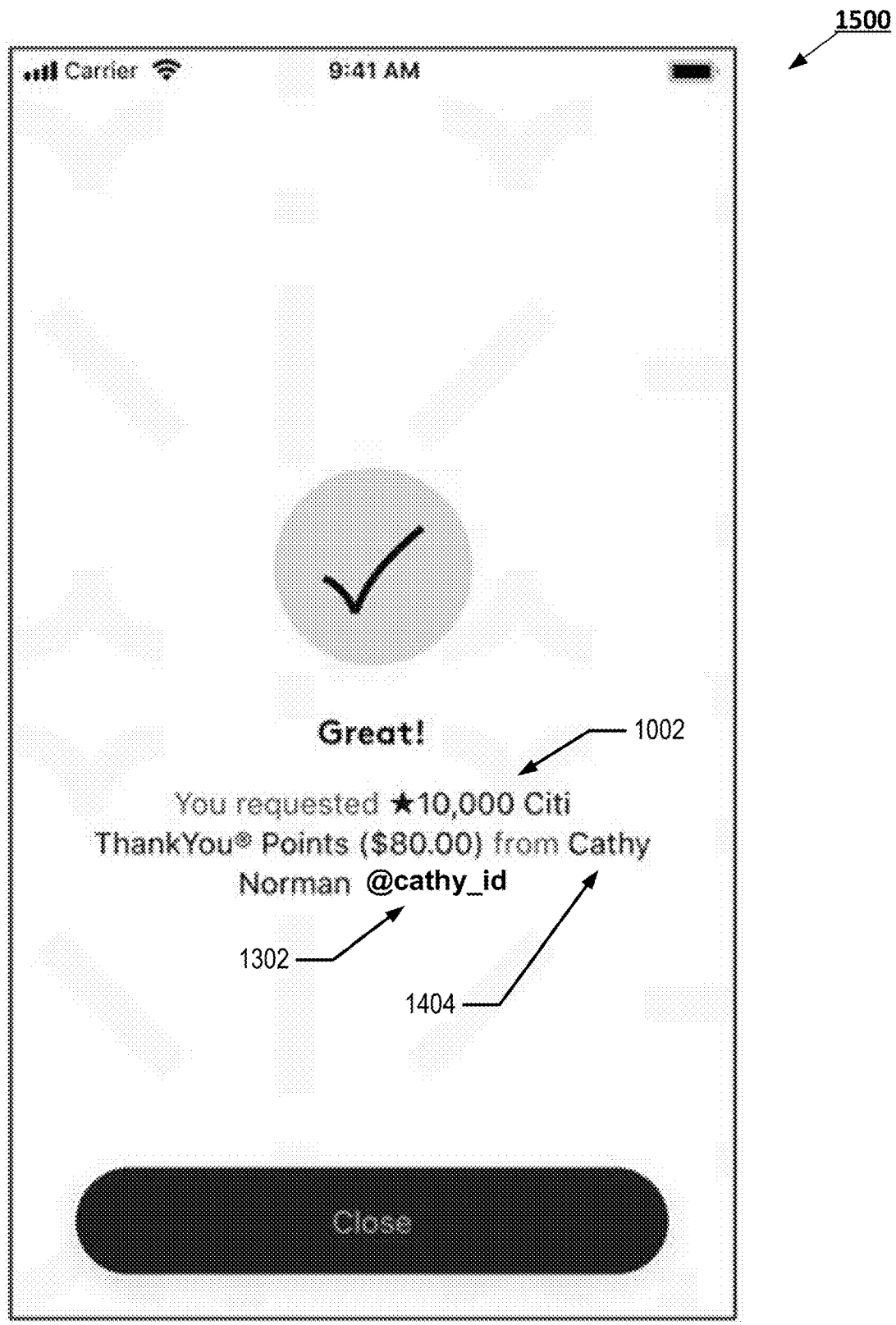

User interface 1400 further comprises an inbound transfer query mechanism 1406 configured to be interactable with the end user. Responsive to user interaction, the inbound transfer query mechanism 1406 causes a digital asset transfer query to be generated based at least in part on various aspects defined by the recipient, such as the number of digital asset units 1002, the recipient digital asset user account 1402, the sender 1404, and/or the like. The digital asset transfer query is further transmitted, responsive to user interaction with the inbound transfer query mechanism 1406, to an account management system 102. Accordingly, the recipient (e.g., user A) may initiate an inbound digital asset transfer via user interface 1400. In accordance with receiving the digital asset transfer query, the account management system 102 processes the inbound digital asset transfer defined by the digital asset transfer query and provides (e.g., transmits) a transfer initiation query to the second client device 104B associated with the sender 1404 (e.g., user B). Thus, as a result of user interaction with the inbound transfer query mechanism 1406, the sender 1404 is notified (e.g., via a transfer initiation query) of the recipient's request for digital asset unit FIG. 15 provides a user interface 1500 that may be provided responsive to user interaction with the inbound transfer query mechanism 1406 of user interface 1400, in various embodiments. User interface 1500 enables the recipient (e.g., user B) to confirm various defined aspects of the inbound digital asset transfer, such as the number of digital asset units 1002 to transfer (e.g., to be received by the recipient), the number of fiat currency units equivalent in value, the sender 1404, the sender identifier 1302, and/or the like.

Figure 16:
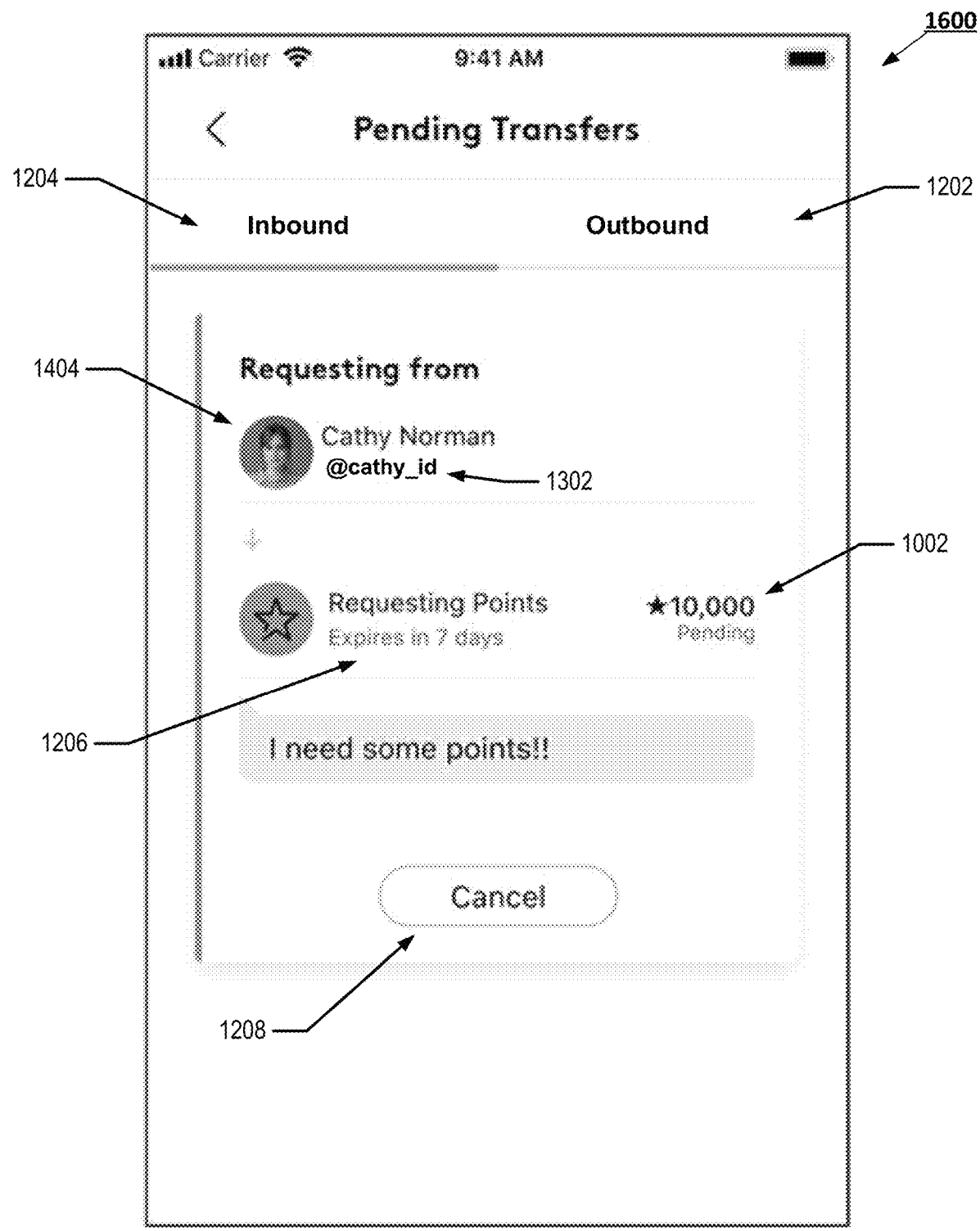

FIG. 16 provides a user interface 1600 that is provided via the second client device 104B to the recipient (e.g., user A) and configured to indicate digital asset transfers that are pending. User interface 1600 comprises an outbound selection mechanism 1202 and an inbound selection mechanism 1204, similar to user interface 1200. In the illustrated embodiment, user interface 1600 indicates one or more inbound digital asset transfers that are pending based at least in part on user interaction with the inbound selection mechanism 1204. As shown, the inbound digital asset transfer defined in FIG. 14 and FIG. 15 is pending, thereby indicating that the sender 1404 (e.g., user B) has not responded to the transfer initiation query provided by the account management system 102 to the sender 1404. In indicating a pending inbound digital asset transfer, user interface 1600 indicates the sender 1404, the sender identifier 1302 associated with the sender 1404, an expiration time period 1206 associated with the inbound digital asset transfer and providing a time period within which the sender 1404 may respond, the number of digital asset units 1002 requested from the sender 1404, and/or the like. User interface 1600 also comprises a cancelation mechanism 1208, and the cancelation mechanism 1208 is configured to, upon user interaction, cancel the inbound digital asset transfer to preclude the sender 1404 from accepting or responding to the transfer initiation query.

Figure 17:
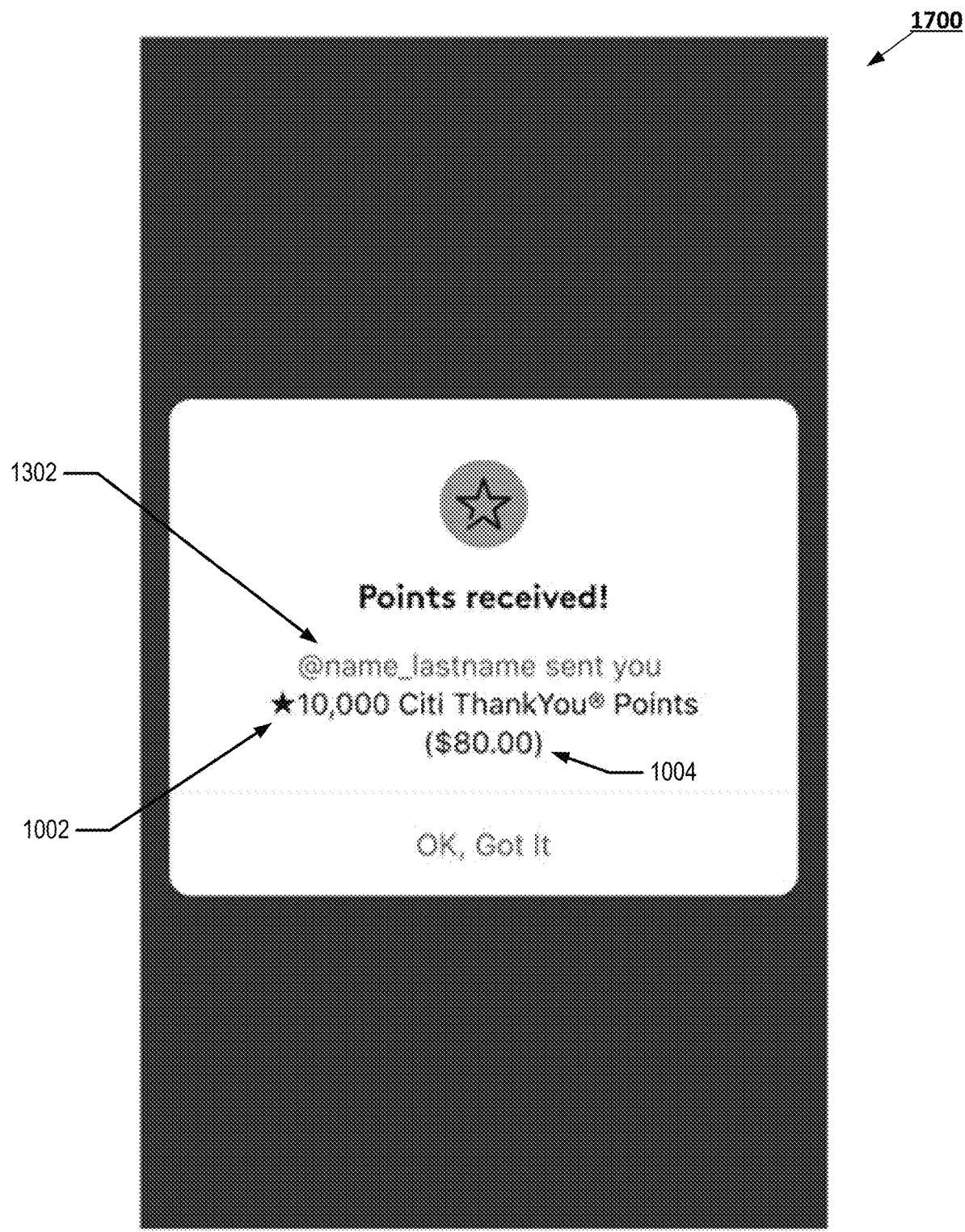

FIG. 17 provides a user interface 1700 that is provided via the first client device 104A to the recipient (e.g., user A) upon execution of the inbound digital asset transfer. For example, user interface 1700 is provided upon the sender (e.g., user B) providing a positive transfer initiation response, the defined number of digital asset units being debited from the sender (e.g., user B), and the defined number of digital asset units being credited to the recipient (e.g., user A). Thus, user interface 1700 is provided to indicate to the recipient (e.g., user A) that the recipient has been credited with digital asset units for execution of the inbound digital asset transfer. In doing so, user interface 1700 provides various aspects of the inbound digital asset transfer for confirmation by the recipient (e.g., user A). Such provided aspects include the sender 1404 and/or the sender identifier 1302 associated with the sender 1404, the number of digital asset units transferred (e.g., credited to the recipient), the number of fiat currency units 1004 equivalent in value to the number of digital asset units transferred, the time of execution of the inbound digital asset transfer, and/or the like.

Accordingly, various embodiments of the present disclosure provide for efficient, accurate, and secure execution of digital asset transfers and enable an end user to transfer digital asset units to another end user (e.g., an outbound digital asset transfer) and to request digital asset units from another end user (e.g., an inbound digital asset transfer). Various embodiments of the present disclosure are configured to execute digital asset transfers of internally-custodied digital assets, which involves the retrieval and management of account balance data objects and execution of closed-loop transactions (e.g., off-chain transactions). Various embodiments are also configured to execute digital asset transfers of externally-custodied digital assets, which involves transmitting account queries to a digital asset exchange system 106 to receive account balance data objects and transmitting transfer execution API queries to the digital asset exchange system 106. In various embodiments, a recipient of a digital asset transfer is provided with alternative digital asset transfers involving alternative digital asset that may be credited to the recipient upon selection in lieu of the digital asset originally defined for the digital asset transfer.

Various embodiments provide technical advantages generally relating to the efficiency, accuracy, and security of digital asset transfers, transactions, conversions, and/or the like. Digital asset transfers of internally-custodied digital assets are executed in part by closed-loop debits and closed-loop credits. Closed-loop transactions of internally-custodied digital assets are particularly advantageous in instances when the internally-custodied digital asset is a cryptoasset or a cryptocurrency digital asset, as the closed-loop transactions are off-chain transactions that enable digital asset transfers to be executed on a shorter time scale of milliseconds or seconds with decreased exposure of both sender data and recipient data, as compared to on-chain transactions that require long processing and validation time on the scale of hours or days. Meanwhile, execution of digital asset transfers of externally-custodied digital assets includes generation and transmission of application programming interface (API) queries configured to efficiently and precisely identify a particular digital asset, identify a digital asset user account, and cause certain debits and credits of digital asset units. Such API queries include identifier tokens unique to end users and federated for different digital assets, such that an identifier token identifies different digital asset user accounts, thereby reducing system load including storage resources.

Further technical advantages are provided by identifying and providing alternative digital asset transfers for selection by a recipient of a digital asset transfer. Alternative digital asset transfers enable a recipient to receive units of an alternative digital asset different than the digital asset specified by the sender for the digital asset transfer. As a result of preemptively, intelligently, and automatically identifying alternative digital asset transfers for the recipient, the need for a recipient to communicate repeatedly with the system to identify and select an alternative digital asset is obviated, and computing and processing resources for the system are conserved.

Various embodiments provide additional technical advantages in the use of current and accurate account data for end users involved in a digital asset transfer. When an inbound digital asset transfer is requested by a first end user, account data is retrieved and/or received for each of the first end user and the second end user. As the second end user may respond to the request after some amount of time, the account data that was retrieved and/or received may become outdated. An account refresh time period and an associated automated timing trigger is configured such that response by the second end user outside of the account refresh time period causes new account data to be retrieved and/or retrieved in order to ensure accuracy of account data.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A computer-implemented method comprising:
receiving, using one or more processors and at an application programming interface, a data object originating from a first client device associated with a first end user and defining a cryptocurrency digital asset transfer between the first end user and a second end user, wherein the data object indicates a cryptocurrency digital asset and a defined number of cryptocurrency digital asset units for the cryptocurrency digital asset transfer;

retrieving, using the one or more processors and from a first off-chain exchange, a first account balance data object corresponding to a first cryptocurrency digital asset user account associated with the first end user and a second account balance data object corresponding to a second cryptocurrency digital asset user account associated with the second end user, wherein (a) the first account balance data object is retrieved using a first federated identifier token (1) associated with the first end user and (2) configured to identify a plurality of cryptocurrency digital asset user accounts associated with the first end user and managed by at least the first off-chain exchange and a second off-chain exchange, and (b) the second account balance data object is retrieved using a second federated identifier token (1) associated with the second end user and (2) configured to identify a plurality of cryptocurrency digital asset user accounts associated with the second end user and managed by at least the first off-chain exchange and the second off-chain exchange;

identifying, by the first off-chain exchange, one or more transfer conditions for the cryptocurrency digital asset transfer associated with the first cryptocurrency digital asset user account using the first federated identifier token;

identifying, by the first off-chain exchange, one or more transfer conditions for the cryptocurrency digital asset transfer associated with the second cryptocurrency digital asset user account using the second federated identifier token;

responsive to determining, by the first off-chain exchange, that the cryptocurrency digital asset transfer satisfies the one or more transfer conditions for the cryptocurrency digital asset transfer associated with the first cryptocurrency digital asset user account and the one or more transfer conditions for the cryptocurrency digital asset transfer associated with the second cryptocurrency digital asset user account and that the first cryptocurrency digital asset user account and the second cryptocurrency digital asset user account are managed by the first off-chain exchange:

executing, by the first off-chain exchange, a first off-chain transaction to debit a first number of cryptocurrency digital asset units from the first cryptocurrency digital asset user account associated with the first end user, and executing, by the first off-chain exchange, a second off-chain transaction to credit a second number of cryptocurrency digital asset units to the second cryptocurrency digital asset user account associated with the second end user, wherein the first number of cryptocurrency digital asset units and the second number of cryptocurrency digital asset units are each determined based at least in part on the defined number of cryptocurrency digital asset units;

responsive to determining, by the first off-chain exchange, that the cryptocurrency digital asset transfer does not satisfy the one or more transfer conditions for the cryptocurrency digital asset transfer associated with the first cryptocurrency digital asset user account: generating and transmitting, using the one or more processors and to the second off-chain exchange, an account query comprising the first federated identifier token associated with the first end user;

receiving, using the one or more processors and from the second off-chain exchange, an account query response comprising a third account balance data object corresponding to a third cryptocurrency digital asset user account associated with the first end user and managed by the second off-chain exchange;

identifying, by the second off-chain exchange, one or more transfer conditions for the cryptocurrency digital asset transfer associated with the third cryptocurrency digital asset user account using the first federated identifier token;

responsive to determining, by the second off-chain exchange, that the cryptocurrency digital asset transfer satisfies the one or more transfer conditions for the cryptocurrency digital asset transfer associated with the third cryptocurrency digital asset user account:

executing, by the second off-chain exchange, a third off-chain transaction to debit the first number of cryptocurrency digital asset units from the third cryptocurrency digital asset user account associated with the first end user; and generating and transmitting, by the second off-chain exchange, a transfer execution API query to the first off-chain exchange identifying the second cryptocurrency digital asset user account, wherein the transfer execution API query is configured to cause the second number of cryptocurrency digital asset units to be credited to a central operating account of the first off-chain exchange via an on-chain transaction, wherein the second number of cryptocurrency digital asset units are credited to the second cryptocurrency digital asset user account via an off-chain transaction executed by the first off-chain exchange, wherein the first number of cryptocurrency digital asset units and the second number of cryptocurrency digital asset units are each determined based at least in part on the defined number of cryptocurrency digital asset units for the cryptocurrency digital asset transfer;

subsequent to executing the first off-chain transaction or the third off-chain transaction to debit the first number of cryptocurrency digital asset units from the first or the third cryptocurrency digital asset user account, respectively, updating, using the one or more processors, the first account balance data object or the third account balance data object to describe a resulting balance of the first cryptocurrency digital asset user account or a resulting balance of the third cryptocurrency digital asset user account; and updating, using the one or more processors, the second account balance data object to describe a resulting balance of the second cryptocurrency digital asset user account.

2. The computer-implemented method of claim 1, wherein the data object is received in response to a transfer initiation query provided to the first client device associated with the first end user at a first timepoint, the transfer initiation query being provided as a request by the second end user for the defined number of cryptocurrency digital asset units.

3. The computer-implemented method of claim 2, wherein the first account balance data object and the second account balance data object are retrieved based at least in part on a determination that a configurable account refresh time period has elapsed between the first timepoint and a time at which the data object is received.

4. The computer-implemented method of claim 1, further comprising identifying one or more alternative cryptocurrency digital assets different than the cryptocurrency digital asset indicated by the data object based at least in part on behavioral data associated with the second end user and indicating the one or more alternative cryptocurrency digital assets to the second end user.

5. The computer-implemented method of claim 4, wherein the data object further indicates a particular alternative cryptocurrency digital asset based at least in part on a selection by the second end user, and wherein the second number of cryptocurrency digital asset units credited to the second cryptocurrency digital asset user account are of the particular alternative cryptocurrency digital asset.

6. The computer-implemented method of claim 1, wherein the one or more transfer conditions for the cryptocurrency digital asset transfer associated with the first cryptocurrency digital asset user account, the second cryptocurrency digital asset user account, or the third cryptocurrency digital asset user account comprise a balance sufficiency of the first cryptocurrency digital asset user account, the second cryptocurrency digital asset user account, or the third cryptocurrency digital asset user account, respectively, and/or a maximum unit limit for the cryptocurrency digital asset transfer.

7. The computer-implemented method of claim 1, wherein the defined number of cryptocurrency digital asset units is based at least in part on a user-specified number of fiat currency units and a conversion rate between the cryptocurrency digital asset and a fiat currency.

8. A system comprising one or more memory storage areas and one or more processors, the system configured for:
receiving a data object originating from a first client device associated with a first end user and defining a cryptocurrency digital asset transfer between the first end user and a second end user, wherein the data object indicates a cryptocurrency digital asset and a defined number of cryptocurrency digital asset units for the cryptocurrency digital asset transfer;
retrieving, from a first off-chain exchange, a first account balance data object corresponding to a first cryptocurrency digital asset user account associated with the first end user and a second account balance data object corresponding to a second cryptocurrency digital asset user account associated with the second end user, wherein (a) the first account balance data object is retrieved using a first federated identifier token (1) associated with the first end user and (2) configured to identify a plurality of cryptocurrency digital asset user accounts associated with the first end user and managed by at least the first off-chain exchange and a second off-chain exchange, and (b) the second account balance data object is retrieved using a second federated identifier token (1) associated with the second end user and (2) configured to identify a plurality of cryptocurrency digital asset user accounts associated with the second end user and managed by at least the first off-chain exchange and the second off-chain exchange;
identifying, by the first off-chain exchange, one or more transfer conditions for the cryptocurrency digital asset transfer associated with the first cryptocurrency digital asset user account using the first federated identifier token;
identifying, by the first off-chain exchange, one or more transfer conditions for the cryptocurrency digital asset transfer associated with the second cryptocurrency digital asset user account using the second federated identifier token;
responsive to determining, by the first off-chain exchange, that the cryptocurrency digital asset transfer satisfies the one or more transfer conditions for the cryptocurrency digital asset transfer associated with the first cryptocurrency digital asset user account and the one or more transfer conditions for the cryptocurrency digital asset transfer associated with the second cryptocurrency digital asset user account and that the first cryptocurrency digital asset user account and the second cryptocurrency digital asset user account are managed by the first off-chain exchange:
executing, by the first off-chain exchange, a first off-chain transaction to debit a first number of cryptocurrency digital asset units from the first cryptocurrency digital asset user account associated with the first end user, and
executing, by the first off-chain exchange, a second off-chain transaction to credit a second number of cryptocurrency digital asset units to the second cryptocurrency digital asset user account associated with the second end user, wherein the first number of cryptocurrency digital asset units and the second number of cryptocurrency digital asset units are each determined based at least in part on the defined number of cryptocurrency digital asset units;
responsive to determining, by the first off-chain exchange, that the cryptocurrency digital asset transfer does not satisfy the one or more transfer conditions for the cryptocurrency digital asset transfer associated with the first cryptocurrency digital asset user account:
generating and transmitting, to the second off-chain exchange, an account query comprising the first federated identifier token associated with the first end user;
receiving, from the second off-chain exchange, an account query response comprising a third account balance data object corresponding to a third cryptocurrency digital asset user account associated with the first end user and managed by the second off-chain exchange;
identifying, by the second off-chain exchange, one or more transfer conditions for the cryptocurrency digital asset transfer associated with the third cryptocurrency digital asset user account using the first federated identifier token;
responsive to determining, by the second off-chain exchange, that the cryptocurrency digital asset transfer satisfies the one or more transfer conditions for the cryptocurrency digital asset transfer associated with the third cryptocurrency digital asset user account:
executing, by the second off-chain exchange, a third off-chain transaction to debit the first number of cryptocurrency digital asset units from the third cryptocurrency digital asset user account associated with the first end user; and
generating and transmitting, by the second off-chain exchange, a transfer execution API query to the first off-chain exchange identifying the second cryptocurrency digital asset user account, wherein the transfer execution API query is configured to cause the second number of cryptocurrency digital asset units to be credited to a central operating account of the first off-chain exchange via an on-chain transaction, wherein the second number of cryptocurrency digital asset units are credited to the second cryptocurrency digital asset user account via an off-chain transaction executed by the first off-chain exchange, wherein the first number of cryptocurrency digital asset units and the second number of cryptocurrency digital asset units are each determined based at least in part on the defined number of cryptocurrency digital asset units for the cryptocurrency digital asset transfer;

subsequent to executing the first off-chain transaction or the third off-chain transaction to debit the first number of cryptocurrency digital asset units from the first or the third cryptocurrency digital asset user account, respectively, updating the first account balance data object or the third account balance data object to describe a resulting balance of the first cryptocurrency digital asset user account or a resulting balance of the third cryptocurrency digital asset user account; and updating the second account balance data object to describe a resulting balance of the second cryptocurrency digital asset user account.

9. The system of claim 8, wherein the data object is received in response to a transfer initiation query provided to the first client device associated with the first end user at a first timepoint, the transfer initiation query being provided as a request by the second end user for the defined number of cryptocurrency digital asset units.

10. The system of claim 9, wherein the first account balance data object and the second account balance data object are retrieved based at least in part on a determination that a configurable account refresh time period has elapsed between the first timepoint and a time at which the data object is received.

11. The system of claim 8, wherein the one or more transfer conditions for the cryptocurrency digital asset transfer associated with the first cryptocurrency digital asset user account, the second cryptocurrency digital asset user account, or the third cryptocurrency digital asset user account comprise a balance sufficiency of the first cryptocurrency digital asset user account, the second cryptocurrency digital asset user account, or the third cryptocurrency digital asset user account, respectively, and/or a maximum unit limit for the cryptocurrency digital asset transfer.

12. The system of claim 8, wherein the defined number of cryptocurrency digital asset units is based at least in part on a user-specified number of fiat currency units and a conversion rate between the cryptocurrency digital asset and a fiat currency.

13. A computer program product comprising at least one non-transitory computer-readable storage medium having computer-readable program code portions stored therein, the computer-readable program code portions comprising executable portions configured for:

receiving a data object originating from a first client device associated with a first end user and defining a cryptocurrency digital asset transfer between the first end user and a second end user, wherein the data object indicates a cryptocurrency digital asset and a defined number of cryptocurrency digital asset units for the cryptocurrency digital asset transfer;

retrieving, from a first off-chain exchange, a first account balance data object corresponding to a first cryptocurrency digital asset user account associated with the first end user and a second account balance data object corresponding to a second cryptocurrency digital asset user account associated with the second end user, wherein (a) the first account balance data object is retrieved using a first federated identifier token (1) associated with the first end user and (2) configured to identify a plurality of cryptocurrency digital asset user accounts associated with the first end user and managed by at least the first off-chain exchange and a second off-chain exchange, and (b) the second account balance data object is retrieved using a second federated identifier token (1) associated with the second end user and (2) configured to identify a plurality of cryptocurrency digital asset user accounts associated with the second end user and managed by at least the first off-chain exchange and the second off-chain exchange;

identifying, by the first off-chain exchange, one or more transfer conditions for the cryptocurrency digital asset transfer associated with the first cryptocurrency digital asset user account using the first federated identifier token;

identifying, by the first off-chain exchange, one or more transfer conditions for the cryptocurrency digital asset transfer associated with the second cryptocurrency digital asset user account using the second federated identifier token;

responsive to determining, by the first off-chain exchange, that the cryptocurrency digital asset transfer satisfies the one or more transfer conditions for the cryptocurrency digital asset transfer associated with the first cryptocurrency digital asset user account and the one or more transfer conditions for the cryptocurrency digital asset transfer associated with the second cryptocurrency digital asset user account and that the first cryptocurrency digital asset user account and the second cryptocurrency digital asset user account are managed by the first off-chain exchange:

executing, by the first off-chain exchange, a first off-chain transaction to debit a first number of cryptocurrency digital asset units from the first cryptocurrency digital asset user account associated with the first end user, and executing, by the first off-chain exchange, a second off-chain transaction to credit a second number of cryptocurrency digital asset units to the second cryptocurrency digital asset user account associated with the second end user, wherein the first number of cryptocurrency digital asset units and the second number of cryptocurrency digital asset units are each determined based at least in part on the defined number of cryptocurrency digital asset units;

responsive to determining, by the first off-chain exchange, that the cryptocurrency digital asset transfer does not satisfy the one or more transfer conditions for the cryptocurrency digital asset transfer associated with the first cryptocurrency digital asset user account:

generating and transmitting, to the second off-chain exchange, an account query comprising the first federated identifier token associated with the first end user;

receiving, from the second off-chain exchange, an account query response comprising a third account balance data object corresponding to a third cryptocurrency digital asset user account associated with the first end user and managed by the second off-chain exchange;

identifying, by the second off-chain exchange, one or more transfer conditions for the cryptocurrency digital asset transfer associated with the third cryptocurrency digital asset user account using the first federated identifier token;

responsive to determining, by the second off-chain exchange, that the cryptocurrency digital asset transfer satisfies the one or more transfer conditions for the cryptocurrency digital asset transfer associated with the third cryptocurrency digital asset user account:

executing, by the second off-chain exchange, a third off-chain transaction to debit the first number of cryptocurrency digital asset units from the third cryptocurrency digital asset user account associated with the first end user; and generating and transmitting, by the second off-chain exchange, a transfer execution API query to the first off-chain exchange identifying the second cryptocurrency digital asset user account, wherein the transfer execution API query is configured to cause the second number of cryptocurrency digital asset units to be credited to a central operating account of the first off-chain exchange via an on-chain transaction, wherein the second number of cryptocurrency digital asset units are credited to the second cryptocurrency digital asset user account via an off-chain transaction executed by the first off-chain exchange, wherein the first number of cryptocurrency digital asset units and the second number of cryptocurrency digital asset units are each determined based at least in part on the defined number of cryptocurrency digital asset units for the cryptocurrency digital asset transfer;

subsequent to executing the first off-chain transaction or the third off-chain transaction to debit the first number of cryptocurrency digital asset units from the first or the third cryptocurrency digital asset user account, respectively, updating the first account balance data object or the third account balance data object to describe a resulting balance of the first cryptocurrency digital asset user account or a resulting balance of the third cryptocurrency digital asset user account; and updating the second account balance data object to describe a resulting balance of the second cryptocurrency digital asset user account.

14. The computer program product of claim 13, wherein the first account balance data object and the second account balance data object are retrieved based at least in part on a determination that a configurable account refresh time period has elapsed between a first timepoint and a time at which the data object is received.

* * * * *

UNITED STATES PATENT AND TRADEMARK OFFICE
CERTIFICATE OF CORRECTION

| | |
|---|---|
| PATENT NO. | : 11,961,136 B2 |
| APPLICATION NO. | : 17/407888 |
| DATED | : April 16, 2024 |
| INVENTOR(S) | : Nicolas Frederic Cabrera et al. |

It is certified that error appears in the above-identified patent and that said Letters Patent is hereby corrected as shown below:

In the Claims

In Column 61, Line 48, Claim 12, delete "flat" and insert -- fiat --, therefor.

Signed and Sealed this
Fifteenth Day of October, 2024

Katherine Kelly Vidal
*Director of the United States Patent and Trademark Office*